US012469477B1

(12) United States Patent
Hardesty et al.

(10) Patent No.: US 12,469,477 B1
(45) Date of Patent: Nov. 11, 2025

(54) SYSTEMS AND METHODS OF PROCEDURAL MEDIA GENERATION

(71) Applicant: CoordN8 Inc., Bloomington, IN (US)

(72) Inventors: Jay Hardesty, Brooklyn, NY (US); Jason Wilber, Bloomington, IN (US); Dražen Bošnjak, New York, NY (US)

(73) Assignee: CoordN8 Inc., Bloomington, IN (US)

( * ) Notice: Subject to any disclaimer, the term of this patent is extended or adjusted under 35 U.S.C. 154(b) by 0 days.

(21) Appl. No.: 19/204,015

(22) Filed: May 9, 2025

Related U.S. Application Data

(60) Provisional application No. 63/644,784, filed on May 9, 2024.

(51) Int. Cl.
*G10H 1/00* (2006.01)

(52) U.S. Cl.
CPC ..... *G10H 1/0025* (2013.01); *G10H 2210/051* (2013.01); *G10H 2210/346* (2013.01)

(58) Field of Classification Search
CPC ........... G10H 1/0025; G10H 2210/051; G10H 2210/346
See application file for complete search history.

(56) References Cited

U.S. PATENT DOCUMENTS

| | | | | |
|---|---|---|---|---|
| 11,328,700 B2 * | 5/2022 | Galuten | ............... | G10H 1/0025 |
| 2002/0037083 A1 * | 3/2002 | Weare | .................... | G11B 27/28 707/E17.101 |
| 2007/0074620 A1 | 4/2007 | Kay et al. | | |
| 2007/0193435 A1 * | 8/2007 | Hardesty | .............. | G10H 1/0025 84/609 |
| 2015/0013527 A1 * | 1/2015 | Buskies | ................... | G10H 1/42 84/611 |
| 2015/0013533 A1 * | 1/2015 | Buskies | ............... | G10H 1/0066 84/645 |
| 2017/0243571 A1 * | 8/2017 | Cogliati | ............... | G10H 1/0066 |

(Continued)

FOREIGN PATENT DOCUMENTS

| | | |
|---|---|---|
| CN | 115631736 A | 1/2023 |
| CN | 112634842 B | 4/2024 |
| JP | 2009529717 A | 8/2009 |

(Continued)

OTHER PUBLICATIONS

Screen capture from YouTube video clip entitled "Coord 2022," 1 page, uploaded on Dec. 1, 2022 by user "Applied Tonality." Retrieved from Internet: https://www.youtube.com/watch?v=08fxbeNCqZE.

(Continued)

*Primary Examiner* — Jeffrey Donels
(74) *Attorney, Agent, or Firm* — Kolitch Romano Dascenzo Gates LLC

(57) ABSTRACT

Systems and methods for procedural media generation, such as generating musical variations and figures, are described. The systems and methods utilize continuous-value data representing structural parameters of rhythm and temporal dynamics to enable dynamic adjustment to musical patterns, intelligent routing, pattern morphing, and real-time feedback. Further features include context-aware effects, adaptive pattern evolution, and multimodal synchronization, thereby providing tools for music composition, performance, and audio production, among other applications.

20 Claims, 7 Drawing Sheets

(56) References Cited

U.S. PATENT DOCUMENTS

2024/0038205 A1 * 2/2024 Groves ................ G10H 1/0066

FOREIGN PATENT DOCUMENTS

KR 1020200047198 A 5/2020
WO WO-2019158927 A1 * 8/2019 ............... G06N 7/01

OTHER PUBLICATIONS

Screen capture from YouTube video clip entitled ""Maybe Arrive"," 1 page, uploaded on Nov. 22, 2022 by user "Applied Tonality." Retrieved from Internet: https://www.youtube.com/watch?v=gs_7PuBHVto.

Screen capture from YouTube video clip entitled "Coord generative music variations https://coord.fm," 1 page, uploaded on Nov. 2, 2022 by user "Applied Tonality." Retrieved from Internet: https://www.youtube.com/watch?v=3rmb0O_oeM8.

Screen capture from YouTube video clip entitled "Some Computer-aided Music Improvisation," 1 page, uploaded on Jul. 14, 2018 by user "Applied Tonality." Retrieved from Internet: https://www.youtube.com/watch?v=XOuztJYQzOQ.

Screen capture from YouTube video clip entitled "Music Improvisation Coprocessor," 1 page, uploaded on Jul. 13, 2018 by user "Applied Tonality." Retrieved from Internet: https://www.youtube.com/watch?v=0-sWoELhgC4.

Screen capture from YouTube video clip entitled "Generative Music Improvisation," 1 page, uploaded on Jul. 11, 2018 by user "Applied Tonality." Retrieved from Internet: https://www.youtube.com/watch?v=FIVSQa7nnj4.

Screen capture from YouTube video clip entitled "Algorithmic coprocessor for music improvisation," 1 page, uploaded on Jul. 9, 2018 by user "Applied Tonality." Retrieved from Internet: https://www.youtube.com/watch?v=tFc7R0avAxg.

Screen capture from YouTube video clip entitled "Improvisation on 3 metrical levels," 1 page, uploaded on Apr. 10, 2018 by user "Applied Tonality." Retrieved from Internet: https://www.youtube.com/watch?v=BzalmAkUPII.

Screen capture from YouTube video clip entitled "Practicing UI w/ zooming," 1 page, uploaded on Apr. 5, 2018 by user "Applied Tonality." Retrieved from Internet: https://www.youtube.com/watch?v=Eq7typ0c88w.

Screen capture from YouTube video clip entitled "Improvisation via rhythmic building blocks," 1 page, uploaded on Apr. 4, 2018 by user "Applied Tonality." Retrieved from Internet: https://www.youtube.com/watch?v=upt7tX7HC1A.

Screen capture from YouTube video clip entitled "Constrast between music interfaces," 1 page, uploaded on Mar. 30, 2018 by user "Applied Tonality." Retrieved from Internet: https://www.youtube.com/watch?v=tX9gcuR_DKQ.

Screen capture from YouTube video clip entitled "Rhythmic improvisation coprocessor," 1 page, uploaded on Mar. 29, 2018 by user "Applied Tonality." Retrieved from Internet: https://www.youtube.com/watch?v=08xXMKQYPcM.

Screen capture from YouTube video clip entitled "Coord demo—genetic algorithm added," 1 page, uploaded on Mar. 28, 2018 by user "Applied Tonality." Retrieved from Internet: https://www.youtube.com/watch?v=mt6CfoPIDkl.

Screen capture from YouTube video clip entitled "Rhythmic building blocks algorithm," 1 page, uploaded on Mar. 22, 2018 by user "Applied Tonality." Retrieved from Internet: https://www.youtube.com/watch?v=3M4FIP5thWc.

Screen capture from YouTube video clip entitled "Adding pitch manipulations," 1 page, uploaded on Mar. 18, 2018 by user "Applied Tonality." Retrieved from Internet: https://www.youtube.com/watch?v=qJHqcDuShUw.

Screen capture from YouTube video clip entitled "Rhythmic variations practice," 1 page, uploaded on Mar. 17, 2018 by user "Applied Tonality." Retrieved from Internet: https://www.youtube.com/watch?v=TR5_W_KW4Y.

Screen capture from YouTube video clip entitled "Coord loop variations," 1 page, uploaded on Mar. 14, 2018 by user "Applied Tonality." Retrieved from Internet: https://www.youtube.com/watch?v=Jv6HBs8r6TM.

Screen capture from YouTube video clip entitled "Rhythmic Spectra Variations," 1 page, uploaded on Jun. 10, 2017 by user "Applied Tonality." Retrieved from Internet: https://www.youtube.com/watch?v=vhYDSu9IXIY.

Screen capture from YouTube video clip entitled "Coord algorithmic music improvisation," 1 page, uploaded on May 19, 2017 by user "Applied Tonality." Retrieved from Internet: https://www.youtube.com/watch?v=Q9R3sWjsbCc.

Screen capture from YouTube video clip entitled "Coord algorithmic music variations," 1 page, uploaded on May 19, 2017 by user "Applied Tonality." Retrieved from Internet: https://www.youtube.com/watch?v=vYkLfv-Tsj4.

Screen capture from YouTube video clip entitled "Coord music interfaces," 1 page, uploaded on May 19, 2017 by user "Applied Tonality." Retrieved from Internet: https://www.youtube.com/watch?v=LKMomHXFT_4.

Screen capture from YouTube video clip entitled "Coord: new rhythm visualization," 1 page, uploaded on Aug. 25, 2016 by user "Applied Tonality." Retrieved from Internet: https://www.youtube.com/watch?v=4IUMo25JLME.

Screen capture from YouTube video clip entitled "Coord: algorithmic rhythm morphing," 1 page, uploaded on Aug. 25, 2016 by user "Applied Tonality." Retrieved from Internet: https://www.youtube.com/watch?v=1jdjz10B6Pw.

Screen capture from YouTube video clip entitled "Coord—rhythm derivations," 1 page, uploaded on Jul. 29, 2016 by user "Applied Tonality." Retrieved from Internet: https://www.youtube.com/watch?v=Ra9Je5pUnkU.

Screen capture from YouTube video clip entitled "Coord—morphing music," 1 page, uploaded on Jul. 20, 2016 by user "Applied Tonality." Retrieved from Internet: https://www.youtube.com/watch?v=cOZJkw8118Q.

Screen capture from YouTube video clip entitled "Coord—algorithmic melody morphing," 1 page, uploaded on Jun. 1, 2016 by user "Applied Tonality." Retrieved from Internet: https://www.youtube.com/watch?v=FQ7CL4oi5hw.

Screen capture from YouTube video clip entitled "looper," 1 page, uploaded on May 11, 2016 by user "Applied Tonality." Retrieved from Internet: https://www.youtube.com/watch?v=TJiyXCOcD7U.

Screen capture from YouTube video clip entitled "Morphing lead/bass melodies," 1 page, uploaded on May 10, 2016 by user "Applied Tonality." Retrieved from Internet: https://www.youtube.com/watch?v=Ypb5kUMxb8g.

Screen capture from YouTube video clip entitled "Emerging/submerging melodies," 1 page, uploaded on May 10, 2016 by user "Applied Tonality." Retrieved from Internet: https://www.youtube.com/watch?v=nw4_PF4mcF4.

Screen capture from YouTube video clip entitled "Coord—rhythm probabilities," 1 page, uploaded on May 9, 2016 by user "Applied Tonality." Retrieved from Internet: https://www.youtube.com/watch?v=HnNs_F_fweQ.

Screen capture from YouTube video clip entitled "Chromat music app," 1 page, uploaded on Apr. 23, 2016 by user "Applied Tonality." Retrieved from Internet: https://www.youtube.com/watch?v=JRPbvJSPQcM.

Screen capture from YouTube video clip entitled "Computer-aided music composition/improvisation," 1 page, uploaded on Apr. 15, 2016 by user "Applied Tonality." Retrieved from Internet: https://www.youtube.com/watch?v=RfGt2SmJsTc.

Screen capture from YouTube video clip entitled "Coord—rhythmic prediction as time machine," 1 page, uploaded on Apr. 15, 2016 by user "Applied Tonality." Retrieved from Internet: https://www.youtube.com/watch?v=-VVVtVfMOBU.

Screen capture from YouTube video clip entitled "Coord—music generator," 1 page, uploaded on Apr. 15, 2016 by user "Applied Tonality." Retrieved from Internet: https://www.youtube.com/watch?v=NY4LmU6JVMU.

(56) References Cited

OTHER PUBLICATIONS

Screen capture from YouTube video clip entitled "Coord—var on 3 themes 2," 1 page, uploaded on Apr. 15, 2016 by user "Applied Tonality." Retrieved from Internet: https://www.youtube.com/watch?v=QfG_IpgtnT4.
Screen capture from YouTube video clip entitled "Coord—music data flow," 1 page, uploaded on Apr. 15, 2016 by user "Applied Tonality." Retrieved from Internet: https://www.youtube.com/watch?v=0fRTOoRzCi8.
Screen capture from YouTube video clip entitled "Coord—var on 3 themes 2," 1 page, uploaded on Apr. 15, 2016 by user "Applied Tonality." Retrieved from Internet: https://www.youtube.com/watch?v=Yk3BaUxeGFk.
Screen capture from YouTube video clip entitled "Coord—var on 3 themes 1," 1 page, uploaded on Apr. 15, 2016 by user "Applied Tonality." Retrieved from Internet: https://www.youtube.com/watch?v=DrgsGOWiNZg.
Screen capture from YouTube video clip entitled "Coord—rhythmic prediction," 1 page, uploaded on Feb. 6, 2016 by user "Applied Tonality." Retrieved from Internet: https://www.youtube.com/watch?v=Y6u8HpyxM_w.
Screen capture from YouTube video clip entitled "Coord—generative rhythms," 1 page, uploaded on Jan. 25, 2016 by user "Applied Tonality." Retrieved from Internet: https://www.youtube.com/watch?v=e5OOMhLE7CU.
Screen capture from YouTube video clip entitled "Coord—algorithmic music variations," 1 page, uploaded on Jan. 23, 2016 by user "Applied Tonality." Retrieved from Internet: https://www.youtube.com/watch?v=ZOTSIXSfTjg.
Screen capture from YouTube video clip entitled "Coord—melody morpher," 1 page, uploaded on Jan. 16, 2016 by user "Applied Tonality." Retrieved from Internet: https://www.youtube.com/watch?v=tt5si5xRH4M.
Screen capture from YouTube video clip entitled "Coord—variation landscape," 1 page, uploaded on Sep. 17, 2015 by user "Applied Tonality." Retrieved from Internet: https://www.youtube.com/watch?v=9y-dFsNMaCo.
Screen capture from YouTube video clip entitled "Coord—random capture," 1 page, uploaded on Sep. 15, 2015 by user "Applied Tonality." Retrieved from Internet: https://www.youtube.com/watch?v=0TBKyX4RiDs.
Screen capture from YouTube video clip entitled "Coord—virtual composition 2," 1 page, uploaded on Sep. 7, 2015 by user "Applied Tonality." Retrieved from Internet: https://www.youtube.com/watch?v=o02irNUGuEg.
Screen capture from YouTube video clip entitled "Coord: generative morphing/variations," 1 page, uploaded on Aug. 28, 2015 by user "Applied Tonality." Retrieved from Internet: https://www.youtube.com/watch?v=nlUO3WDbyuM.
Screen capture from YouTube video clip entitled "Coord: Virtual Composition," 1 page, uploaded on May 28, 2015 by user "Applied Tonality." Retrieved from Internet: https://www.youtube.com/watch?v=OoSKiPVBYJU.
Screen capture from YouTube video clip entitled "Coord music generator," 1 page, uploaded on Mar. 4, 2015 by user "Applied Tonality." Retrieved from Internet: https://www.youtube.com/watch?v=LSTKGt_5Exg.
Screen capture from YouTube video clip entitled "Coord: Color/video-based music variations," 1 page, uploaded on Mar. 2, 2015 by user "Applied Tonality." Retrieved from Internet: https://www.youtube.com/watch?v=nzbTfoo9l_w.
Screen capture from YouTube video clip entitled "Pilot: composition by navigation," 1 page, uploaded on Sep. 30, 2014 by user "Applied Tonality." Retrieved from Internet: https://www.youtube.com/watch?v=NtjwAeG8qyM.
Screen capture from YouTube video clip entitled "Chromat iPhone music app," 1 page, uploaded on Sep. 30, 2014 by user "Applied Tonality." Retrieved from Internet: https://www.youtube.com/watch?v=1JZgwa08qr0.
Screen capture from YouTube video clip entitled "Coord: Generative Music Demo," 1 page, uploaded on Sep. 30, 2014 by user "Applied Tonality." Retrieved from Internet: https://www.youtube.com/watch?v=TOQTC8ntyFg.
Screen capture from YouTube video clip entitled "Recomposer Max for Live device and app," 1 page, uploaded on Sep. 30, 2014 by user "Applied Tonality." Retrieved from Internet: https://www.youtube.com/watch?v=6d9KRsuFuJs.
Hardesty, Jay; "A self-similar map of rhythmic components", Journal of Mathematics and Music, vol. 10, No. 1, pp. 36-58, 2016.
Hardesty, Jay; "Online Supplement to 'A self-similar map of rhythmic components'", Journal of Mathematics and Music, vol. 10, No. 1, pp. 1-8, 2016.
Hardesty, Jay; "Building Blocks of Rhythmic Expectation", MUME 2016—The Fourth International Workshop on Musical Metacreation, pp. 1-6, 2016.
Hardesty, Jay; "Navigating Outcomes of Rhythmic Anticipation", 6th International Workshop on Musical Metacreation, pp. 1-4, 2018.
Hardesty, Jay; "Variations on a Rhythmic Landscape", 19th Generative Art Conference GA2016, pp. 1-16, 2016.

* cited by examiner

SYSTEMS AND METHODS OF PROCEDURAL MEDIA GENERATION

CROSS-REFERENCES

The following applications and materials are incorporated herein by reference, in their entireties, for all purposes: U.S. Provisional Patent Application Ser. No. 63/644,784, filed May 9, 2024.

FIELD

This disclosure relates to systems and methods for procedural media generation. More specifically, the disclosed examples relate to systems and methods of generating musical variations and figures.

INTRODUCTION

Playing music by triggering musical patterns is a relatively accessible form of musical expression. For example, triggering one or more pre-recorded loops concurrently and/or in succession is a common technique used to compose or produce music and/or perform DJ sets. However, if the user wishes to generate new loops, beats, and/or melodies, such as those that are variations and/or hybrids of preexisting loops, or otherwise wishes to shape the resulting note patterns in real time, existing tools fail to provide robust, effective solutions.

Furthermore, in music composition, performance, and audio production, rhythmic and temporal structures are typically represented using discrete timing elements such as note onsets, durations, and quantized grids. While these methods provide consistent timing references and allow for some expressive variation, they lack a formalized means of encoding deeper structural relationships within rhythmic patterns.

This limitation arises from the absence of a computationally accessible, continuous parameter to represent this deeper rhythmic structure, i.e., a continuous parameter which extends beyond fixed markers and basic subdivisions. As a result, musicians, producers, and audio technology developers lack tools to analyze, manipulate, or integrate this dimension of rhythm structure. This limits creative workflows, real-time interaction, and the development of more adaptive systems in music and audio technologies. Addressing this limitation requires new computational approaches capable of modeling rhythmic structure as a continuous and expressive parameter.

SUMMARY

The present disclosure provides systems, apparatuses, and methods relating to procedural media generation.

Features, functions, and advantages may be achieved independently in various embodiments of the present disclosure, or may be combined in yet other embodiments, further details of which can be seen with reference to the following description and drawings.

DETAILED DESCRIPTION

Figure 1:
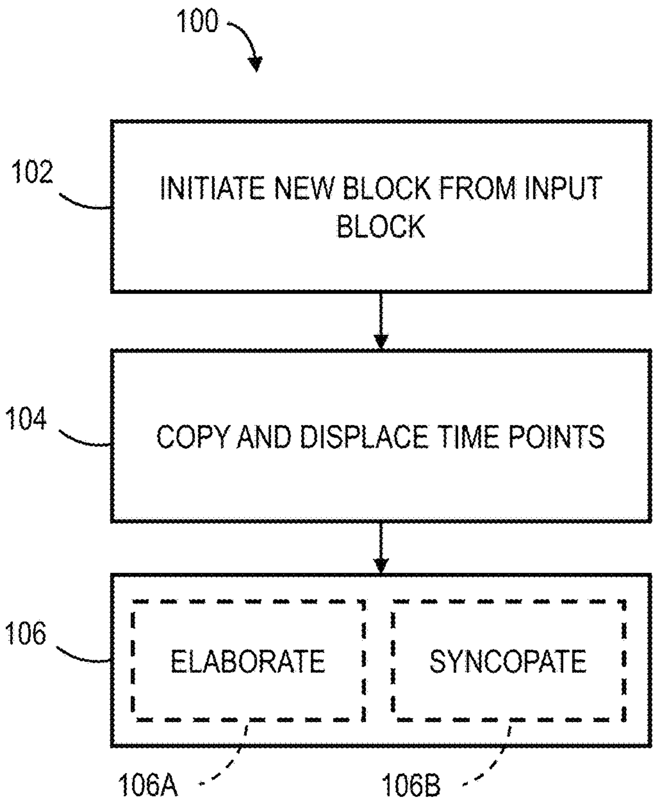
FIG. 1 is a flow chart depicting steps of an illustrative method for rhythmic pattern analysis and generation according to the present teachings.

Various aspects and examples of systems and methods for procedural media generation are described below and illustrated in the associated drawings. Unless otherwise specified, a system and/or method for procedural media generation in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the embodiments and examples described below are illustrative in nature and not all embodiments and examples provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first," "second," and "third" are used to distinguish or identify various members of a group, or the like, and are not intended to show serial or numerical limitation.

"AKA" means "also known as," and may be used to indicate an alternative or corresponding term for a given element or elements.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

"Providing," in the context of a method, may include receiving, obtaining, purchasing, manufacturing, generating, processing, preprocessing, and/or the like, such that the object or material provided is in a state and configuration for other steps to be carried out.

"Musical pattern" (or simply "pattern") may include a series of musical notes which may contain one or both of a rhythm and/or a melody, and/or may include a series of time points corresponding to note attacks independent of melody. Patterns may or may not exist within the context of a larger musical composition.

"Coherence" may be used to refer to the logic, symmetry, consistency, and form that is perceived within a given musical composition.

"Anticipation" refers to a note on an unaccented beat (e.g., weak beat) which raises the listener's expectation of another note on the subsequent stronger beat on the same metrical level. The pattern formed by the combination of the (unaccented) anticipation note and the (accented) arrival note constitutes the simplest possible notion of repetition: that of a single note.

"Syncopation" refers to an anticipation that is not followed by the expected note at the next strong (accented) beat. Repetition, anticipation, and syncopation are elements of musical coherence. Both anticipation and syncopation can be applied not only to individual notes, but also to patterns of notes formed by other anticipations and syncopations. In this way, anticipation, syncopation, and repetition combine to form multiple branching possibilities.

"Metrical level" refers to a hierarchical tier within the temporal structure of a piece, where events are grouped according to perceived periodic pulses. Higher metrical levels correspond to slower, broader time spans (e.g., whole notes), while lower metrical levels correspond to faster, more subdivided pulses (e.g., sixteenth notes). Metrical levels reflect the organization of rhythm into nested time scales, with each level typically representing a doubling or halving of pulse frequency relative to adjacent levels.

"Metrical resolution" refers to the fineness of temporal subdivision at a given metrical level, expressed by the number of equally spaced pulses or events within a reference span (such as a bar). Higher metrical resolution indicates finer subdivisions (e.g., sixteenth notes), whereas lower resolution corresponds to coarser subdivisions (e.g., whole notes). Metrical resolution is inversely related to metrical level: as metrical level increases (toward broader, slower pulses), resolution decreases; as metrical level decreases (toward finer, faster pulses), resolution increases. For example, consider five metrical levels in one bar of music. Respectively, the five levels consist of: one whole note, two half notes, four quarter notes, eight eighth notes, and sixteen sixteenth notes. The whole note level is the highest metrical level and has the lowest resolution (one note). The sixteenth note level is the lowest metrical level and has the highest resolution (sixteen notes).

"Attack" may refer to the moment at which a musical note or event begins. The attack may be characterized by the timing, force, and articulation with which the note is initiated. In the context of rhythmic or melodic structures, an attack may serve as a time marker for the beginning of a musical event, independent of its subsequent duration or dynamics.

"Attack vector" may refer to a structured sequence or collection of attacks, which may represent a pattern of note onsets over time. An attack vector may encode information about the relative timing, ordering, and grouping of note beginnings without necessarily specifying pitch, duration, or dynamic information. Attack vectors may be used to define rhythmic patterns, temporal structures, and forms of musical organization at various metrical levels and resolutions.

"Rhythm" may refer to the temporal patterning of musical events, characterized by the timing, duration, and spacing of notes or sounds relative to a pulse or meter. Rhythm may be perceived through the sequence and accentuation of attacks and silences, and may exist independently of pitch or harmonic content. Rhythmic structures may organize events across time and may be fundamental to the perception of musical form, motion, and coherence.

"Pitch" may refer to the perceived tonal height of a musical note, determined by its fundamental frequency. Higher frequencies may correspond to higher perceived pitches, and lower frequencies may correspond to lower perceived pitches. Pitch may provide the basis for melody, harmony, and tonal organization within a musical composition, and may be combined with rhythmic information to define musical patterns.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, the methods and systems described herein provide new ways to perform, compose, listen to, and otherwise interact and engage with music, musical patterns, and other data. Specifically, the methods and systems described herein enable analyzing, mapping, tagging, combining, manipulating, and otherwise working with and modifying data sets.

Development applications include but are not limited to retail music products, recorded music, video games, augmented reality, virtual reality, sound design, lighting design, audiovisual, visual design, and other data-related endeavors.

Potential end users exist along a spectrum including but not limited to casual music listeners and video gamers; aspiring music producers and performers; professional music composers and sound designers; lighting designers; graphic designers; software developers; and a variety of musical and non-musical data users.

The methods and systems described herein utilize input data, which may be in the form of data such as music patterns, parameter settings, user inputs, and the like; performs operations on these inputs which may include but are not limited to data analysis, data tagging, data mapping, data transformation, data synthesis, data transmission, and the like; generates new and/or modified data which may incorporate any or all of the input data along with variations, permutations, etc.; and makes the original or new data available as outputs in one or more forms.

The methods and systems described herein may be embodied as one or more co-processors that handle low-level musical details and decisions, and give the user control of higher-level concerns (mood, intensity, etc.). This reduction of the dimensionality of music creation and performance allows users to instinctively create new music, or change pre-recorded music, in real time. In other words, the user may create music to suit their own preferences, using mainly their intuition, without the technical skill set and musical knowledge normally required to play a musical instrument.

For example, instead of performing by playing individual notes, a user may perform by generating and playing patterns (i.e., groups of notes). Instead of sound recordings in which the musical content is immutable, the musical content may be adjusted and varied in real time to suit the needs and preferences of the user, context, application, etc. Instead of game music that repeats audio loops which contain static musical content, the musical content may be varied in nearly limitless ways based on user actions and other game parameters.

A set of musical pattern data gathered from one or more sources can be examined, analyzed, interacted with, played, combined, and otherwise manipulated by the user. Accordingly, the user has many options for controlling multiple aspects of the musical output and can improvise (spontaneously create and perform) musical patterns simply by manipulating input controls.

Control of the individual notes within a pattern is traded for control over a spectrum of variations of that pattern, possibly interpolated with other patterns. Importantly, the variations generated by the system remain recognizably related to the input patterns. These variations form a nearly limitless fine-grained spectrum that may be navigated by the user.

The methods and systems described herein may utilize real time feedback loops in which the user can hear the effect of their inputs in varying the patterns which are output. Accordingly, the methods and systems described herein may produce relatively complex patterns from simple operations, thereby putting fine-grained music improvisation similar to that practiced by skilled musicians within the reach of users with a wide range of skill levels. The user may enjoy benefits and flow-state experiences that would normally only be available to a trained musician. The system also allows trained musicians and other music professionals to perform and create music in new and more efficient ways.

Potential input controls range from a single slider or knob at the simplest level, all the way up to a control surface with multiple keys, pads, sliders, knobs, or other controls. The user has many options along that spectrum from simple to complex controls, which they can select depending on their capacity, requirements, and preferences. An alternate spectrum of controls may use inputs from the user's body, environment, spatial position or movement, GPS locations, calendar events, voice commands, game player movements, etc. Virtually any data stream, set, or source may be used as a control input, either by itself, or in combination with others. Accordingly, the methods and systems described herein may facilitate the concurrent repurposing or dual use of musical data inputs or outputs to control other musical and non-musical devices and/or reduce or convert musical pattern data to number sets, lists, etc., for use in a variety of contexts.

Technical solutions are disclosed herein for musical and rhythmic analysis and musical pattern generation. Specifically, the disclosed system/method addresses a technical problem tied to music composition technology and arising in the realm of signal processing and musical signal generation, namely the technical problem of generating musical variations based on musical input patterns.

Aspects of procedural media generation may be embodied as a computer method, computer system, or computer program product. Accordingly, aspects of the procedural media generation may take the form of an entirely hardware example, an entirely software example (including firmware, resident software, micro-code, and the like), or an example combining software and hardware aspects, all of which may generally be referred to herein as a "circuit," "module," or "system." Furthermore, aspects of procedural media generation may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of procedural media generation may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of procedural media generation may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally, or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the procedural media generation. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative systems and methods of procedural media generation as well as related systems and/or methods. The examples in these sections are intended for illustration and should not be interpreted as limiting the scope of the present disclosure. Each section may include one or more distinct examples or examples, and/or contextual or related information, function, and/or structure.

A. Illustrative Method for Rhythmic Pattern Analysis and Generation

This section describes steps of an illustrative method 100 for rhythmic pattern analysis and generation; see FIG. 1. Where appropriate, reference may be made to components and systems that may be used in carrying out each step. These references are for illustration, and are not intended to limit the possible ways of carrying out any particular step of the method.

FIG. 1 is a flowchart illustrating steps performed in an illustrative method, and may not recite the complete process or all steps of the method. Although various steps of method 100 are described below and depicted in FIG. 1, the steps need not necessarily all be performed, and in some cases may be performed simultaneously or in a different order than the order shown.

Method 100 as well as other methods and systems described herein use an a priori set of rhythmic patterns, which are referred to as rhythmic building blocks.

In general, these rhythmic building blocks: 1) are generic within binary meter and not specific to any musical composition; 2) represent intersections of anticipation and repetition that may occur within a specific musical rhythm; and 3) are formed via application of generative operations by which the entire set of building blocks may be derived from a single starting point.

Adding a note attack at a time point halfway between existing time points is a common musical means of anticipating the following time point. Each act of subdivision introduces a new offset at a different power of 2 and creates repetition in the sense that every time point in the original now has a twin at the new offset.

There are many different levels at which a rhythm can be congruent, or not, with binary meter. Any pattern formed solely, recursively by combinations of repetition and syncopation at different metrical levels, has branches and offsets (and offsets of branches, branches of offsets, branches of branches, offsets of offsets, and so on). Such a pattern, because of its rules of construction, will form a pattern that is congruent with some combination of levels of binary meter.

In general, while binary musical meter is strictly recursive, typical rhythms may not be recursive to any particular degree. Mapping all of the ways in which a rhythm can contain patterns that are congruent with some subset of binary meter provides a way to understand patterns of potential coherence within that meter.

In other words, this mapping identifies and provides us handles on coherence. "Handles" here means generic, predictable, quantifiable places to identify coherence within a rhythm (namely the rhythmic building blocks described below).

Rhythmic building blocks that encapsulate degrees of simple coherence can be used to measure degrees of rhythmic coherence particular to selected rhythmic pattern inputs.

Analyzing the rhythm of a pattern in terms of rhythmic building blocks captures pattern formation that is recursive. The pattern formation is recursive in the sense that selective subdivision and branching is applied to a basic time point at one or more metrical levels, and to the results of those initial subdivisions and branchings, and then to those results, and so on.

Musical loops in binary meter are an exemplary domain for the rhythmic building blocks, where the loop length is some power of 2 times the highest degree of subdivision (e.g., the shortest note value). The looping patterns typically range from one to four bars of 4/4 time at 16th note resolution, equivalent to 16 to 64 time points.

The term downbeat refers to the first beat of a musical measure. The first time point in the looping duration is referred to as the hyper-downbeat, meaning the first time slot, whether or not the loop happens to be one bar in length; that is, a two-bar loop will have a hyper-downbeat (which also counts as a downbeat) at the beginning of the first bar, and simply another downbeat at the beginning of the second bar. This hyper-downbeat is the strongest beat in the loop, and the strongest point of arrival when looping back to the beginning.

Each level of meter contains alternating strong and weak time points. Each level evenly subdivides each time point at the next higher level into a strong-weak pair. So, each level contains twice as many time points as the level above, within the loop duration.

For instance, consider a domain which is a loop with a duration that is a power of 2, where the index (the power to which 2 is raised) is the number of metrical levels (for example, a duration of 2^5=32, with 5 metrical levels). The first time point in the looping duration is the hyper-downbeat, meaning the first and strongest beat in the loop, and the strongest point of arrival when looping back to the beginning.

The building block consisting solely of a single attack at the beginning of the pattern/loop is the top element in a tree of branching, derived rhythmic building blocks. This building block may be referred to as the root block.

The root block is the only building block not formed by elaborations or syncopations performed on another building block. The input to each elaboration or syncopation is either the root block or a building block formed by applying elaboration or syncopation to another building block, perhaps recursively. All other rhythmic building blocks are therefore the result of elaboration or syncopation (or neither) applied at each metrical level.

Elaboration and syncopation are two possible operations that are applied to the results of previous such operations in order to form the entire tree of building blocks, the combinations of operations which span a spectrum of repetition versus non-repetition and displacement versus non-displacement.

These derivation operations (which may also be referred to as "rewrite rules") form a simple generative grammar that connects flattened surface patterns (notes left-to-right on the timeline) with the hierarchically branching expectations nested in binary meter. All inputs and outputs of these operations are rhythmic building blocks as defined below.

The two operations are:

1. Elaborate, which is a repetition of a rhythmic attack via copying and displacing the copy.
2. Syncopate, which is a displacement of a rhythmic attack without copying the original.

Either, or neither, of the operations can be performed at each metrical level. Furthermore, either of the operations can be performed to the output of one or more of the operations at the other metrical levels.

It is useful to first illustrate the two operations by applying them to the root block. First, consider potential operations to the root block at the whole note level in the context of a loop that is two bars of 4/4 in length.

To "elaborate" is to insert an additional attack immediately preceding an attack in the input block at some metrical level. As an example, if the input attack is at position 0, and the metrical level under consideration is the whole note level, elaboration would include adding an attack on the second, weaker whole note time point, at the beginning of the second bar. Instead of a single attack on the hyper-downbeat we now have two attacks: one at the beginning of each bar.

To "syncopate" is to insert an additional attack immediately preceding an attack in the input block at some metrical level and then delete the input attack. Continuing the example, syncopation would include adding a new attack on the second downbeat, as for elaboration, but then deleting the input attack on the hyper-downbeat. The note at the beginning of the second bar raises expectation of a stronger downbeat as we return to the beginning of the loop, but that downbeat does not occur.

The root block is therefore the sole rhythmic building block where no operation was applied at any metrical level.

The immediate descendants of the root block are the blocks where an operation was applied at exactly one metrical level. Their immediate descendants all have operations applied at two levels, and so on. The rhythmic building blocks that form the "leaves" of this tree of relationships are those that have an operation applied at every metrical level and therefore can have no further operations applied.

In general, each operation at a given metrical level is applied to the result of some combination of operations at other metrical levels. The order in which the operations are applied to a particular rhythmic building block does not matter. Since at most a single attack offset is applied at each metrical level, there is no possibility of a collision between the results of operations at different metrical levels. Each elaboration operation at a given metrical level doubles the number of attacks because it makes a copy of the input block and offsets it by the duration of a time point at that metrical level.

The recursive application of these operations gives a self-similar structure to each rhythmic building block as any pairs of attacks, or pairs of pairs, and so on, are exact copies produced by elaboration.

The following are examples of the structural invariance that necessarily emerges from these operations:

If a rhythmic building block has an 8th note anticipation followed by an arrival on the next quarter note (meaning an elaboration was applied at the 8th note level), then every attack that occurs on a relatively weak 8th note position in that rhythmic building block will be followed by an arrival on the next quarter note.

If an attack on a relatively weak quarter note is not followed by an attack on the next half note position (meaning a syncopation operation was applied at the quarter-note level) then no attacks on relatively weak quarter-note positions will be followed by an arrival on the next half-note position (and in fact there will be no time intervals between attacks equal to a quarter note in this rhythmic building block).

Any rhythmic building block with multiple attacks was formed at least in part by elaboration operations that made an exact copy of existing attacks and shifted them in time by a single note value at some metrical level.

In short, each branching structure is formed by a copy and shift operation (elaboration) the results of which then may be further copied and shifted. At each stage more repetition of internal structure occurs, and repetition only occurs at time offsets where a strong time point has been shifted to an adjacent weak time point at some level. And so nested anticipations form an unbroken pattern of repetition across all metrical levels spanning every possible nested symmetry that is a subset of binary meter.

Each rhythmic building block constitutes a stage of construction of binary meter, and there are many branching pathways from the root block containing a single attack to the single building block that fully encompasses binary meter (because it contains all attacks).

Each input pattern's rhythm may be represented by an attack vector consisting solely of 1s and 0s where 1 indicates an attack and 0 represents a non-attack, and whose size is a power of 2. As an example, the well-known knocking rhythm ("Shave and a haircut-two bits") could be represented by the attack vector at 8th note resolution: [1 0 1 1 10

1000 10 1 00 0]. At 16th note resolution it would be (by adding 0s between each position in the previous vector because there are no additional attacks at the 16th note metrical level: [1 000 10 10 100 0 1 0 0 0 0 0 0 0 1 0 0 0 1 000000 0]. This rhythm cannot be represented at quarter-note resolution without losing the attacks that exist only at the 8th note level.

As an example, consider a loop with duration of four 16ths (too short for practical purposes but used here for illustration), meaning there are two metrical levels of alternating weak-strong time points: the 16th note level and the 8th note level. We'll consider only elaborations because the goal is to show how the branching copies perfectly tile each other to gradually encompass all attacks.

Continuing with our example, a loop that is four 16ths long, the root block has the attack vector [1, 0, 0, 0]. Applying elaboration at the 16th note level to the root block produces a rhythmic building block with attack vector [1, 0, 0, 1] because the downbeat has been copied, shifted earlier in time by a 16th and combined with the original. Note that shifting the downbeat earlier in time actually moves it to the end of the loop. Then applying elaboration to this block at the 8th note level produces [1, 1, 1, 1] because the first two attacks have been copied and shifted by an 8th note and combined with the original.

The other path is to first elaborate the root block [1, 0, 0, 0] at the 8th note level producing [1, 0, 1, 0] because the downbeat attack has been copied and shifted by an 8th note. Then applying elaboration to this block at the 16th note level produces [1, 1, 1, 1] because the attacks an eighth note apart have been copied and shifted by a 16th.

Leaving aside syncopation for the moment, we can see that the above operations account for all possible elaborations within two metrical levels. There are 2^2=4 (syncopation-free) building blocks within two metrical levels, because at each level there are two ways to proceed. This extends to n metrical levels where there are 2^n rhythmic building blocks containing only combinations of elaborations.

Formalizing the generative rules that form the rhythmic building blocks, each rhythmic building block at each metrical level is defined by the following method 100, see FIG. 1. The following generative rules may be applied first from the root block (as described above) and/or to each resulting block, thereby constructing a full rhythmic grammar of building blocks, where each rhythmic building block is recursive in the sense that any operation applied at a given metrical level becomes the input to operations at other levels and vice versa.

At step 102, a new block is initiated from another building block, the input block, by applying a displacement at some metrical level that was not yet used at any stage of construction of the input block. That displacement is equal to one note value at a given metrical level (that is, the duration of a whole note, half note, quarter note, eighth note, etc.).

At step 104, all time points in the input block are copied and displaced earlier in time (wrapping around to the end of the loop as needed) by the displacement note value associated with that metrical level.

At step 106, either of the following operations may be performed:

At step 106A an elaboration operation is performed, thereby combining the new time points with the existing time points from the input block.

At step 106B a syncopation operation is performed, thereby retaining the new time points but not include the time points from the input block.

Each rhythmic building block is therefore the outcome of either of these operations at some combination of metrical levels.

These branching possibilities at the rhythmic building block level do not represent compositional decisions. Rather, they are the constraints imposed on rhythmic building block structure to ensure that every rhythmic building block has consistent structure at each metrical level, that is, a single branching (elaboration) or offset (syncopation) operation at each level.

The discussion so far has focused on anticipations, specifically notes attacking at time points that are one note value before a stronger beat. That is, the anticipation is one sixteenth, one eighth, one quarter or one half, before a stronger beat at that metrical level. If we define tick to be the smallest note value under consideration (the lowest metrical level and highest resolution), then anticipations only occur at time points n ticks before the stronger beat, where n is a power of 2.

Rhythmic patterns also may extend in the other (forward in time) direction from stronger beats, where the weaker attack occurs one note value at some metrical level after a stronger beat. We'll call such a weaker attack a departure to differentiate it from an anticipation (which occurs one note value before the stronger beat).

If we only analyze anticipations and ignore departures, the generated results could be biased toward anticipation figures, even beyond what is in the music itself, because we are in a sense assuming the very thing we are looking for. On the other hand, if we measure the occurrences of both anticipations and departures, any bias in the music toward anticipations emerges naturally in competition with measured departures. And in the cases (presumably somewhat rarer) where departures do predominate a musical rhythm (say in a march), the analysis will properly reflect that.

Departures may be somewhat easier to understand because, unlike with anticipations, there is not the situation where the note on a weak beat is associated with a strong beat that is only contiguous if we take into account the wrap-around from the end of the loop to the beginning.

For the purpose of further illustration, consider elaboration applied twice at the same metrical level. Imagine the domain is a loop of four beats at quarter-note resolution (therefore four time points and two metrical levels). At the quarter note level, the stress pattern is strong-weak-strong-weak. At the half note level, the stress pattern is strong-weak. So, there are two nested levels of meter.

For simplicity we'll consider departures, offsets forward in time, from strong beats to weak beats, the reverse of anticipations. Applying elaboration at the quarter note level to the root block would transform [1 0 0 0] into [1 1 0 0]. Applying elaboration again at the quarter note level would transform [1 1 0 0] into [1 1 1 0] (with a collision at the second attack). This rhythmic pattern cannot be perceived as a symmetrical subset of binary meter (it is not even symmetrical). Therefore [1 1 1 0] is not a rhythm that can be represented by a single rhythmic building block; it is a compound structure that requires multiple rhythmic building blocks, and this is a vital aspect of the analysis provided by the rhythmic building blocks. In fact, some of the most "interesting" rhythms, such as bossa nova or other clave-related rhythms, are notable in the fact that they require a higher ratio of rhythmic building blocks to attacks than less syncopated rhythms.

If we applied syncopation twice at the quarter-note level, [1 0 0 0] is transformed to [0 1 0 0] and then to [0 0 1 0]. Each is a valid rhythmic building block, because the second syncopation doubles the first, which means it just changed it into a syncopation at the half-note level. So, the rules aren't about prohibitions on compositional decisions. Instead, they are constraints on structures that can be perceived as combinations of specific operations at mutually exclusive metrical levels.

Given n metrical levels there are 2n immediate descendants of the root block. There are n elaborations with additional time points offset by 2 m for m={1, . . . , n−1} respectively. And there are n syncopations with the same offsets as for the elaborations, but where the original attack is deleted.

The derived blocks also have descendants via the same operations, where the descendants from various blocks may intersect. The number of immediate descendants for a given block is progressively smaller as one gets lower in the tree. The leaf nodes of the tree are those that have no descendants because an elaboration or syncopation operation has already been applied at every metrical level.

While the discussion thus far has been primarily concerned with binary meter, the methods and systems described herein by be applied to non-binary meter such as triple meter or other odd meter. As illustrative examples, the following are methods of extending method 100 to music which incorporates one or more levels of odd meter.

Firstly, the musical material may be preprocessed to remap the time points such that three beats at the applicable metrical levels are compressed into two, and then method 100 may proceed as though the meter was binary.

Alternatively, the arithmetic described herein may be generalized to encompass division by combinations of prime powers that are not exclusively powers of 2.

There are two convenient mappings of the three beats in each bar of 3/4 onto two beats.

1. The first two beats in 3/4 are doubled in speed in order to fit into the first two eighth note time spans in 2/4. The third beat of 3/4 becomes the second beat in 2/4.
2. The second and third beats in 3/4 are doubled in speed in order to fit into the two eighth note time spans occupying the second beat in 2/4. The first beat of 3/4 remains the first beat in 2/4.

In this instance, mapping 2 might be considered a better mapping for musicality, but such choices would require evaluation on a case-by-case basis. In any case the intent is not to make the mapping audible, but rather to map for the sake of analysis, and then reverse map any results derived in terms of that analysis.

In general, if input material is in an odd meter, the data may be converted to binary meter for processing and then converted back to odd meter for output. In some examples, preprocessing material in which the time signature has an odd numerator may include increasing the number of beats to the nearest power of 2. For example, map 3/4 to 4/4

In a strictly binary meter, the weak and strong beats are hierarchically defined. In odd meter, the strong and weak sequence depends on the musical context and multiple mapping options are helpful. For example: When mapping 3/4 to 4/4, if beat 2 is to be treated as the strong beat. Map beat 2 to beat 3 of the 4/4 bar, and beat 3 of the 3/4 bar to beats 2 and 4 of the 4/4 bar. Alternatively, where beat 3 of the 3/4 bar is the strong beat, then keep beat 3 in the 3/4 bar as beat 3 in the 4/4 bar, and copy beat 2 from the 3/4 bar to beat 4 of the 4/4 bar.

While the specific scheme for mapping the odd meter data to binary meter for morphing, scaling, and other manipulation may vary depending on context and user preferences, the resulting binary version of the data may be processed as described throughout this specification. Before output, the binary version of the data may be mapped back to the original time signature. Additionally, or alternatively, the data from the even-metered version may be saved as hidden data attached to the odd-metered data for future processing, or discarded entirely, depending on the context and/or system and user requirements. In general, the methods and systems described herein may analyze the input data and recommend a preferred method of mapping from binary meter to odd meter based on the context. Additionally or alternatively, the user may switch between various approaches to determine which sounds least musically disruptive or most musically coherent.

In general, it is not necessary for method 100 to derive the rhythmic building blocks recursively. To understand this, first consider elaboration in the absence of syncopation. As described above, elaboration in this context refers to a pattern that was copied to some displacement (formed by binary subdivision) and combined with the original time points.

Considering only elaboration, at each metrical level there are two possible operations:

1. Do nothing: Leave the existing time points unchanged.
2. Elaborate: Copy existing time points in the rhythmic building block, offset them by the subdivision displacement represented by that metrical level, and combine with the original time points.

The existing time points referenced above result from operations at other metrical levels. Since there are two mutually exclusive operations at each metrical level, the rhythmic building block can be represented by an n-digit binary number:

1. A 0 in binary place n means that no elaboration was applied at level n
2. A 1 in binary place n means that an elaboration operation was applied at level n
3. Since the rhythmic building blocks span all combinations of these operations across metrical levels there are 2^n rhythmic building blocks represented by integers {0, 1, . . . , 2^n−1}

Next consider syncopation. In this context, syncopation means a pattern that was copied to some offset, deleting the original time points. Syncopation at one metrical level can be applied to the result of any combination of elaborations and syncopations at other metrical levels. At each metrical level there are now three possible operations:

1. Do nothing: Leave the outcome of operations at other metrical levels unchanged
2. Elaborate: As described above
3. Syncopate: Elaborate but remove the original time points With three possible operations at each metrical level, the rhythmic building block can now be represented by an n-digit ternary number:

1. 0 in place n means that neither elaboration nor syncopation was applied at level n
2. 1 in place n means that elaboration was applied at level n
3. 2 in place n means that syncopation was applied at level n Since the rhythmic building blocks span all combinations of these operations across metrical levels there are 3^n rhythmic building blocks represented by integers {0, 1, . . . , 3^n−1}.

The block represented by the binary integer n has a pattern of time points matching the positions of odd binomial coefficients on the nth row of Pascal's triangle. Recalling the complete set of building blocks described earlier for two levels of binary meter, where the displacements are forward in time from stronger beats (interpreted as departures rather than arrivals):

[1 0 0 0]
[1 1 0 0]
[1 0 1 0]
[1 1 1 1]

The first four rows of Pascal's triangle are:

1
1 1
1 2 1
1 3 3 1

We can view the odd entries by displaying the values modulo 2:1

1
1 1
1 0 1
1111

Note that when each row is padded with trailing 0s to a uniform length of 4, the rows match the attack patterns of the four building blocks shown above.

Now convert the attack vectors to equivalent attack lists (starting from time 0):

0) [0]
1) [0, 1]
2) [0, 2]
3) [0, 1, 2, 3]

Then convert the numbers all to binary:

00)
01) [00, 01]
10) [00, 10]
11) [00, 01, 10, 11]

Each attack in each list has a subset of the 1*s* in the row number of that block. For instance, row 0 (00 in binary to two places) has no 1s, and therefore the only possible attack has no 1s in any binary place, namely 0. Whereas the attacks in row 1 (01 in binary to two places) can have only a 0 in the first binary place, but either a 0 or 1 in its second place, giving 00 and 01 (or 0 and 1 in decimal). And the attacks in row 2 (10 in binary) can have a 1 or 0 in the first binary place but only a 0 in the second binary place giving 00 and 10 (or 0 and 2 in decimal). Finally row 3 (11 in binary) can have a 1 in either binary place giving 00, 01, 10, 11 (or 0, 1, 2, 3 in decimal).

Accordingly, the row numbers encode the application of elaboration operations for each rhythmic building block: each 1 in the binary representation of the row number means that elaboration is applied at the metrical level corresponding to that place in the binary number.

Since syncopation within a rhythmic building block can only occur at metrical levels where elaboration was not applied, this binary encoding can be extended to a ternary encoding where a 1 at a ternary place indicates elaboration at that metrical level and a 2 at a ternary place indicates syncopation at that metrical level.

Using the example above consider the rhythmic building block in row 1 above: [1, 1, 0, 0]. If we syncopate this block at the 16th note level we have [0, 1, 1, 0] where the attack at time 1 (counting from 0) is in both the input and output. This ambiguity undermines coherence because we've already applied elaboration at the 16th note level. This is specifically what the prohibition against two operations applied to the same metrical level within a particular rhythmic building block prevents from happening.

But note that no operation has yet been applied at the 8th note level. Therefore, the pattern [1, 1, 0, 0] can be syncopated at the 8th note level with no collisions between attacks in the input and output of that operation: [1, 1, 0, 0] goes to [0, 0, 1, 1]. This is also why the results of this shift can be combined with the original to produce [1, 1, 1, 1] as an elaboration.

Notice that row 0 can be syncopated to any offset because it has used no metrical levels for elaboration, and conversely that row 3 cannot be syncopated anywhere because it has already used every metrical level for elaboration.

Iterating through ternary integers therefore traces every path of trade-offs between syncopation and elaboration to produce a spectrum of rhythmic configuration that incrementally flesh out structures that are symmetrical and congruent with binary meter.

Parallelism emerges as the result (e.g., output) becomes the input to a subsequent elaboration operation. Any elaboration or syncopation operation preserves parallelism and, in the case of elaboration operations, increases it. This internal pattern formation creates repetitive, nested, symmetrical, anticipation figures that map directly to structural aspects of binary meter.

As noted above, the attack vectors above result from shifts from a strong beat to the next weak beats. Anticipations on the other hand are shifts from a strong beat to the previous weak beat. Therefore, rhythmic building blocks that trace anticipatory evolution would have attack vectors like the following:

0) [1, 0, 0, 0]
1) [1, 0, 0, 1] (note the shift from time 0 to 3, which immediately precedes 0 in a loop)
2) [1, 0, 1, 0]
3) [1, 1, 1, 1]

Each rhythmic building block is identified with an integer address. The address encodes the time points of the rhythmic building block, as will be explained in a later section. The number of rhythmic building blocks for a duration of 2ˆn is 3ˆn, and the addresses are in the range [0, 1, . . . , 3ˆn−1].

Figure 2:
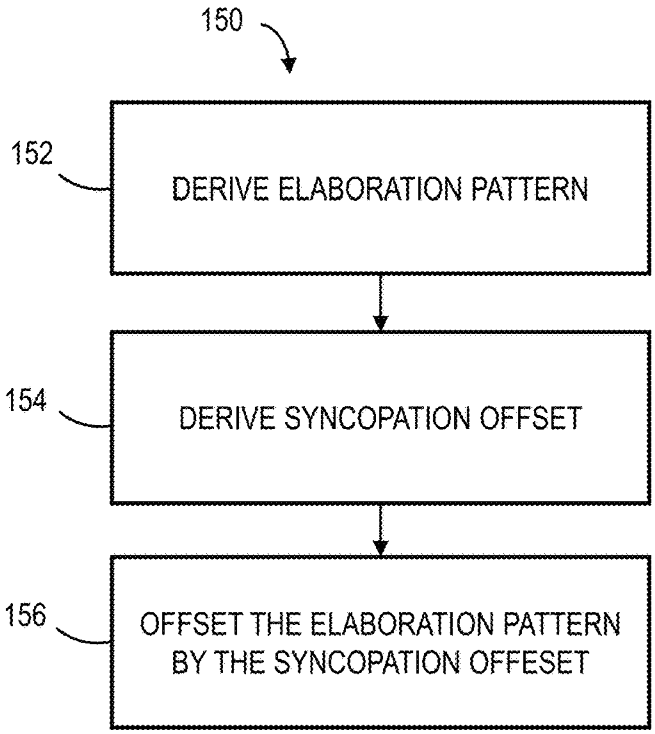
FIG. 2 is a flow chart depicting steps of an illustrative method for rhythmic pattern analysis and generation utilizing ternary integers according to the present teachings.

FIG. 2 is a flowchart depicting an illustrative method 150 for rhythmic pattern analysis and generation utilizing ternary integers {0, 1, . . . , 3md n−1} for n metrical levels. Where appropriate, reference may be made to components and systems that may be used in carrying out each step. These references are for illustration, and are not intended to limit the possible ways of carrying out any particular step of the method. In general, method 150 is substantially similar to method 100, except in the differences described below.

FIG. 2 is a flowchart illustrating steps performed in an illustrative method, and may not recite the complete process or all steps of the method. Although various steps of method 150 are described below and depicted in FIG. 2, the steps need not necessarily all be performed, and in some cases may be performed simultaneously or in a different order than the order shown.

Step 152 of method 150 including deriving an elaboration pattern by substituting any 2s with 0s in the ternary integer n and interpreting the result as a binary integer m. This pattern of time points corresponds to the pattern of odd coefficients on the $m_{th}$ row of Pascal's triangle. Alternatively, step 152 may include forming a pattern of time points by including every time point whose position, when represented as a binary number, contains either 1 or 0 in each place occupied by a 1 in m, and contains only 0s in the places occupied by a 0 in m.

Step 154 of method 150 includes deriving the syncopation offset by substituting any 1s with 0s in the ternary integer n and interpret the result as a binary integer m.

Step 156 of method 150 includes offsetting the elaboration pattern by the value m. The possible values of m for any given elaboration seen on row p of Pascal's triangle will match the positions of odd binomial coefficients on row q of the Pascal's triangle, where q=(loop_duration-p) mod loop_duration.

Once a set of time points has been parsed into building blocks, various comparisons and characterizations can be made based on the Sierpinski triangle addresses and Pascal's triangle row numbers of those blocks. In general, patterns that are less congruent with binary meter get proportionally more representation because less compression into building blocks will be achieved on such content.

As used herein, the term address refers to Sierpinski gasket address, generator means Pascal's triangle row number, and offset means Pascal's triangle column number. "Generator" is used because that is the number that determines the branching that forms the basic pattern (the positions of odd binomial coefficients on some row of Pascal's triangle), each of which can be moved to zero or more offsets.

For duration d=2^n for n metrical levels:

0<=address <3^n

0<=generator <2^n

0<=offset <2^n

As above, address here means an encoding for a rhythmic configuration that consists of an unsyncopated pattern defined by a binary generator and a binary offset together mapped to a ternary address:

| generator | offset | address |
|---|---|---|
| 0 | 0 | 0 |
| 1 | 0 | 1 |
| 0 | 1 | 2 |

In general, the following aspects of the rhythmic building blocks generated with method 100 and/or method 150, depending on binary and/or ternary integer mappings, arise due to the methods described herein.

The number of attacks in a building block is equal to 2 raised to the number of 1's in the address of that building block, or equivalently, 2 raised to the number of 1's in the generator. Each 0 represents an elaboration where each attack is replaced by two attacks. Each elaboration operates on all attacks resulting from any previous elaboration. Therefore, the number of attacks doubles upon each elaboration.

No anticipation-based building block will contain an attack that is closer in time to a preceding, metrically stronger, attack than it is to a subsequent, metrically stronger, attack. Each new attack is generated by one time-division, at a particular metrical level earlier than an existing attack, and so it is never displaced more than half-way to any preceding attack at that metrical level. No building block could generate an attack in that time-division immediately following that preceding note without violating the constraint against multiple operations at a single metrical level. Therefore, any new attack occurs at least halfway between any existing two attacks on stronger beats.

The place of 1's within the address of a building block determines how widely spaced attacks or groups of attacks will be within that building block. A 1 that occurs in place p represents more widely spaced times than those determined by a 1 that occurs at place q if p>q, counting places from the right (from the least significant digit). Numbering places starting at 0 for the 1's place, by definition a digit within an address corresponds to operations at a higher metrical level than those represented by a digit at a lower place. By item 2 above, no attack occurs less than half-way between any existing two stronger attacks. Therefore, the larger time-divisions will push attacks or clusters of attacks progressively closer to the midpoints of timespans between strong beats at higher metrical levels.

Two building blocks represented by addresses which have a 0 and 2, respectively, at the same place, will not share any attacks. Since only a single building block is permitted at a given metrical level, an attack displacement only has one opportunity to incorporate a time-division at a particular metrical level. Therefore, a 0 at some place in the address indicates that the power of 2 corresponding to that metrical level will not be incorporated in any attack displacement of the building block represented by that address. On the other hand, a 2 at that place in an address indicates that that power of 2 is incorporated into every attack in that address's corresponding building block. Since two attacks are equal only if they are composed of the same powers of 2, no attacks in the first building block can equal any attacks in the second building block. Similarly, by reverse logic, any building block represented by an address that contains a 1, can be broken into two building blocks represented by addresses that contain a 0 and 2 respectively at the place previously occupied by that 0.

Two addresses which are identical except for one place, which has value 0 and 2 for the two addresses, respectively, represent building blocks that can be combined into a single building block, with double the number of attacks of either original building block, by placing a 1 at the place previously occupied by the 0 and 2, respectively. Assume that two addresses are equal except for a single digit, which is 0 in the first address and 2 in the second. By item 4 we know that the corresponding building blocks share no attacks, and by item 1 we know that they have the same number of attacks. The 2 indicates that a syncopation operation was applied to the corresponding metrical level in the second building block, while the 0 indicates that no operation was applied at that metrical level in the first. Therefore, the application of an elaboration operation at that metrical level would subsume both building blocks into one, as all other derivation steps were identical.

Two addresses which are identical except for one place, which has value 1 and 2 for the two addresses respectively, represent building blocks that form a rhythmic echo if that place is higher than any place containing a 1, or a hocket otherwise. As described above, the building blocks corresponding to those addresses each form one-half of a potential elaboration.

If the metrical level at which that elaboration operation is applied is higher than that of any other elaboration operation in the building block, then one time-division at the metrical level is longer than either of the building blocks. Therefore, they will be placed after the other with no overlap, forming an echo. Otherwise, if the building blocks are partly the result of elaboration operation performed at a higher metrical level than the place which differs between the two, then one time-division at the metrical level corresponding to that place is shorter than either rhythm, causing them to overlap, forming a hocket.

Within a particular duration, the number of building blocks is small in relation to the number of all possible rhythms. At most d/2 building blocks are required to fully dissect any rhythm with an overall duration of d, where d is a power of 2, as building block represented by an address with a 2 at some place shares no attacks with any building block represented by an address with a 0 at that same place. Accordingly, there are d log 2-1 places then for which 2^(d log 2-1) different possible address pairs exist where there is at least one place occupied by a 0 in one address and a 2 in the other.

The reason that the full set of d log 2 places is not necessarily considered is because two building blocks whose respective addresses differ from each other solely by a 0 versus 2 at the same place can be subsumed into a single building block, as described above. All possibilities where the remaining digits are not the same are accounted for in the 2^(d log 2-1) possible address pairs above. Therefore, 2^(d log 2-1)=d/2 is the maximum number of disjunct, non-subsumed addresses that can exist within duration d. And therefore any rhythm within that duration can be parsed by at most that many addresses.

B. Illustrative System for Procedural Media Generation

Figure 3:
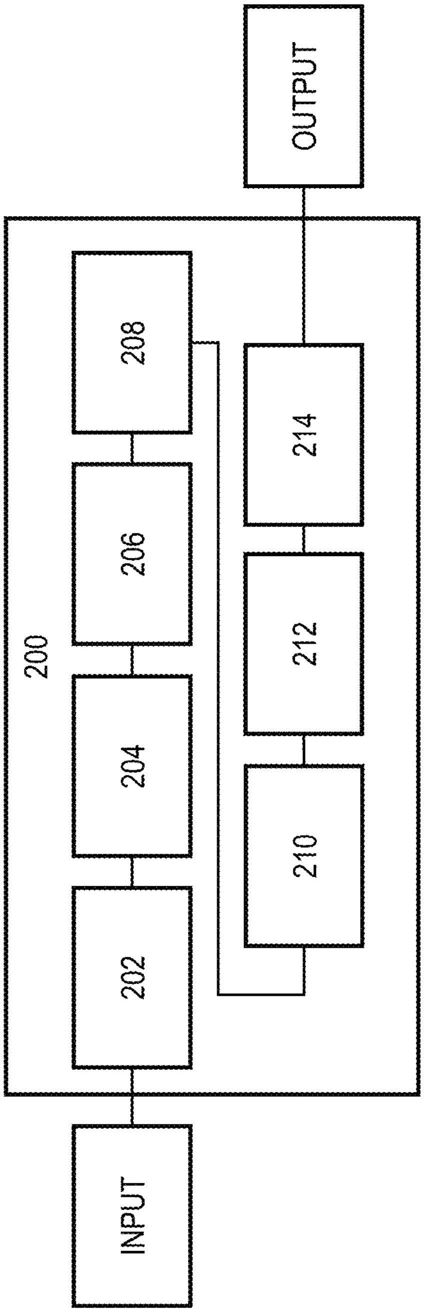
FIG. 3 is a schematic diagram of an illustrative system for procedural media generation according to the present teachings.

As shown in FIG. 3, this section describes an illustrative system 200 for procedural media generation. The methods 100 and/or 150 of rhythmic structural analysis and generation outlined above may be used in system 200, e.g., to measure musical patterns and reduce the measurements to data sets. These data sets may be used to analyze, compare, combine, and otherwise manipulate musical patterns with greater ease and efficiency than may be possible with traditional musical notation or other representational methods.

In general, system 200 is configured to analyze, manipulate, generate, and transform data in music, audio, visual, and other contexts. It enables intuitive, high-level interaction with complex patterns across creative and technical domains. By mapping data patterns onto a predefined rhythmic grammar, it produces vector-based representations that reflect structural alignment with known building blocks. Operating in the time domain with linear weighting, the system supports both analysis and reconstruction.

System 200 utilizes an underlying rhythmic pattern representation referred to as rhythmic potentials with variable weights, enabling a continuous encoding of rhythm rather than relying on fixed temporal markers. Central to this approach are the Rhythmic Building Blocks (RBBs), described above with respect to methods 100 and 150, which form modular and nested structures analogous to chords or triads in harmonic theory. These building blocks reflect with how repetition and anticipation shape human perception of rhythm, allowing patterns to be analyzed and regenerated using a compact structural grammar. This grammar supports efficient storage, transformation, and real-time manipulation of rhythmic content.

Although rooted in music and audio, the system's underlying principles extend to fields that involve the timing, sequencing, or coordination of temporal, spatial, or otherwise organized events. These applications include, but are not limited to, interactive media, live performance, gaming, film, video, music education, music research, and audio product development.

By deriving rhythmic potentials, the system transforms discrete rhythmic events into continuous values. It achieves this by placing rhythmic data within a contextual window and mapping it against an underlying structural framework. This process enables smooth transitions between patterns and unlocks new modes of signal manipulation. Multiple overlapping contextual windows may be employed to enable user to compare or switch between options which may lead to different creative or technical outcomes. Real-time operability is central to some embodiments of this system, allowing performers, producers, and developers to interact with rhythm as a dynamic, continuously variable signal.

The system enables morphing and scaling patterns to create musical variations. As well as to generate time-based effects such as delays or echoes derived from the shape or even the negative values of a rhythmic potential. These rhythmic potentials can also be segmented into ranges or bands, then routed to different processing paths, effects chains, or stems, supporting a wide array of creative workflows. These potentials can further be used as modulators in synthesis and processing or shaped by other control signals like low frequency oscillators (LFOs). Together, these capabilities establish a flexible environment for creative exploration, offering a new workbench of rhythm-based interaction and transformation within music and audio systems.

The system's novel approach addresses a longstanding gap in rhythm theory and practice. Rhythmic potentials, which influence musical structures across cultures, have remained computationally inaccessible due to the complexity of their extraction and application. Only with modern computing hardware have these structures become available for real-time use in performance, production, and interaction. The system provides deeper structural control over rhythm, grounded in how humans internalize, anticipate, and respond to temporal patterns.

This enhances multiple technical processes related to real-time pattern analysis and generative control while improving system efficiency by enabling improvisational handling of structured temporal data. In addition, the system may support specialized file formats for storing enriched or compressed data derived from rhythmic potentials, transient patterns, and structural timing features. These formats enable flexible and efficient storage, sharing, and reuse of musical content. Files generated in this format may include rhythmic potentials data, references to rhythmic building blocks, and other structural information. When decoded or reinterpreted, they may allow for the reconstruction of rhythmically coherent content that reflects the original material's underlying structure, sometimes without requiring an exact reproduction. These file formats may function as symbolic compression mechanisms, conceptually similar to musical notation but capable of encoding rhythmic structure in ways that support transformation, reuse, and interoperability. Alternatively, these formats may function as enriched data structures that store additional contextual and structural information beyond existing formats, offering a richer structural and contextual model of rhythm.

Applications extend beyond music and audio into fields such as video production and editing, where synchronization between audio and visual elements is essential; animation and motion design, where temporal sequencing and pacing are critical; robotics, motion capture, and human-computer interaction, where real-time coordination of actions or gestures benefits from modeling temporal structure; and data visualization or generative systems, where patterns evolve over time or space. In each of these domains, the ability to represent and manipulate structural relationships with greater continuity and expressiveness may enable new forms of interaction, creative output, and system behavior.

The system accepts input data such as MIDI, audio, or other temporally structured sources, and analyzes it to extract temporal patterns and other relevant contextual information. It then generates a continuous representation of rhythmic potentials that captures latent structural features. This output can be used directly within the system and/or routed to external creative, perceptual, or control systems. Optionally, users or automated agents can manipulate the output to create new data, which may be saved to a new or updated file, output in real time to speakers or other perceptual devices, fed back into the system for iterative refinement or variation, or any combination of these or other workflows.

In general, system 200 includes the following modules: an input module 202 which is configure to accept input, such as structured data (e.g., MIDI, audio, control signals), and/or unstructured data (e.g., analog audio input streams, etc.), an analysis module 204 which is configured to derive any necessary contextual information (e.g., BPM, time signature, etc.) from the input data, a rhythmic building block weight calculating module 206 which is configured to calculate/convert the input data (i.e., rhythm/melody information) into weighted rhythmic building blocks (e.g., such as those described above with respect to methods 100 and 150, a data morphing module 208 which is configured to calculate weighted averages of the rhythmic building blocks (e.g., those calculated by module 206) to produce morphed building blocks, a rhythmic potential calculating module 210 configured to generate rhythmic potentials from the morphed building blocks, and a rhythm generating module 212 which is configured to apply a threshold to the rhythmic potentials to determine attacks to be used in an output rhythmic variation 214. In some examples, the output rhythmic variation 214 may comprise a musical variation, e.g., by mapping pitches or other musical quantities (such as, for example, an instrument mapping, a voice mapping, or an effect parameter) to the rhythmic attacks, as described below.

The above described modules of system 200 and the respective use thereof are detailed below. In general, the features, methods, and processing techniques described below may be performed by one or more of the above-described modules, as understood by those skilled in the art, however some features, methods, and processing techniques described below may be accomplished through any combination of the above described modules, either in isolation or combination with one another.

This system represents, manipulates, translates, and transforms rhythm-related data. This method primarily targets the fields of music composition, performance, audio production, and sound design. It employs novel computational processes to convert rhythmic data which is originally represented in binary or discrete formats into continuous parameters. These continuous rhythmic values enable practical, expressive interaction and manipulation within the primary domains of music and audio.

This system further facilitates translating and repurposing rhythmic data into secondary domains, including but not limited to visual media, video production, interactive media such as gaming, multimedia synchronization, and live performance technologies. The continuous rhythmic representations, expressed as normalized control signals between values of 0 and 1, allow intuitive and meaningful repurposing of rhythm-derived data as control signals for systems and devices in these secondary contexts.

Additionally, this system supports the reverse translation process, whereby continuous-valued data signals from external domains (visual, sensor-based, robotic, etc.) are normalized contextually and transformed into rhythmically coherent data suitable for music and audio applications. This two-way capability significantly expands the expressive and functional integration possibilities across technical and creative disciplines.

In scenarios involving irregular or seemingly random binary rhythmic data, the system may optionally employ an inference process to generate multiple candidate rhythmic contexts. These contexts may include parameters such as tempo, time signature, and rhythmic patterns and can subsequently be reviewed and selected by human users or by automated systems.

While latency considerations are context-dependent and not central to the system's core novelty, the system employs efficient algorithms to support real-time applications where latency is within tolerance acceptable to the specific user and application context.

The system accepts a wide range of input data types from both real-time and non-real-time sources. The primary input data types may include MIDI, OSC (Open Sound Control), or other symbolic event data (such as note-on/note-off events, velocity, and timing) and digital audio data (such as audio waveforms, transients, and amplitude envelopes). These formats are commonly used in music composition, performance, and production environments.

Secondary and supplemental input types include data derived from visual media (e.g., motion patterns, frame-based timelines), sensor-based systems (e.g., gesture recognition, motion tracking), location-based data, structured data formats such as XML or JSON containing temporal or sequence information, or any data which may be used as input or control data. Additionally, the system may receive binary event sequences or continuous control signals from oscillators, automation curves, or external control interfaces, which can be used to adjust internal parameters dynamically. The system may also accept timing-based input derived from interactive systems such as video games, where player actions or in-game events reflect rhythmically meaningful sequences or trigger conditions.

The system supports input from a variety of hardware and software sources, including MIDI controllers, digital audio workstations (DAWs), audio interfaces, microphones, sensor arrays, motion capture systems, and external control software. It also accepts input from pre-recorded or imported media, including MIDI files and digital audio files. This broad compatibility enables the system to operate effectively across a wide range of technical and creative workflows.

Output data from the system may be used as new input data for the system creating an iterative process of continually expanding and evolving input data. For example, output patterns can themselves be used as input patterns.

For example, the input data may be in the form of a musical pattern. As mentioned previously, the term musical pattern (or simply pattern herein) refers to a series of musical notes. These patterns typically, but not exclusively, contain both a rhythm and melody, and exist within the context of a larger musical composition. In some examples, the input data set may itself be split into multiple data subsets or data layers which may be stored, analyzed, and processed separately whether in parallel or otherwise. These data layers may be recombined or may be otherwise caused to interact during operations and/or output.

For example, data from a pattern of musical notes may be split into layers including but not limited to attack points, pitches, melodic contour, velocities, accents, and the like. Data from one layer may then be transformed for use within a different layer during operations and/or output. For example, a data set representing a pattern of note accents may be transformed into a data set representing a pattern of note attacks. The resulting new attacks data set may then be interpolated with the original attacks data set and/or another attacks data set.

Musical pattern inputs may be analyzed as repeating segments or "loops", where the final time point immediately precedes the first time point. The loops have duration n, where n is measured in note durations (typically 16th notes, referred to as 16ths hereafter) at the highest resolution (most subdivided) metrical level.

In some examples, the duration n must be a power of 2, where the power or "index" is the number of metrical levels under consideration for the given pattern. For instance, two bars of 4/4 at 16th note resolution may be considered as a loop with five metrical levels and therefore a duration of 2 ^5=32 16ths.

The system performs a pre-processing stage on incoming temporal or control data to prepare it for further rhythmic analysis and transformation. This stage operates on user-specified files or real-time signals and evaluates the type and structure of the input data to determine the appropriate conversion steps. These may include transposition, data formatting, and normalization procedures.

The goal of pre-processing is to produce a consistent internal representation of the input as either binary rhythmic data (e.g., event on/off indicators) or continuous data values normalized to a range between 0 and 1. This standardization ensures compatibility with the system's downstream computational processes.

Pre-processing may perform rhythmic segmentation, pattern inference, or contextual interpretation. If input data includes associated contextual information such as pitch, harmony, or metadata relating to phrase structure or timing, this information may be retained by the system for possible use in subsequent processing stages. In this way, the system remains context-aware without introducing unwanted biases during pre-processing.

Following pre-processing, the system optionally applies existing algorithms in the fields of music information retrieval (MIR) and audio signal processing to infer contextual information that may not be explicitly present in the input data. This may include parameters such as tempo (BPM), time signature, key, scale, phrase boundaries, and other structural attributes relevant to rhythmic interpretation.

Where such information is missing or ambiguous, the system may infer multiple plausible scenarios by applying these algorithms under different assumptions. Each scenario may result in a distinct version of the input data, enriched with inferred parameters. These alternate data sets may allow the system user to evaluate multiple interpretations.

The output of this computational step is one or more rhythmic data sets in which each version adheres to a common structural format. Regardless of whether parameters were user-specified or inferred, all versions are normalized to the degree required for further processing. This ensures that subsequent processing operations can treat all data sets on equal footing, enabling comparative analysis, user-driven selection, or hybrid manipulation across interpretations.

These normalized representations form the basis for the system's subsequent novel processing stages, which operate on structurally coherent, context-aware input data.

Following the generation of normalized rhythmic data sets, the system proceeds to apply its core novel processing techniques and algorithms. At this stage, the system analyzes the data and generates rhythmic potentials.

The system may perform data analysis, data tagging, data mapping, data transformation, data synthesis, data transmission, and the like on the input data. For example, analysis of particular musical rhythm pattern is described below.

The system analyzes input pattern rhythms first and then analyzes other note parameters including pitch.

A rhythm in n metrical levels can be analyzed in terms of its rhythmic building blocks. Each rhythmic building block in the spectrum of blocks defined above represented by integers {0, 1, . . . , 3^n−1}, where each integer is called an address, contains time points which may or may not coincide with attacks in the rhythm.

An activations vector of length 3^n−1 stores in entry i the fraction of time points that coincide with actual attacks in the input rhythm in the block with address i. This analysis captures the degrees to which each of a spectrum of recursive patterns corresponding to schematic expectations accounts for the pattern formation within the rhythm pattern.

The activations vector can be used to derive a rhythmic potentials vector (which may sometimes be referred to as a "potentials vector" or "rhythmic potentials"), which assigns a likelihood of an attack at each time point in a rhythm generated from the vector. Given n metrical levels, a rhythmic potentials vector has 2^n values, all initially set to 0.

Each value in the rhythmic potentials vector represents how much attack likelihood should accrue to each of the set of time points represented by that rhythmic building block. That is, each position in the potentials vector is the sum of the activations of all building blocks that contain the time point represented by that position in the vector.

For example, it might be that the rhythmic building block has four time points, of which three correspond to attacks in the original rhythm. In that case each of the four time points represented by the rhythmic building block will receive additional potential of 0.75.

The ambiguity introduced by spreading activation evenly across time points provides space for generalization but is resolved once all rhythmic building blocks and their associated activations are applied together in the construction of the rhythmic potentials vector.

The rhythmic potentials vector now contains a value between 0 and 1 for each time point in the rhythm. The original rhythm was represented by an integer vector of 1s and 0s, indicating attacks and non-attacks respectively.

The rhythmic potentials vector contains real number values between 0 and 1. These values express how much expectation there is of an attack at that time point based on the complete set of attacks in the input rhythm.

The system performs an analysis on each input pattern to identify and measure correspondence between that pattern and each rhythmic building block. A weight or value is associated with each rhythmic building block within each input pattern.

This process forms the foundation for advanced manipulations and transformations that distinguish the present disclosure from prior methods.

Further technical detail regarding the specific mechanisms, models, or processing frameworks used in this stage may be elaborated in subsequent sections or embodiments.

To some degree, whether or not a note exists is a consideration that takes precedence over what pitch the note may have. The system algorithm determines how much influence pitches at various attacks will influence the pitch at a given attack.

Melodic pitches are determined for each attack in the generated rhythmic variation. Distance measures determine a new pitch based on existing pitches in the melody. Alternately the distance measures can be applied to pitches in the input patterns.

The distance measure averages linear distance on the timeline with nonlinear difference in beat strength. Those two components (linear, nonlinear) may be weighted differently depending on the type of part being interpolated.

For example, for lead melodies the linear (time) distance may be given more weight. For bass lines the nonlinear (beat strength) distance may be given more weight.

For drum kit notes and counterpoint in general pitch may be determined together with rhythm.

Specifically, the distance measure is a weighted average of the raw time distance (|t2-t1|) and the number of binary bits in that raw time distance.

Similar calculations may be done for other layers or parameters, for example velocity and duration.

The pitch selection described above is more precisely described as scale-step selection, where scale step is defined here as the zero-based index of that pitch within the ordered ascending pitches that belong to a specific mode of a specific diatonic set.

To determine which mode of which key best fits a particular melody, the pitches of that melody are compared to a list of mode-step weights, such as:

```
modeStepWeights=[
[7, 0, 4, 0, 6, 4, 0, 6, 0, 4, 0, 4],
[4, 0, 7, 0, 4, 6, 0, 4, 0, 6, 0, 4],
[4, 0, 4, 0, 7, 4, 0, 6, 0, 4, 0, 6],
[6, 0, 4, 0, 4, 7, 0, 4, 0, 6, 0, 4],
[4, 0, 6, 0, 4, 4, 0, 7, 0, 4, 0, 6],
[6, 0, 4, 0, 6, 4, 0, 4, 0, 7, 0, 4],
[4, 0, 6, 0, 4, 6, 0, 4, 0, 4, 0, 7]
```

Each line of the modeStepWeights table above contains a weight assigned to the pitch class represented by successive indices on a given line. Pitch class means pitch modulo 12. That is, if we are considering the key of C, the successive columns refer to pitch classes 0 through 11.

For the key of F, the pitch classes represented by the respective columns represent pitch classes 5, 6, 7, 8, 9, 10, 11, 0, 1, 2, 3, 4. In general the pitch class represented by each column is (n+i) mod 12 for i={0, 1, . . . , 11} and 0<=n<12.

The numbers shown in the table indicate the weight given to each ordered pitch class for the mode represented by that row. Notice there are seven rows and twelve columns; this is because there are seven modes and twelve pitch classes. What the table tells us is how much weight we would expect a (possibly transposed) pitch class within a given mode to have.

Each 0 indicates a non-scale tone (a pitch class outside the diatonic set, and therefore corresponding to no scale step). For instance, in the key of C major, the non-zero-valued columns refer to C, D, E, F, G, A, B (scale-steps 0 through 6) respectively and the zero-valued columns refer to C#, D #, F #, G #, A #(non-scale-steps).

In each case, in the example shown here (though the exact weight values could vary in particular implementations) the strongest weight is 7. That weight applies to the "tonic" of the mode (C for C lonian (major), D for D Dorian, E for E Phrygian, etc.), all of which are modes within the same diatonic set. Notice that the 7s appear on an approximate diagonal from upper left to lower right; this reflects the position of each mode "tonic" relative to the actual tonic of the diatonic set to which those modes belong. In simple terms that means that absent any other information, higher weight would accrue to the mode where the pitch class represented by the column with a 7 best matches the pitch classes in the melody. But in order to better match the mode to input pitch classes, other scale-steps are assigned weights that accentuate triadic chord tones first and passing tones second. Chord tones other than the mode "tonic" receive in this example a weight of 6, and passing tones a weight of 4. These numbers were chosen so that weights are biased toward equal treatment (the lowest weight, 4, is more than halfway to 7, and the middle weight 6 is more than halfway between 4 and 7). Otherwise, the larger weights would often completely dominate the others (for instance making the tonic the only scale-step that matters).

Given a set of pitch classes extracted from a melody, each combination of a diatonic set transposition (from 0 to 11) and a mode row from 0 ato 6 is assigned a score by summing those pitch classes with their corresponding positions in the table. The result is something like F aeolian which means transposition of 5 and row 5, determined by the maximum sum.

The table and method outlined above are strictly in terms of pitch classes, meaning that high or low notes are treated the same. In order to differentiate between bass notes which probably are more important to determining tonality, but without exploding the table above to include all pitches rather than just twelve pitch classes, a list of raw pitches from a melody is translated into a list of pitch classes representing that melody by over-representing the pitch-classes that correspond to relatively lower notes. For example, the pitch collection {C2, G3} might be represented by the pitch-class collection {0, 0, 0, 7, 7} indicating that the lower C has more weight than the higher G. The exact mapping of relative frequency to weights is adjustable and a matter of experimentation.

It is important to note that the tonality determination is based not only on each input melody alone, but also any pitches from any other pitched parts (bass lines, lead lines, chords, pads, etc.).

The weighted selection described above, based on time and beat-strength proximity, assumes that the input parts from which pitches are drawn have been transposed to the same diatonic set, though they may have different modes. This diatonic set is determined by the mix of tracks that forms the accompaniment and musical context for the melody being generated and separately for each input.

The pitches for notes in a generated variation may be derived from the input melodies and current target mix as follows: first the system may determine the transposition and mode of the target mix, as described above, then the system transposes each input melody (within the context of its own mix) to the same diatonic set of the target mix. For each generated note, weigh input notes according to the time and beat-strength based proximity described above. A weighted average pitch may then be calculated, and the scale step in the relevant mode that is closest to that pitch may be selected. That scale step is then translated to a specific pitch based on the octaves of the surrounding pitches in the output melody.

The major scale and modes are discussed here for illustration. Additionally or alternatively, other parent scales and modes may be used.

The resulting output data in the form of pattern variations may be a function of the combined weights and activations of the full spectrum rhythmic building blocks for the input patterns, along with other analysis and operations which may be incorporated into the process.

Following the application of the system's novel processing techniques, the output is produced in the form of symbolic data. This symbolic representation captures the structural and temporal features of the processed rhythm data in an abstract format that may be flexibly repurposed.

The symbolic output can be converted into a variety of concrete forms depending on the target application. These may include MIDI event streams, digital audio signals, automation curves, or structured data formats such as JSON or XML. The converted data can be routed in real time to perceptual output devices, including audio speakers, video monitors, lighting systems, or haptic devices. Alternatively, the output may be saved as new files for further use or analysis.

In addition to supporting immediate use or export, the system enables the output data to be reintroduced as new input. This feedback mechanism supports a flywheel-like process of iterative variation and refinement. In such cases, previously processed data which may already be normalized and formatted can bypass certain initial processing steps and re-enter the system in real or near-real time, either independently or alongside currently active material. This continuous feedback loop allows the system to support dynamic generativity and evolving creative workflows.

Where audio signal regeneration or audio time-stretching is required, the system may optionally integrate with third-party or external timbral analysis, audio time-stretching, and synthesis tools. These components can be used to generate audio outputs that either preserve the timbral characteristics of the original input or apply new timbral qualities, while still reflecting the rhythmic or structural transformations produced by the system.

In addition, the system may support specialized file formats for storing enriched or compressed data derived from rhythmic potentials, transient patterns, and structural timing features. These formats enable enriched or compressed representations of musical content that can be flexibly or efficiently saved, shared, or reused. Files generated in this format may include rhythmic potentials data, references to rhythmic building blocks, and other information. When decoded or reinterpreted, they may allow for the reconstruction of rhythmically coherent content that reflects the original material's underlying structure, in some cases without requiring an exact reproduction. These file formats may function as a symbolic compression mechanism capable of encoding rhythmic expectation and structure in ways that support transformation, reuse, and interoperability. Alternatively, these file formats may function as metadata which stores additional information about the content. They differ from current music and audio data formats by incorporating a richer structural and contextual model of rhythm.

After the initial output is generated and made perceptible through sound, visuals, or other media, the user may play an active role in shaping the resulting material. This manipulation phase is central to the system's creative utility and interactivity and reflects a "human-in-the-loop" operational model. In some embodiments, the system may be used for scenarios in which a human user perceives the output, exercises creative judgment, makes decisions, and takes actions or provides inputs that influence further processing.

The system may perform various operations based on the input data, the system analysis input data, and other parameters and considerations. In some cases, analysis and operation processes may overlap or otherwise interact. Some examples of operations are described in more detail below.

As described previously, "interpolation" refers to a method of constructing new data points based on a range of a discrete set of known data points. Here interpolation refers to the act of combining a plurality of musical pattern inputs for the purpose of creating and outputting a new musical pattern ("variation").

Interpolation between representations that map rhythmic coherence affords fine-grained, aggregate control over which structural aspects are emphasized or deemphasized.

Single rhythms can be varied by adjusting the rhythmic potentials threshold as described above. In effect this is like saying that certain non-attacks are more likely to turn into attacks and vice-versa, within a given rhythm pattern. This likelihood is determined by the intersections of anticipation and repetition mapped via the rhythmic building blocks.

Rhythm patterns can also be varied by making them more or less "like" other rhythm patterns. For example, making a variation more like input pattern A than input pattern B means pulling the values in the activation vector of the variation closer to the values in the activation vector of input pattern A. This means making the variation share more structural similarity with input pattern A, because its sub-patterns are now more congruent with binary meter in the same way and to the same degree as the sub-patterns of the target vector. The activation vectors for the input rhythms are weighted and added together, normalized and used to generate a new potentials vector.

The potentials vector generated via either or both above methods is then used in conjunction with a threshold to output a new rhythm.

When the difference between an input rhythm and each of the rhythmic building blocks is measured, the result is a distance vector. The distance vector is the amount of commonality between the input pattern and each rhythmic building block. This is measured separately for each input pattern.

Making rhythm A "more like" rhythm B in this sense means more closely aligning the overall expectations and their outcomes generated by rhythm A with those of rhythm B, by moving the values of rhythm A's activations vector values close to the values in rhythm B's activations vector. This will cause the note patterns that drive those expectations and outcomes to have higher potentials, and others to have lower potentials.

The patterns may be interpolated by creating a weighted sum of the address activations for each input pattern. This new address activations vector determines a rhythm variation.

By using this approach, we are able to create variations that maintain the coherence of the original input patterns. A given variation is coherent because the structure of each of its input patterns is encoded by its activations vector. To varying degrees, a derived activations vector selectively maintains aspects of the input pattern structures. The derived activations vector is a weighted sum of the input activations vectors.

In short, to morph rhythm A toward rhythm B we create address activations vectors for each rhythm. These vectors measure each rhythm's congruence with each building block. Then a weighted average of the input rhythms' activation vectors is created, with the weight controlled by the user or some other process or data. A rhythmic potentials vector that assigns an attack likelihood at each time point is calculated from the activations vector. A threshold is then set (by default or by user or by some other process or data) which divides attacks (those above the threshold) from non-attacks.

Users may morph, scale, combine, or reshape symbolic data in real time or asynchronously. These manipulations can be guided by intuitive perception, creative intent, or other goals appropriate to the context. The system supports both direct user control and parameterized interfaces that allow for nuanced transformation of rhythmic structures and behavioral patterns.

While the default mode in some embodiments may emphasize human-in-the-loop interaction, the system may also be configured for automated or semi-automated operation. In such cases, an AI agent or other external process may perform manipulations according to rules, models, or behaviors selected or configured by the user or another system or agent.

Manipulation may occur across multiple dimensions simultaneously, such as rhythmic density, timing contours, or other creative and structural relationships. Because the symbolic data retains a consistent internal structure, user-driven or system-driven modifications maintain compatibility with downstream processes, including output conversion, re-routing, or feedback into the system.

The user may be provided with various output parameters with which to control and manipulate the output data.

For example, a threshold control that determines which potentials are interpreted as attacks (those above the threshold), and which are interpreted as non-attacks (those below the threshold). The threshold may be automatically adjusted to provide the expected number of attacks. The user may adjust the threshold during playback to make the rhythm more dense (by lowering the threshold) or more sparse (by raising the threshold).

Additionally, or alternatively, for example, syncopation and/or elaboration controls may allow the user to determine how much or how little of those elements are reflected in the output data.

User decisions about control inputs, parameter settings, and input data selection may consider and/or be guided by user monitoring and assessment of the output data. In other words, a feedback loop may exist in which the user assesses the output data based on aesthetic judgment and/or other criteria, and then optionally selects some portion of the output data to be added to the input data. A feedback loop may exist in which input data that has been transformed and manipulated into output data, which is distinctly unique from the original input data, is itself used as new input data, and so on in an iterative feedback loop. The result may be a continually evolving and expanding set of input data.

In some examples, input and output patterns may be stored, grouped, averaged, and otherwise manipulated so that the patterns may be deployed, implemented, or otherwise used in an asynchronous manner.

The system optionally includes a specialized interaction tool that enables precise and flexible manipulation of rhythmic and other data through structural subset selection. In some embodiments, this tool may be used for human-in-the-loop operation but may also be used by automated agents or external systems. It supports the rapid identification, grouping, and selection of related time points or data elements, particularly those which may exhibit nested structural relationships and/or which may be non-contiguous in the data set.

This tool enables users to define subsets of elements within a larger data set and apply operations to those subsets without altering surrounding elements. Conversely, users may invert the selection and apply changes to all data except the selected subset. The tool supports overlapping subsets, allowing individual data elements to belong to multiple groups simultaneously. Multiple subsets can be selected in succession or in combination, enabling layered and iterative manipulation strategies.

Nearly any operation available for a data set can also be performed on a subset of that data. Subset elements may be routed to different audio outputs, processed with effects, panned, equalized, muted, or copied to memory for later use. Subsets may also be saved to new data or stem files. In addition, users can generate control signal curves derived exclusively from a subset. These curves can be treated as envelopes or oscillators, used to control other processes, or fed back into the system as input for further transformation or pattern generation.

The tool incorporates multiple algorithms to support its functionality, including one based on the rhythmic building block (RBB) structure, and another based on the variable nested subset selection algorithm. This combination allows the tool to function both within the core system and as a modular utility for broader use in audio, media, or data-driven environments.

This algorithm provides a structured, flexible method for selecting elements from a sequential dataset, such as notes in a musical score, audio samples, video frames, or time-stamped events. It divides the data into windows and applies a grab/skip pattern to extract subsets from each window. Parameters control how selection patterns are spaced and nested, and all selections remain traceable to their original context. The system supports recursive nesting, pattern-based complement generation, variable window sizes, and user-defined resolution based on musical or temporal units. A resolution parameter may be used to convert musical bars or beats into item counts. Window size and window selection patterns may be defined using bar counts for higher-level structure.

By using a selection algorithm such as the one described above, a user may select a subset of a particular input pattern, rather than the entire pattern, for generating variations of the input. For example, a portion of a musical input may be selected, and musical variations may be generated based on the selected portion of the input. As a concrete example, suppose a music producer loads a MIDI note array segmented into 16th-note time steps, as a musical input pattern. The user then applies a preset using subset_window_size=16 (1 bar), intra_pattern= [2] (grab one, skip one), and window_selection_pattern= [1,2] (grab a bar, skip two bars). The result is a sequence of rhythmic accents pulled from every third bar of the musical input. Later, the producer may generate a complement subset, modify some elements, and reinsert them into the original timeline-preserving context and allowing for variation and remixing. Alternatively or in addition, the producer may use aspects of the present teachings to create musical variations of the selected subset of the MIDI input, and ignore or discard the original input entirely.

In some examples, the system may incorporate microtiming, micropitch, and other quantization considerations in some or all analysis, operation, output, and other processes. Microtiming and micropitch refer respectively to time or pitch based offset measurements which may be detected within and/or applied to the attack points, onset points, pitches, etc. of some or all notes within a pattern or set.

In some examples, the system may accomplish rhythmic quantization in such a manner so that adjustments applied to the inputs to be quantized don't only modify an attack by moving it to the closest spot on a grid or timeline increment, but additionally may factor in how relatively important the available or possible grid destinations are given some context. For example, when analyzed through the rhythmic building block lens and/or other criteria, what the attacks and/or other aspects of the notes preceding and following any given note indicate about what may be the closest rhythmically coherent location for that note. In other words, unlike other quantization schemes in which a note attack is for example adjusted or moved to align with the closest unit at some level of metrical subdivision, given the same input data and context, a rhythmically coherent quantization method may adjust or move the note attack to a different location which meets or aligns with some criteria related to rhythmic building blocks.

As an example, a simple version may include the user freely tapping out a rhythm, then parsing the rhythm into building blocks and determining the "closest" smaller set of building blocks, thereby resulting in a rhythm with more internal consistency. Or going the other direction, "un-quantizing" by breaking some existing internal symmetries by increasing the number of building blocks. In either case, the character of the rhythm and/or number of attacks may be similar to the original.

The above described components of system 200 may function together in such a way that the method 250 is enabled. In general, method 250 is an example operational method of system 200, and thus portions of method 250 may be accomplished by respective modules of system 200.

Figure 4:
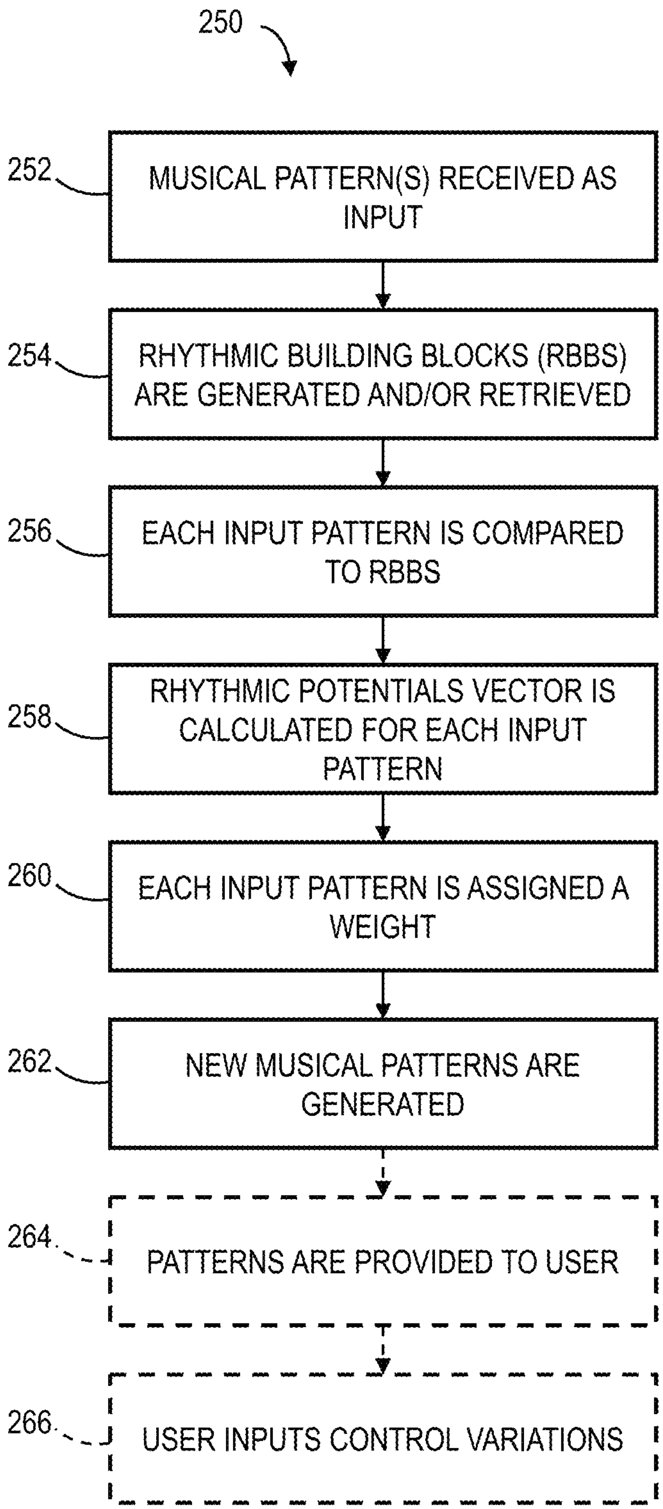
FIG. 4 is a flowchart depicting an illustrative method for generating a musical pattern variation according to the present teachings.

FIG. 4 is a flowchart illustrating steps performed in an illustrative method 250 for generating new musical patterns, according to aspects of the present teachings. Method 250 may not recite the complete process or all steps of the method. Although various steps of method 250 are described below and depicted in FIG. 4, the steps need not necessarily all be performed, and in some cases may be performed simultaneously or in a different order than the order shown.

At step 252, one or more musical patterns are received as inputs. These inputs may be chosen by the user; selected through other processes or methods; or user selection and other processes or methods may be used in combination. Each input rhythmic pattern is represented by an attack vector consisting solely of 1s and 0s where 1 represents an attack and 0 a non-attack.

A ternary number may optionally be used to represent duration in the attack vector. For instance, a 2 may represent a time slot that does not contain an attack, but does contain a note duration which is sustained from the previous attack time slot. In this case there is an added constraint however: if 2s represent note sustain, a 2 cannot immediately follow a 0.

Additionally, or alternatively, any note or rest duration may be represented by 2*s*, with the only constraint being that a 0 can immediately follow a 2 only if the most recent non−2 is a 1.

Additionally, or alternatively, the consideration of note attacks versus rests may be inverted, so to speak, so that onsets and durations of silence or the "beginnings of the rests" are what is mapped.

A context, in the form of a specific musical composition, song, key, accompanying parts, etc. may also be selected. This context may inform, affect, or influence the variations to some degree. If no context is selected, the system may analyze the inputs in order to make contextual inferences or assumptions that may affect the variations. Contextual data may include but is not limited to harmonic data from accompanying parts, and/or data related to production, articulation, or orchestration.

At step 254, system 200 generates, or retrieves from memory if previously generated, a set of rhythmic building blocks that capture stages of pattern formation underpinning binary meter. These rhythmic building blocks are a function of musical meter, not a function of the input patterns. Each rhythmic building block is a set of time points, which generally represent possible note attacks, though they may be applied to rests, accents, or other facets or elements in some cases.

The system analyzes the pattern and finds the rhythmic building blocks which are most likely to account for how the pattern "makes sense" rhythmically. Those configurations each have some combination of symmetries that are congruent to musical meter, meaning that they line up (to varying degrees) with those expectations we bring to a piece of music we are hearing for the first time.

At step 256, each input pattern is compared against this spectrum of rhythmic building blocks to determine which symmetries are present to what degree in the input pattern's attack vector. A new vector is constructed for each input pattern. It stores a number between 0 and 1 representing each rhythmic building block's correspondence between its time points and any subset of attacks in the input pattern. This vector is called the address activations vector.

At step 258, another vector is formed (e.g., calculated) for each input pattern as a function of the address activations vector. This vector stores the relative likelihood of an attack at each time position in the pattern. The likelihood of an attack at time point t is a function of attacks at other points, and the degree to which they raise expectation (via repetition or anticipation or both) of an attack at t. The likelihood of an attack at each time point is a function of the sum of the activations of all rhythmic building blocks which contain that time point. This vector is called the rhythmic potentials vector, discussed previously.

At step 260, each input pattern, with its respective rhythmic potentials vector, is assigned a weight. In this context weight is a real number value between 0 and 1, a scalar measure of influence on or contribution to the variation.

At step 262, new musical pattern outputs, aka variations, are generated based upon the weight assigned to each input and the values of that input's rhythmic potentials vector. Input patterns with larger weights have more influence on the variation. A threshold value controls which values of the rhythmic potentials vector are interpreted as attacks and which are interpreted as non-attacks. The threshold is set by default so that the original attacks lie above the threshold and non-attacks lie below it. Pitches may be assigned to each attack in the generated rhythm, based either on the original pattern's pitches or on the pitches of other selected input patterns, as well as the musical context and other parameters. Alternatively or in addition, some other musical quantity such as an instrument mapping, a voice mapping, and/or an effect parameter, may be assigned to each attack in the generated rhythm.

At optional step 264, the system makes the variations available to one or more users through sensory or perceptual means via one or more pieces of hardware. The user may hear or otherwise perceive the result of their adjustments rendered in real time, use that information to inform and influence their decisions about subsequent adjustments, and thus continuously generate new variations in a cycle of iteration. These perceptual means may include but are not limited to auditory, visual, haptic, kinetic, olfactory, or some combination thereof.

At optional step 266, the user or users of the system may adjust or "steer" the variations that the system outputs by adjusting one or more parameters, particularly the weights assigned to the address activation vectors of each input pattern, and/or the threshold applied to the rhythmic potentials vector to differentiate between attacks and non-attacks. For instance, user adjustments and inputs may include selection of the input patterns and any number of other considerations. The system may incorporate user inputs in "real time" (i.e. instantaneously or nearly instantaneously), or with sufficiently short latency to be considered real time for practical purposes.

In this context, "latency" refers to the amount of time that elapses between the moment when a system parameter is changed and the moment when the effect of that change may be perceived in the output of the system.

At step 268, the user operates the system by engaging in a repeating cycle of action/reaction, perception, and assessment. This cycle may include but is not limited to selecting inputs (musical patterns); perceiving and assessing the outputs (variations); adjusting various parameters to influence, affect, or modify outputs; perceiving and assessing the effect of any adjustments on the outputs; repeating this process.

In some examples, the system may enable, facilitate, or otherwise make possible enhanced and/or augmented creation, control, and/or manipulation of synchronous or asynchronous musical instrument controller input and output data. The system may be used for asynchronous and/or synchronous composition, improvisation, performance, generation, manipulation, layering, interpolation, of audio, musical patterns, and/or other physical/mechanical/electrical impulses and/or control signals.

In some examples, the system may analyze, separate, and/or transform a given musical, rhythm, data, or other pattern into one or more output patterns which are variations, permutations, and/or versions of the original or input pattern. For example, the user may desire output patterns that are to be used as separate instrumental parts in conjunction with, as complementary to, or in some other relation to the original pattern.

For example, by grouping the notes that share a common rhythmic building block address into one part, or so that each part contains notes from a mixture of addresses, or some other paradigm.

For example, the system may be used to balance different patterns or elements of patterns across different instrumental parts as opposed to combining two or more patterns into one pattern. In other words, if there are 3 different instruments each with its own pattern and the original patterns have some notes with attack points and durations that overlap, and some that do not overlap. The system may adjust the balance of the 3 parts. For instance, if all 3 of the parts have a note at a certain time point, or very close to a certain time point (say a 16th off, before or after), this may cause some "smearing" of the musical impact at that point because the notes are competing with each other. Solving this with a traditional audio mixing approach, a user might decide which part is the most important at the time point in question and then adjust the volume and/or EQ of that part (or the conflicting parts) at that time point to de-emphasize the conflict. However, while it might not be hard to choose which instrument is most important, it may be that the note at that specific time point is more fundamentally important or rhythmically coherent when viewed through the lens of rhythmic building block analysis for one of the other instrumental parts than the instrument that is most important overall.

This may allow the user to select several parts and "disentangle" or "de-conflict" their rhythm patterns relative to each other. Rather than being limited to adjusting only one note at a time, the tool can adjust multiple notes in multiple parts at the same time. It does this in a musical way, shifting and/or muting notes to make the parts fit together better. This is accomplished by applying elaboration, syncopation, and muting to the patterns so that they stay out of each other's way in some cases, or align to reinforce each other in other cases.

The system also may make it easy to clean up an individual pattern. For example, a user performs and records an instrumental part or pattern part using a MIDI controller, and the recorded part has elements the user wishes to be different. Rather than using a combination of quantizing and piano roll editing, which requires multiple steps and can be tedious and time consuming, the system allows the user to identify the important notes and rhythmic patterns and clean up the whole part just by a control set that may be as simple as one slider or knob.

For example, the system may provide disentanglement for parts that overlap, so that only the part with the highest weight at a given time point will be preserved, while the other parts may have their notes muted, time shifted, or subsumed into the duration of a previous note.

For example, the system may decompose a single input pattern or data set into 2 or 3 patterns or data sets. The user may then, for example, use the system to interpolate between the 2 or 3 patterns to create new variations.

In some examples the system may analyze a rhythmic pattern and suggest possible patterns which the user may select to compliment, complete, continue, elaborate upon, or otherwise add to or modify the pattern.

For example, a music creator may use the recommendations during composition, production, performance, collaboration, etc. A music distribution platform might use the recommendations explicitly and/or behind the scenes to assist their customers, listeners, employees, or other users in finding, tracking, tagging, etc. of similarities between pieces of recorded music for a variety of purposes or goals.

The morphing methods described thus far may take some number of input melodies (e.g., two or three) as inputs. For each melody they may extract a single rhythm, e.g., assuming the melody is monophonic. Those rhythms are the input to the core morphing algorithm(s). The result may also be a single rhythm, which may become a monophonic melody once pitches are calculated for each attack time in the generated rhythm.

Morphing polyphonic parts means removing the constraint that a single rhythm must represent the part. Polyphony means there are multiple voices, each with its own rhythm. Additionally for each combination of voices there may be a compound rhythm that subsumes the counterpoint between the voices in that combination. The core morphing algorithm may need to morph separately between each like set of combinations in the input parts in order to calculate the rhythmic potentials for the rhythm formed by that combination of voices. And may then calculate the sum of the rhythmic potentials for each voice at each time point, across rhythmic potentials for all voice combinations that include that voice. Accordingly, each voice may be morphed in the context of the role it plays with the other voices.

As an example of polyphonic morphing, a drum morphing algorithm is described. The example polyphonic morphing may utilize an input (e.g., drum kit) having three voices: kick, snare and hat. To simplify the discussion, all kick notes are assumed to have MIDI pitch 36, all snare notes are assumed to have pitch 38, and all hat notes are assumed to have pitch 42, though in practice any voice could be mapped to any pitch, but note that here each voice consists of notes all with a single pitch.

Then the following combinations of voices are used for each input to calculate the set of address activations and rhythmic potentials for that input. Specifically, each input drum part derives rhythm for these voice combinations:

1. Kick (attack vector of kick notes)
2. Snare (attack vector of snare notes)
3. Hat (attack vector of hat notes)
4. Kick and snare (attack vector of notes that are either kick or snare)

5. Kick and hat (attack vector of notes that are either kick or hat)
6. Snare and hat (attack vector of notes that are either snare or hat)
7. Kick, snare and hat (attack vector of all notes)

For each input part, address activations and rhythmic potentials are calculated for each of the seven combined rhythms. The morphing methods described may be used to morph between the inputs for each of the seven rhythms representing voice combinations above, generating seven morphed address activations and seven rhythmic potentials, one for each of the seven voice combinations.

What is needed then is to calculate the particular morphed rhythm for each voice, taking into account how that voice fits in rhythmically with the other voices. To do this, the morphed rhythmic potentials for, say, the kick voice is calculated as follows:

For the kick part, for example, a new set of rhythmic potentials is formed that is a sum of the rhythmic potentials, at each time step, of each voice combination that includes kick. So the new (morphed) rhythmic potentials vector is a sum, at each time point, of the morphed rhythmic potentials for these voice combinations: kick; kick and snare; kick and hat; kick, snare, and hat. The same is done for all combinations involving snare, and all combinations involving hat.

A threshold is calculated that will return the expected number of notes for each voice (based on a weighted average or the notes in that voice for each input part). Then those thresholds are applied to the respective (kick, snare, hat) rhythms simultaneously, generating an output rhythm for each voice (but not each combination of two or more voices). Unlike the monophonic melody morphing described in earlier sections this can result in multiple notes at a given time point.

In some examples, the system may be utilized in a musical pattern calculator, in which a user may access and or control via a website interface, mobile app, application program interface, software development kit, or some other means. The user may input 2 or 3 rhythm patterns in the form of midi data files, via keyboard, drum pads, or other hardware, or via a piano roll or other visual and/or otherwise representational interface.

The Calculator may use rhythmic building block analysis to generate and output a new pattern that is a combination of the input patterns. Additional controls may provide the user the option to modify various aspects of the input, output, or operations, including but not limited to adjusting the ratio of how much each input pattern contributes to the output pattern, the number of note attacks in the output pattern. Output may be displayed and or made available to the user in one or more ways including but not limited to any perceptual means, such as a data file, as an audio file, etc.

In some examples, the rhythmic building blocks analysis and operations may be employed to provide recommendations and suggestions to extend, accompany, change, or modify musical patterns or other data. Additionally, or alternatively, other analysis methods, formulas, and the like may be used to adapt, enhance, and further modify the analysis, recommendations, and other aspects of the example.

For example, a user may select a two bar melody as represented in some notational or other form in a digital audio workstation user graphic user interface or some other creative tool, the user may then receive one or more suggestions for how the pattern could be extended into a four bar phrase.

For example, a user may select a one or more bar segment of one instrumental part and receive one or more suggested accompanying patterns for the same and/or other instruments.

Additionally, or alternatively, an example may provide analytical information in the form of ratios, scores, labels, and the like which may indicate how two or more patterns relate to one another. For example, Bass Pattern A may receive a score of 100 based on analysis of some aspect of the pattern content, while Pattern B receives a score of 200 based on a similar analysis. The two scores may, for example, indicate that the two patterns are more or less likely to be compatible, complimentary, or have other similarities, differences, and characteristics, whether considered comparatively or otherwise.

In some examples, a width control may impact the input or output range of one or more aspects of the musical content or other data. For example, the control may be stepped chromatically so when the user moves a control slider up the top and bottom notes of a melody go up. For example, if the controls are moved up to D4 then the highest possible note is D4, and if the width of the range is constrained, the notes that dropped out of range at the bottom of the pattern may get transposed to the top. Alternatively, the lower notes may just drop off (meaning be deleted or muted). For example, a width control may select the width or how far apart the highest and lowest note may be. Notes attacks which have pitch content that don't fit the criteria may be transposed into the middle of the range for instance.

For example, range and register may be controlled and selected independently. The range control may affect the width of the pattern, meaning the distance between the highest and lowest available or allowable pitches. The register control may affect the center pitch or relative pitch of the selected range. Different modes of operation may be employed. For example, the system may cause the notes from the bottom of the range, as determined by a range width control, and shifts them up an octave so they're at the top. Additionally, or alternatively, notes may shift, wrap, fold, clip, shuffle, or otherwise adjust or adapt to register, range, and other control parameter adjustments. For example, such adjustments may employ various increments, such as diatonic, chromatic, or other paradigms. Some elements may be anchored or fixed to remain unchanged while the surrounding note data changes.

For example, when a range control is set to the minimum, all the notes may be compressed down to a single pitch (which could be moved by the register slider). Moving from minimum to maximum, the range expands in half step increments up to 2 octaves max or the range expands proportionally in relation to the actual width of the current pattern.

For example, in a midi piano keyboard control scheme, one octave of keys could control the transposition of the current output pattern. The selection of the current pattern or set of patterns being controlled by a different range of piano keys. For example, pressing C at beginning of a given octave causes selected riff to play normally. Play D, E, etc. in that same octave moves the starting note of the riff up and transposes the whole riff diatonically. Additionally, modifier keys may be employed in conjunction with other inputs to effect different transposition recipes or templates.

In some examples, a step mode may be employed in which for each user input (for instance one hit on a midi drum pad), one or more beats worth of the output pattern will be played back or otherwise made available as output data or an output signal. The user may choose to step through a pattern using whatever interval of pause or time delay they choose between input actions. If the user switches to a different pattern the process may start over or continue by picking up at the same beat position within the current bar of music or another time reference as selected by the user, the system, or some other factor or agent. For example, with 2-3 patterns selected, the user may be stepping through the morphed (meaning interpolated) output pattern. Which the user can further adjust as the step through the pattern. This may be combined with other features, for example transposition mode, to create a variety of output results.

In some examples, a feature which may be called directional transposition, directional reversal, folding or some other term, which would modify an input and/or output pattern with an ascending or descending characteristic, contour, or quality. For example, when the user adjusts a knob or fader input, the first note or the last note of the pattern may be transposed or shifted up or down according to the control input. The end result may be the complete reversal of the pattern contour or some other outcome. For example, with a pattern that is an ascending C-major scale, the control may shift the contour of the pattern by changing the pitches, some notes of which may be anchored, or designated by the user or the system not to change, so that the end result is a pattern with a contour and pitch register direction that is different than the original. For example, the last note may be anchored, and the preceding notes adjusted upward or downward, or one or more notes in the middle of the pattern may be anchored with the preceding and succeeding notes adjusted upward and or downward. For example, a pattern which started out with a contour similar to a capital letter U, may end up with a contour similar to an inverted capital letter U. For example, a pattern with a contour similar to a diagonal line which progresses from the lower left hand corner of a graph to the upper right hand corner of a graph, may end up with a contour similar to a line which starts at the upper lefthand corner of a graph and descends to the lower right hand corner of a graph.

In some examples, available input or output patterns may be automatically changed based on external triggers, internal calculations or analysis, or other conditions or contexts. For example, a user may dynamically select different sets or groups of patterns intended to increase the density of the output, change up the rhythm, direction of the melody lines, and or any number of other possible goals or desired outcomes.

C. Illustrative System for Music Composition and Production

This section describes an illustrative system and method for music composition and production. In general, the system comprises an application configured to enhance creative workflows in digital audio workstations (DAWs) and other digital content creation environments and is substantially similar to system 200 described above, except in any differences described below and as understood by those skilled in the art. In other words, the system described in this section may be considered an example of system 200 for incorporated use in a DAW. Accordingly, the system may incorporate all or portions of methods 100, 150, and 250.

As described above with respect to system 200, the system identifies and leverages a latent rhythmic structure (i.e., rhythmic potential) embedded within time-based content, facilitating the modification, transformation, and generation of material more easily, quickly, and effectively than with existing tools. This latent structure, defined by rhythmic potentials that arise from rhythmic building block activations rather than fixed binary note events (attacks versus rests), forms the foundation for real-time content manipulation and generation.

Accordingly, the system accepts a wide range of input data, including symbolic data such as musical instrument digital interface (MIDI) or other symbolic representations of note, pitch, and rhythm; continuous data, such as oscillator signals, envelopes, automation curves, and other non-symbolic data; and audio data, such as time-domain audio content that may be analyzed and interpreted by the system to derive rhythmic structure.

Upon ingesting input data, the system identifies rhythmic potentials and converts them into a multi-layered abstraction that represents latent rhythmic and melodic characteristics. These abstractions are analyzed, modified, and transformed in real time through an advanced pattern interpolation framework that operates using activation-based morphing techniques as described throughout this document. The system allows the user to generate rhythmic and melodic variations, explore alternative structures, and create complex transformations that preserve the essential identity of the original content.

The system facilitates intuitive exploration of content by operating at the gestalt or pattern level, rather than engaging in note-by-note or point-by-point adjustments. In other words, the system represents a holistic manipulation of content features. Through real-time visual and auditory feedback, users can iteratively refine and adapt the content, ensuring that their creative vision is realized.

In some examples, the system performs latent rhythmic structure recognition by detecting and interpreting a latent rhythmic structure that underlies time-based content. Unlike conventional applications that rely on static note events, the companion app recognizes potential rhythmic activations that define the probability of note occurrences over time. This latent structure serves as the foundation for pattern interpolation, morphing, and content transformation, unlocking new possibilities for rhythmic experimentation.

In some examples, the system performs morphing and pattern interpolation based on pattern activations in a multi-dimensional space. The system introduces a novel pattern-based interpolation framework that allows users to morph between multiple patterns in real time. Rather than using simple distance metrics, the system calculates pattern activations in a multi-dimensional space, interpolating between weighted activation profiles to generate smooth, context-aware transitions. In some examples, the system provides activation weighting and morphing, where input patterns are weighted and assigned activation potentials, which influence how interpolated patterns emerge as morphing controls are adjusted. In some examples, the system provides threshold-based activation influence, where the system dynamically adjusts pattern density through threshold-based controls that modify the relative influence of input patterns. By adjusting the activation weights and morphing controls, users can create nuanced variations that blend structure from multiple source patterns, enabling intuitive exploration of rhythmic possibilities.

In some examples, the system of music composition and production facilitates the dynamic scaling of patterns by users, increasing or decreasing the number of note onsets within a given pattern. Dynamic scaling is achieved through a threshold-based control system that ensures patterns remains musically coherent as density or rhythmic resolution is adjusted. In some examples, the threshold-based control system is based on a pattern density threshold for pattern variations. In these examples, the system modifies pattern density based on user-defined thresholds, preserving key characteristics while introducing variations. In some examples, the system performs context-aware adaptation, wherein adaptations are constrained by surrounding context to ensure that scaled patterns maintain rhythmic and harmonic coherence.

Systems of music composition and production according to the present teachings utilize gestalt-level interaction for intuitive pattern control. Unlike traditional tools that require users to manipulate content at the surface-level (note-by-note or event-by-event), the companion application operates at the gestalt or pattern level, allowing users to modify entire rhythmic structures with high-level controls. Accordingly, in some examples, systems according to the present disclosure provide multi-layered pattern interaction, such that users can manipulate rhythmic, melodic, and dynamic layers simultaneously, making complex transformations more intuitive. In some examples, systems according to the present disclosure provide visual feedback for gestalt-level manipulation. Accordingly, in some examples, the interface dynamically visualizes large-scale transformations, providing real-time feedback that reflects structural changes in the content.

In some examples, systems of music composition and production provide real-time, low-latency processing and adaptive feedback of content. In some examples, the system processes user input in real time or near real time, maintaining low-latency responsiveness that allows users to make decisions and control outcomes intuitively. The human-in-the-loop design ensures that users can explore, iterate, and refine transformations dynamically based on immediate auditory and visual feedback.

In some examples, systems of music composition and production according to the facilitate adaptive pattern evolution and iterative variation. The system supports adaptive pattern evolution by enabling users to feed generated variations back into the system for further transformation. This iterative feedback mechanism allows for continuous refinement and exploration, creating an evolving pattern ecosystem. In some examples, the system facilitates iterative variation and refinement of the generated variations, wherein users select desirable variations and reintroduce them as input patterns for subsequent morphing and scaling. In some examples, the system performs adaptive learning of user practices. Accordingly, over time, the system may learn user preferences and adapt transformation algorithms to align with the user's creative style.

In some examples, the system facilitates pattern anchoring, directional shifts, and range control while the user performs pattern modification functions. In some examples, the system offers pattern anchoring capabilities that allow users to lock specific pattern characteristics while modifying other aspects dynamically. Additionally, in some examples, the system facilitates the application of directional pattern shifts by users. In these examples, users may shift patterns forward and/or backward in time or transpose melodic content to maintain musical integrity. In some examples, the system may provide range constraints and transposition controls, facilitating the adjustment of pitch range and transposition parameters by a user while maintaining harmonic and melodic coherence. In some examples, the system comprises an influence mixer and a navigation pane facilitating the control of morphing and interpolation parameters visually by a user. In some examples, a navigation pane may display target circles representing input patterns, with proximity and position determining pattern influence (i.e., defining influence zones). In some examples, the system facilitates real-time morphing with activation-based influence. Accordingly, as users adjust the target circle's position, the system may dynamically interpolate between input patterns, reflecting changes in activation influence through real-time auditory feedback.

In some examples, the system supports multi-instance processing, as well as parallel pattern processing. Multi-instance processing facilitates the engagement of users with multiple independent pattern transformations concurrently. Each instance maintains its own state, control mappings, and transformation parameters, which facilitates the parallel exploration of pattern variations by a user, as users may simultaneously explore different pattern combinations and control settings within a single instance. Systems according to the present disclosure are suitable for multi-track pattern processing for large-scale sessions, as the system distributes computational loads efficiently across multiple instances, ensuring low-latency performance.

In some examples, systems according to the present disclosure comprise modular user interface architecture, which supports extensibility of the user interface through an external application programming interface (API) facilitating the creation by developers of custom modules, widgets, and visual controls. In some examples, this extensibility includes user-defined control panels, which facilitate the configuration of bespoke interfaces by advanced users to better align with individual workflows. In some examples, this extensibility includes third-party interface extensions, which allow external developers to enhance the system's functionality through API-based modifications.

An overview of a method 300 for utilizing the system for music composition and production is described below; see FIG. 5. The user interacts with the system through a seamless and intuitive process that integrates the companion application with their digital creation environment. Aspects of system 200 may be utilized in the method steps described below. Where appropriate, reference may be made to components and systems that may be used in carrying out each step. These references are for illustration, and are not intended to limit the possible ways of carrying out any particular step of the method.

Figure 5:
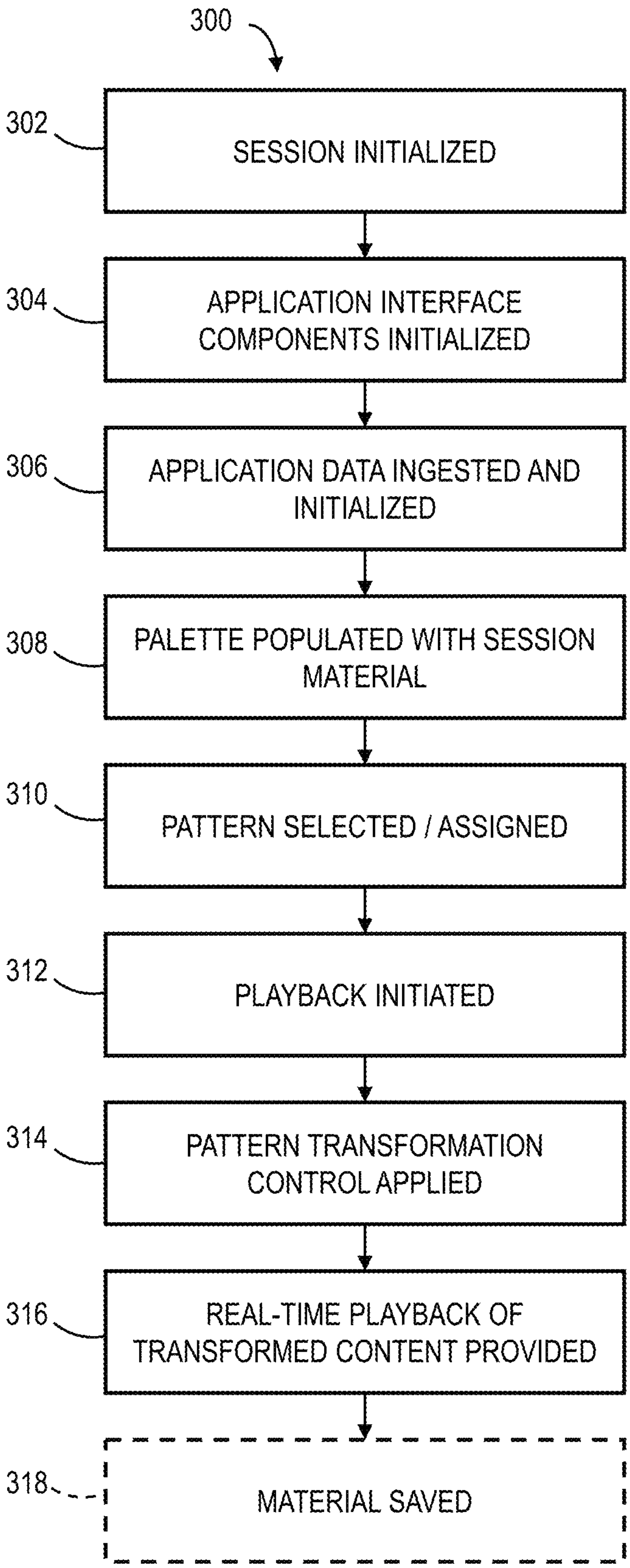
FIG. 5 is a flowchart depicting an illustrative method for utilizing the system for music composition and production according to the present teachings.

FIG. 5 is a flowchart illustrating steps performed in an illustrative method of content creation 300 using a DAW. Method 300 may not recite the complete process or all steps of the method. Although various steps of method 300 are described below and depicted in FIG. 5, the steps need not necessarily all be performed, and in some cases may be performed simultaneously or in a different order than the order shown.

Step 302 of method 300 includes initializing the session. In some examples, the user initializes the session by opening a session in a digital audio workstation (DAW) or any other digital creation or production environment. For the purposes of this description, the term DAW is understood to encompass any software or hardware environment where users engage in content creation, including music production, sound design, and other time-based creative tasks.

Step 304 of method 300 includes instantiation of companion app interface components. The user instantiates connection plugins, middleware, or other interface components that facilitate bi-directional communication between the DAW and the companion application. In some examples, these components include virtual studio technology (VST), audio units (AU), Max-for-Live, and/or avid audio extension (AAX) plugins, which enable audio and MIDI data exchange. In some examples, these components include MIDI routing configurations, which facilitate control signal mapping. In some examples, these components include open sound control (OSC) Protocols and/or Custom APIs, which ensure synchronized communication with the companion app. These interface components establish a connection between the DAW and the companion app, facilitating synchronized playback and real-time content modification.

Step 306 of method 300 includes companion app initialization and data ingestion. Upon launching the companion application, the companion application ingests relevant information from the active session in the DAW. In some examples, this data includes MIDI sequences, representing note onsets, durations, velocities, and control data. In some examples, this data includes audio regions, providing time-domain audio content for analysis and transformation. In some examples, this data includes tempo, time signature, and grid information, ensuring rhythmic alignment. In some examples, this data includes automation data and control envelopes, which allow continuous data streams to be integrated with the system. The companion app converts this data into a multi-layered abstraction, where different dimensions of the content (rhythmic, melodic, and dynamic) are represented independently. This abstraction forms the foundation for subsequent morphing, scaling, and pattern transformations.

Step 308 of method 300 includes palette population with session material. The companion app automatically populates a palette containing the material available for transformation and manipulation. In some examples, a palette window visually represents this content, including input patterns extracted from MIDI clips, audio regions, and symbolic data; rhythmic motifs, which are pre-segmented rhythmic patterns that serve as source material for interpolation; and/or continuous data streams, such as oscillator signals, envelopes, and/or other automation curves. The user can browse and select patterns from the palette to define the subset of material they wish to work with.

Step 310 of method 300 includes pattern selection and assignment. The user selects one or more patterns from the palette and assigns them as input sources for the morphing and transformation process. In some examples, these patterns are visualized in a morphing window, where input patterns can be modified and interpolated. In some examples, these patterns are visualized in a navigation pane, where target circles represent input patterns, and their relative positions control the influence and weighting of each pattern. Once the subset of input patterns is selected, the input patterns become available for real-time transformation and exploration.

Step 312 of method 300 includes initiation of playback and auditory feedback. The user initiates playback of the session, allowing the user to hear the original content in context with other DAW tracks. In some examples, playback provides auditory reference for context, enabling the user to hear how selected patterns interact with the broader session and/or real-time feedback for transformation, allowing users to assess how applied morphing, scaling, and pattern adjustments affect the resulting output. The system maintains synchronous playback with the DAW, ensuring that all transformations remain tightly aligned with the session's tempo and grid.

Step 314 of method 300 includes application of morphing, scaling, and pattern control. With the system running, the user applies morphing, scaling, and control adjustments to modify the selected patterns dynamically. In some examples, the system is configured to provide several advanced control mechanisms. In some examples, the system provides morphing and pattern interpolation. In these examples, the user can interpolate between selected input patterns by adjusting controls on the influence mixer or repositioning target circles within the navigation pane. Pattern transitions occur through a weighted interpolation of pattern activations, creating smooth, context-aware variations. In some examples, the method includes activation weighting and proximity control. For example, the closer a target circle moves toward a pattern, the greater the influence of the pattern in the interpolation process. In some examples, the method includes pattern scaling based on a density threshold. In these examples, users can dynamically increase or decrease pattern complexity through a threshold control system that modifies the number of note onsets or rhythmic events. In some examples, step 314 includes density scaling of the pattern, wherein the system adjusts pattern density while preserving rhythmic identity, ensuring that transformations remain musically coherent. In some examples, step 314 includes context-aware adaptation of the pattern, wherein scaling adjustments consider surrounding material to maintain structural consistency. In some examples, the method includes directional pattern shifts and anchoring. Users can shift patterns forward/backward in time or transpose melodic content using directional shift controls. The system also supports pattern anchoring, enabling users to lock specific characteristics of a pattern while modifying other aspects dynamically. In some examples, the method includes anchoring critical musical elements, where anchored elements remain intact while surrounding content is modified. In some examples, the system provides shift and transposition controls, where users can move patterns forward or backward, or transpose melodic content up/down by defined intervals.

Step 314 may include all or selected portions of the methods of pattern transformation previously described. For example, as described above with respect to system 200, step 314 may include identifying a latent rhythmic structure (i.e., rhythmic potentials) embedded within initial content selected by the user (e.g., at step 310), and using the rhythmic potentials to transform the user content according to parameters that may be selected by the user, in real time, and/or iteratively.

In some examples, the system provides an influence mixer and navigation pane to control pattern interpolation and transformation. In some examples, the influence mixer displays the relative probability of note occurrences based on weighted activations derived from input patterns. In some examples, the navigation pane represents input patterns as target circles, with the proximity and position of each circle determining its influence on the resulting content. In some examples, the system provides dynamic pattern blending. In these examples, as target circles are repositioned, the system dynamically adjusts the pattern activations and generates interpolated content in real time.

Step 316 of method 300 includes real-time playback of transformed content. As transformations are applied, the system processes modifications in real time, providing continuous auditory and visual feedback. This ensures that users can hear pattern variations as they emerge, such that auditory feedback reflects real-time transformations. Furthermore, users may visualize structural changes dynamically, as UI elements update continuously to reflect active pattern changes.

Optional step 318 of method 300 includes saving and/or recycling new material. When the user identifies a desirable result, the user can save or recycle the generated material for further use. In some examples, step 318 includes saving material to the DAW, by exporting the transformed content back to the DAW as a new MIDI clip, audio region, or other compatible format. In some examples, step 318 includes recycling material to the palette, by adding the modified content back to the palette as a new input pattern for subsequent iterations.

In some examples, the system provides iterative exploration and adaptive pattern evolution. The system encourages iterative exploration and adaptive evolution by allowing users to reintroduce variations for further exploration, where generated variations can be recycled into the system to produce evolving patterns. In some examples, the method includes adaptive pattern evolution over time, where the system dynamically introduces variations over time, maintaining user engagement and creative momentum.

In some examples, the system provides preset and session management options, such as the ability to save and recall presets, such that users can store control settings, morphing parameters, and other configurations for future sessions. In some examples, the system provides session file management, where complete session states, including input patterns, active controls, and transformed content, can be saved and restored.

In some examples, the system provides error handling, data validation, and/or user overrides. The system incorporates error-handling mechanisms that detect and address inconsistencies in input data or transformations. In some examples, the system includes automatic correction protocols, where minor errors are corrected dynamically to maintain stability. In some examples, the system provides user override controls, such that in cases where automated correction is insufficient, the system prompts the user to manually adjust or override flagged data.

The system accepts various types of input data. In some examples, the system accepts symbolic and MIDI data. The system ingests MIDI and other symbolic representations of musical and audio content, including MIDI note data (capturing note onsets, durations, velocities, and other event-based information), control change and modulation data (representing parameter automation and continuous control changes), and/or quantized and non-quantized midi events (supporting both fixed-grid and free-time rhythmic patterns). Upon ingestion, symbolic data is converted into pattern activation profiles that represent rhythmic and melodic characteristics through latent structures rather than fixed binary note events. This abstraction allows for flexible interpolation and transformation of the input material.

In some examples, in addition to symbolic data, the system ingests continuous data and control data sources. In some examples, continuous data and control data sources include automation curves and envelopes representing dynamic parameter changes over time, oscillator signals and modulation sources providing time-based data for non-symbolic content, external control data sourced from MIDI control change messages, low-frequency oscillators (LFOs), and/or other modulation sources. The system normalizes and interprets continuous data to align with the internal pattern abstraction, allowing for the integration of non-symbolic control data into the rhythmic and melodic transformation process.

In some examples, the system can analyze time-domain audio content to derive rhythmic, melodic, and dynamic characteristics. In some examples, the system extracts relevant features such as onset and transient detection, by identifying rhythmic landmarks within the audio waveform; spectral and harmonic analysis, by extracting melodic and harmonic content to inform interpolation; amplitude and dynamic variations, by incorporating volume envelopes into the control framework, and/or the like. Audio data is processed to generate rhythmic activations that can be used alongside symbolic and continuous data for transformation.

In some examples, the system analyzes clock and timing protocols for synchronization. To maintain tight synchronization with external systems, the system supports multiple clock and timing protocols, such as MIDI clock and MIDI 2.0 protocols enabling real-time tempo and timing synchronization, Ableton link protocol, ensuring seamless synchronization across multiple connected applications, OSC timing signals supporting high-precision timing data exchange between systems, and/or the like. These clock protocols ensure that the system maintains consistent timing during real-time transformation and pattern manipulation.

In some examples, upon ingestion, all input data may be normalized and mapped to a multi-layered abstraction that represents different dimensions of the content. In some examples, these layers include any and/or all of the following: a Rhythmic Layer representing note onsets, durations, and rhythmic patterns, a Melodic Layer capturing pitch, contour, and harmonic characteristics, a Dynamic Layer encoding velocity, amplitude, and control envelopes. Each layer is independently processed and transformed, allowing for fine-grained control over content generation and modification.

In some examples, the system converts ingested data into a pattern activation profile, representing the potential of note occurrences within a pattern. This activation-based approach allows for more nuanced control over pattern morphing, interpolation, and scaling. In some examples, the system performs activation weighting and pattern control, assigning activation weights to different pattern elements, enabling dynamic interpolation between input sources. In some examples, the system has threshold-based influence on pattern density, where threshold controls dynamically adjust pattern density by modifying the influence of activated elements.

In some examples, the system may employ advanced compression and abstraction techniques that reduce the computational load while preserving essential character. These compression techniques ensure that the system can handle complex transformations in real time without compromising quality.

The system generates multiple output formats that are compatible with DAWs, external systems, and other creative environments. In some examples, the system outputs MIDI and other symbolic data formats that reflect the transformed content. Outputs may include modified MIDI clips representing pattern variations, morphing results, and scaling adjustments; control change and modulation data reflecting automation and dynamic parameter adjustments; newly generated MIDI sequences created through the system's pattern interpolation and generation processes; MIDI and symbolic output, and/or the like. In some examples, generated or morphed patterns may be exported as MIDI files or clips, including control data such as velocity, CC, or aftertouch. MIDI outputs maintain strict alignment with the DAW's tempo, quantization grid, and automation data.

In some examples, the system can render audio waveforms from transformed content, generating real-time audio output for immediate use in the session. Audio outputs may include resampled and time-stretched audio, aligning transformed content with the session's timing, real-time pattern rendering generating audio representations of transformed rhythmic and melodic material, audio rendering, and/or the like. Optionally, transformed patterns may be rendered to audio in real time for auditioning, bouncing, or resampling if the system processor supports this feature. Audio output maintains tight synchronization with session playback to ensure coherence in multi-track environments. In some examples, the system outputs control and modulation signals for integration with external systems, including MIDI CC and CV/Gate Signals enabling real-time parameter modulation, OSC control data facilitating communication with external hardware and software environments, clock and timing data synchronizing transformations with external devices and systems. These control signals extend the system's capability to interface with hardware controllers, MIDI devices, and other connected systems.

In some examples, for extensibility and third-party integration, the system provides API-based data exchange protocols that allow for: external module communication enabling external plugins and systems to modify and retrieve data, and/or custom UI and control integration, allowing developers to create custom interfaces and control mechanisms. API-based data exchange expands the system's functionality by enabling seamless integration with third-party tools.

In some examples, as the system processes input data and generates transformed content, it provides real-time auditory and visual feedback that allows the user to refine pattern variations dynamically. In some examples, the system provides auditory feedback for pattern changes, where users can hear transformations as they occur, enabling immediate assessment and adjustment. In some examples, the system provides visual indicators of pattern complexity and morphing State, where dynamic UI elements visualize pattern evolution, allowing for fine-grained control over transformations. In some examples, the system allows for the saving and retrieval of various data states to facilitate future sessions, such as user-defined configurations of morphing, scaling, and transformation controls, intermediate pattern states that can be recalled for further exploration, complete project states, including input patterns, control parameters, and transformed content. Exported patterns can be conformed to session context, including loop length and harmonic structure, ensuring musical fit within ongoing projects.

In some examples, morphing operations, control interfaces, and other function, features, or elements, may include additive and subtractive versions. In some examples, negative or inverse mathematical relationships, and/or other mathematical operations, may be employed to, or between, input patterns. In some examples, the user controls may include parameters to adjust the weight or influence of one or more rhythmic building blocks upon an input and/or output pattern or patterns.

In some examples, constructive and/or destructive tools with interfaces and/or parameters based on the rhythmic building blocks structures, and/or variable nested subsets, may be employed individually or combined in various configurations to create, construct, modify, or manipulate musical and temporal patterns. For example, the user may select one or more samples or other data items to be "dropped" or inserted at each one of the time points in the selected subset. Additionally, or alternatively, the user may choose to delete or mute some specific or all events at the subset time points.

Figure 6:
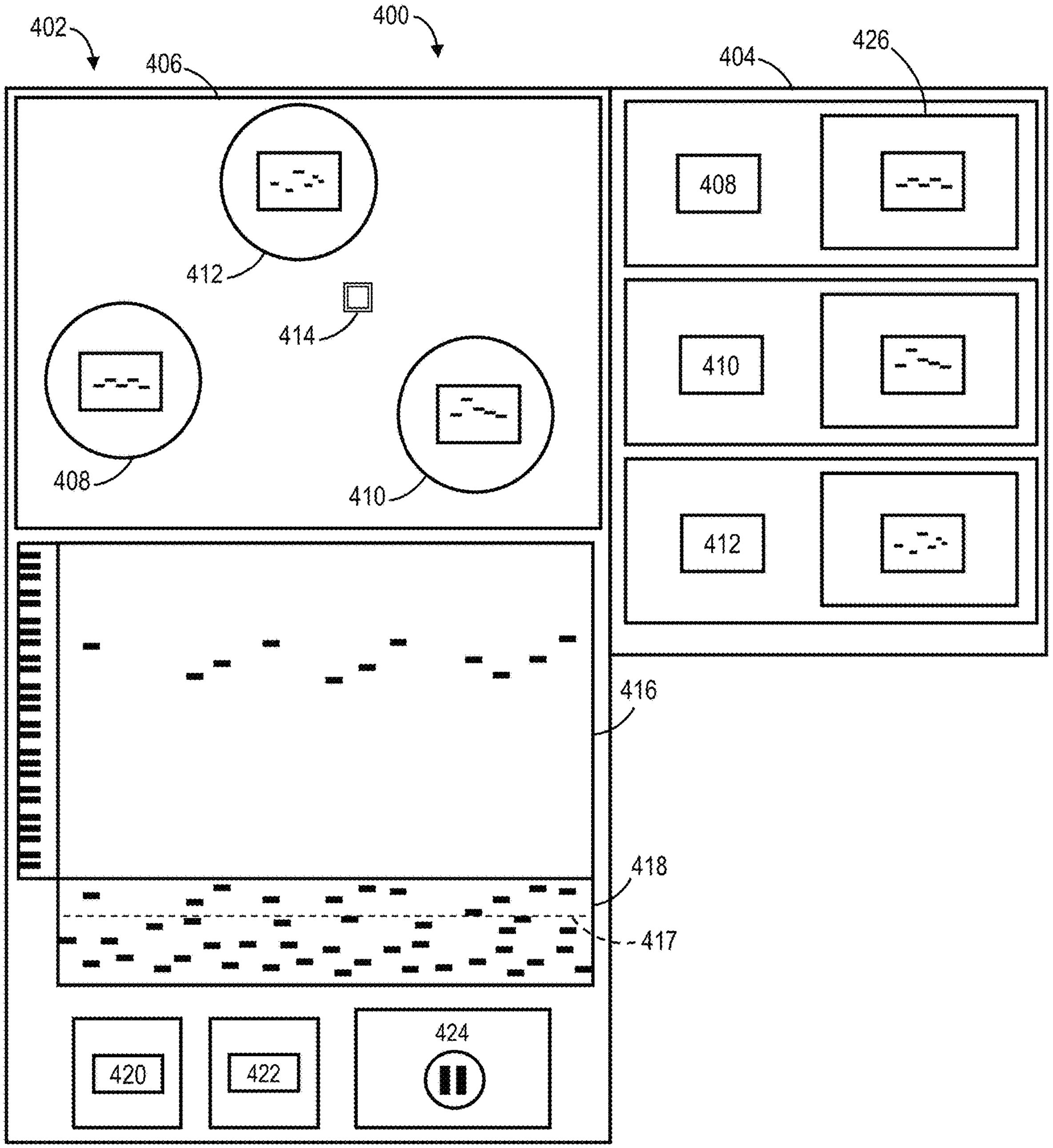
FIG. 6 is a schematic diagram of an illustrative user interface as described herein.

The following is a description of an exemplary user interface for use with the system 200 and the example DAW system and accompanying method 300 described above. An exemplary user interface 400 is depicted schematically in FIG. 6. Using simple input controls, the user is able to create entire musical phrases, as they hear them play out, live in real-time. In some examples, the user interface may have two windows: a Morphing Window 402 and a Palette Window 404.

At the top of Morphing Window 402 is a Navigation Pane 406, which e.g., contains three circles, each circle corresponding to a different musical pattern in the Palette Window, see 408, 410, 412. In general, Navigation pane 406 may contain as many or as few elements as selected by the user. In the example depicted in FIG. 6, certain geometric elements (e.g., circles) are shown, but this is simply for illustration and the system may be embodied in various layouts and graphical presentations as necessitated by the application of the system. In some examples, the color of each circle (not shown) corresponds to a currently selected Input Phrase, as displayed in the Palette Window. Each circle serves as a target icon, and the proximity of a Target 414 to each icon dynamically influences the resulting Output Phrase. Threshold lines and influence zones within the navigation pane may define how patterns blend or morph depending on distance.

Below the Navigation Pane is a Plano Roll 416, which displays the current Output Phrase in real time. In the area at the bottom of the Morphing Window (i.e., the Influence Mixer 418) is a timeline running from left to right, in which the current Input Phrase weights are shown, e.g., at 16th note resolution.

Small rectangles in Influence Mixer 418 indicate the potential for a note to occur at each 16th note time point, based on analysis of the rhythm in the respective Input Phrase. The Influence Mixer may graphically display rhythmic potentials, threshold position, activation profiles, and other control data in real-time.

Generally, the presence of a note in the Input Phrase at any given time point equates to higher potential, and a rest equates to lower potential. However, as described in more depth above, analysis of the input may assign certain rests greater potential influence than others. That is, a rhythmic structure in an Input Phrase may raise the potential for a note to occur even if a rest occupies that time point, or lower the potential of an existing note if the rhythm contextually suggests it.

Similarly, the system may assign lower potential to a note at one time point versus another time point in the same Input Phrase. This lower potential indicates that a rest is expected at the time point if the rhythm becomes less dense. The sum of all the Input Phrase potentials determines the total potential for a note to appear at each time point in the morphed Output Phrase.

The influence of each Input Phrase is further scaled up and down by the position of the Target in the Navigation Pane. Inputs closer to the Target (such as 410 in the example in FIG. 6) will have higher influence and those farther away will have less influence. Dynamic control over pattern activations is enabled through movement of the Target, with real-time adjustment of activation weights.

The horizontal Threshold Line 417 determines which potential notes are included in the Output Phrase. Notes above or right on the Threshold Line are included; notes below are excluded. Threshold boundary warnings may be visually indicated if potential values exceed recommended limits. Manual override options may allow users to include or exclude notes regardless of threshold status.

Morphing state indicators may visually show transitions between patterns as interpolation occurs, enabling users to view gradual morphing changes. Activation profile displays, including bar graphs, polar plots, and density maps, may represent likelihood distributions across time, pitch, or other parameters. Visualizations may also incorporate additional context such as velocity, note duration, or randomization noise to create various aesthetic modes.

Advanced visualization and control interface layouts such as gasket-based structures (e.g., fractal forms like the Sierpiński gasket) may be employed to represent the hierarchical relationships between morphed patterns.

The UI may also visualize microtiming and groove characteristics, such as timing deviations, swing feel, and expressive timing nuances, highlighting subtle rhythmic nuances not visible in strict grids.

At the bottom left of the Morphing Window, the currently active Input Phrases are listed in list 420. In the bottom center of the Morphing Window, an indicator 422 indicates which Input Phrase is currently selected as the Primary Model. At the bottom right of the Morphing Window is the Master Play/Pause button 424 for starting and pausing playback.

In the Palette Window 404, the available Input Phrases are displayed in this example represented by phrases 408, 410, 412. Each Input Phrase may be assigned a number and is accompanied by respective UI elements 426 which may include a Preview button, a graphical overview, and an assignment selector. The graphical overview may include shape-based representations that reflect rhythmic or melodic complexity, and/or waveform or MIDI timeline views showing note attacks and durations over time. The Input Phrase currently selected as the Primary Model is identified by a gray or gold outline.

The user creates beats and melodies with the system by blending, scaling, and morphing Input Phrases to generate new Output Phrases. The user may shape and control the creations in four primary ways: (1) by selecting 1, 2, or 3 Input Phrases from the Palette; (2) by adjusting influence by moving the Target in the Navigation Pane; (3) by dialing in the density of the Output Phrase; and (4) by modifying the pitch register, either within the current scale/mode or by octave transposition.

The Output Phrase may be a 1, 2, or 4 bar loop, or other, and updates in real time as the user adjusts these parameters. Users may intuitively steer musical output toward preferred creative directions, continuously generating novel variations as they interact. Output Phrases may be generated using the methods previously described involving rhythmic potentials, such as method 250 discussed with reference to FIG. 4.

In some examples, the system may support gesture-based and touch-based interaction. Multi-touch control panels may enable users to adjust multiple parameters simultaneously, while gestures such as pinching, swiping, or dragging may control morphing transformations and pattern evolution. Spatial gesture input may dynamically adjust pattern activations across multiple axes.

Haptic feedback mechanisms may be integrated, providing tactile feedback corresponding to pattern density, morphing transitions, or parameter shifts. Hardware integration may enable bi-directional tactile communication with external control surfaces.

The interface may be built on a modular and extensible architecture. Customizable control panels may allow users to rearrange widgets and visual modules. An external API may enable third-party developers to create new interaction modules, custom gesture surfaces, and extended control paradigms.

Adaptive learning models may dynamically optimize the UI layout based on user behavior. Frequently used controls may be prioritized, while less-used controls may be de-emphasized. Predictive suggestions for likely pattern variations, transformations, or parameter changes may be offered based on interaction history.

The system may include visual error indicators and manual override mechanisms. Inconsistencies in pattern formation, threshold warnings, or morphing conflicts may be flagged visually, allowing the user to correct or override system behavior if desired.

A responsive design framework may support cross-device compatibility. UI layouts may dynamically adapt to screen size and resolution, providing touch-friendly control layouts for mobile devices, tablets, and desktops. Auto-switching between interaction modes may preserve workflow continuity as the user transitions across devices. Collaborative and multi-user support may enable multiple users to interact with the same session in real time. Users may have synchronized pattern editing capabilities, role-based access privileges, and personalized UI views during shared creative sessions. In some examples, the system may provide optional support for augmented reality (AR) and virtual reality (VR) interfaces. Users may manipulate musical patterns through spatial 3D gestures, view holographic visualizations of morphing transformations, and interact with immersive control panels rendered in VR environments.

In some examples, the system may be used to provide an alternative to standard metric subdivisions for beat slicing and/or sample mapping applications. In some examples, inputs patterns with differing, multiple, or varying tempos may be used.

In some examples, parameters, controls, user interfaces, and other elements may employ physics properties like momentum. For example, when the user stops moving the control, it may continue moving in the same direction while slowing at some rate determined by an inertia setting or other parameter. In some examples, the system may be used for data sonification applications.

The system may include integrated preset, pattern, and session management functionality. Users may store, recall, and manage full session states, Input Phrase selections, and control configurations. Preset management may allow saving of panel layouts, morphing configurations, and palette selections. An external API may support integration of session management features into third-party applications. Curated pattern libraries, including default, user-defined, and artist-branded packs, may provide reusable starting points for creative exploration.

D. Illustrative System for Audio Mixing

This section describes an illustrative system for audio mixing. In general, the mixer (described below as the "Audio Mixer" or just "the mixer") is substantially similar to the systems described above (e.g., system 200), except in any differences described below and as understood by those skilled in the art. In other words, the mixer described in this section may be considered an example of system 200 for incorporated use as an audio mixer. Accordingly, the mixer may incorporate all or portions of methods 100, 150, and 250.

As described above, particularly with respect to system 200 and method 250, the mixer of this example identifies and leverages a latent rhythmic structure (i.e., rhythmic potential) embedded within time-based content, facilitating the modification, transformation, and generation of material more easily, quickly, and effectively than with existing tools. This latent structure, defined by rhythmic potentials that arise from rhythmic building block activations rather than fixed binary note events (attacks versus rests), forms the foundation for real-time content manipulation and generation.

The Audio Mixer is a software-based system designed to combine, manipulate, and transform multiple audio sources in real time, introducing a novel layer of rhythmic and temporal intelligence. Unlike traditional mixers that rely solely on discrete events (e.g., note onsets, subdivision grids, standard time units), this system can also generate and employ the rhythmic potentials, described above.

By incorporating this additional layer of data, the Audio Mixer empowers expressive and adaptive manipulation of audio and musical content in ways not previously possible. The mixer enables dynamic adjustments to mixing and effects parameters based on the structural properties of pre-recorded tracks, saved libraries, and incoming signals. These controls can be derived from rhythmic, melodic, or dynamic features of the material and used in mixing, routing, morphing, signal transformation, signal processing, and more.

Delay, echo, filtering, and other time-based effects may be guided by and based upon rhythmic building blocks and nested subsets, rather than only standard units like note values, note patterns, and time units. For example, delay feedback or triggering may be governed by thresholds on implied or actual rhythmic potential pattern in the audio being processed by the delay effect or triggering event, giving rise to rhythm-sensitive effects.

Morphing transitions can be shaped by high-level rhythmic or control data, allowing expressive transformations between musical content segments, audio stems, effects parameters, or other materials. These morphing operations support both automated and user-directed control, including gesture-based input.

The mixer can intelligently route or isolate structurally related segments (whether contiguous or dispersed) based on underlying rhythmic or temporal patterns, and/or user selected subsets. This enables selective processing without altering unrelated material, and supports rhythmically intelligent crossfades, dynamic routing logic, and more.

Low-latency responsiveness enables real-time adjustments and continuous feedback. Processed signals may be re-analyzed or used to drive further transformation, forming a workflow loop of creative iteration. Live input can be made to influence prerecorded content and vice versa.

Output is rendered not only as audio but also as symbolic or control data (e.g., MIDI, automation curves), making the mixer compatible with video systems, lighting rigs, synthesizers, or haptic feedback devices. This allows for multi-modal synchronization and live show integration.

This enhanced control environment allows producers, engineers, and live performers to shape both sound and musical structure with fine-grained, expressive control unlocking powerful new workflows for mixing, remixing, live adaptation, and content-aware effects design.

Users can assign and adjust audio channels with precise control over volume, panning, fades, and signal paths. Unlike traditional mixers, this system supports routing and processing of non-contiguous but structurally related segments, allowing users to isolate and modify subsets of material while preserving surrounding content. Routing decisions can also be influenced by derived rhythmic potentials or user-defined control signals.

Built-in DSP tools (e.g., EQ, compression, reverb) are enhanced with intelligent, context-aware effects such as delay, echo, and filtering. These effects may be triggered or modulated using continuous rhythmic potential data, selected rhythmic building blocks, or user selected subsets of the data, allowing creative results that adapt to the structure and timing of the source material. Separately, control signals originating from synthesizers, effects processors, or user interfaces may also be normalized and used to guide or influence the transformation of rhythmic potentials for example, modulating a morphing operation between patterns. However, these external control signals are not themselves rhythmic potentials, as they are not produced through the rhythmic analysis process.

A flexible morphing engine allows users to interpolate between musical content, parameter states, or effects chains using weighted or potential-based mappings. Morphing may be applied to musical content, control signals, or effect parameters, and can be driven by live input or predefined automation. Nested pattern matching and linked routing may also be used to provide additional flexibility in constructing or defining signal and logic chains.

Low-latency performance enables live monitoring, feedback, and adjustment. A processed signal can be reintroduced into the mixer as a control source, supporting creative iteration. The mixer can also employ proxies or templates drawn from saved sessions or similar materials to guide transformation when incoming data lacks full structural metadata and/or when waiting for a full rhythmic potentials analysis and generation process on an incoming live signal may introduce latency greater than acceptable limits for a given context.

A specialized interface allows users to select, group, and operate on specific subsets of rhythmic or temporal data. These subsets can be used to control mixing parameters, signal generation, trigger effects, or reroute content independently, enabling highly detailed, context-aware manipulation within complex arrangements.

The mixer accepts a broad range of inputs, including standard audio formats (WAV, MP3), symbolic data (MIDI, OSC, automation curves), transient maps, control signals, and other musical or non-musical event streams. It can also ingest sensor data, user interactions, and files enriched with rhythmic potentials or structural metadata. These inputs may originate from prerecorded sources, live instruments, or connected devices and interfaces.

Incoming data is augmented with enriched data which is standardized into a unified internal representation. This includes transposition, formatting, and conversion between binary and continuous data (e.g., note on/off to rhythmic potentials). The process preserves contextual features such as pitch, harmony, phrase structure, and timing associations across segments. Pre-processing may also involve predictive tagging or content type classification based on signal analysis.

Live signal input content is temporarily stored in a memory unit, which may use various types of storage such as random-access memory (RAM), flash memory, or other suitable formats to manage audio input, loop content, and generated audio. This memory system supports real-time buffering to minimize latency, ensure synchronized processing and output, and to support predictive tagging of looping content. The memory system includes a pre-record buffer that temporarily holds incoming audio for real-time analysis, retrospective looping, effects processing, and transformations like morphing and scaling.

This buffer may enable retrospective incorporation of audio data into the transformation process and supports preprocessing tasks such as rhythm analysis, timbral modeling, reducing latency and increasing processing efficiency.

Buffer sizes and durations are dynamically adjusted based on operating mode and audio input characteristics to ensure optimal performance.

The mixer applies both known and proprietary methods to extract musical or temporal context from incoming data. Standard algorithms (e.g., MIR/DSP) detect tempo, meter, key, and phrase boundaries. Proprietary transformations generate rhythmic potentials and other latent structural values, which may be visualized, mapped to controls, or routed internally for further processing.

Discrete rhythmic or temporal events may be transformed into continuous-value sequences representing rhythmic potentials. These become manipulable data structures used for routing, mixing, scaling, interpolation, and morphing. The mixer supports multi-layered analysis combining rhythmic, melodic, and dynamic dimensions to guide context-aware transformations that adapt fluidly to the input's structure and expressive intent.

Processed signals can be reintroduced as live control data or modulation sources.

The mixer may also apply control signals from external devices (e.g., synths, pedals) to influence morphing or parameter variation, as long as they're normalized for compatibility or are compatible with the mixers internal normalization capabilities. Proxies or templates based on structurally similar material may guide transformations when input data lacks sufficient metadata or cannot be processed quickly enough for a given live performance setting or creative use case. This provides flexible support for live performance scenarios and iterative refinement workflows.

Output may take the form of standard digital audio, MIDI, control curves, or enriched symbolic representations. These outputs can be routed to downstream systems including audio engines, visual systems, lighting rigs, or haptic devices and are compatible with real-time interaction or saved for reuse. The feedback loop enables continuous evolution of content through repeated cycles of transformation and control.

The mixer accepts a diverse set of inputs from both hardware and software sources, supporting live and prerecorded workflows. Primary inputs include symbolic event data (e.g., midi, osc, note on/off, velocity, timing), digital audio signals (from audio interfaces, audio files, etc.), and rhythmic potential files and structurally enriched metadata. Supplemental inputs may include control signals (from synthesizers, processors, or user interfaces), automation curves, binary sequences, and sensor data, interactive systems (gesture-based input, touchscreens, haptics), and loop memory buffers (e.g., from a pre-record buffer for live signal processing).

All inputs are either natively supported or transformed into a common internal format through normalization, transposition, and signal-type detection. Structural and contextual metadata (such as key, tempo, phrasing) are retained or inferred during processing.

Incoming material is converted into consistent internal representations, which may include rhythmic potentials, onset maps, or symbolic abstractions. The mixer supports binary-to-continuous and continuous-to-binary transformations, multi-dimensional encoding (e.g., rhythmic, melodic, dynamic), and dynamic reclassification based on content or usage. Specialized processing routines, including morphing, interpolation, and multi-layered abstraction, operate on these representations in real time where possible, asynchronously, or offline.

Outputs are rendered in symbolic, control, or audio form, depending on the application. These may include MIDI event streams, digital audio (stereo or multichannel), control curves and automation data, and structured data formats (e.g., JSON, XML) containing symbolic and structural metadata.

All outputs can be routed to external devices or systems in real time such as visual or lighting systems or stored for future editing and performance. Additionally, any output can be fed back into the mixer as new input, supporting a recursive feedback model for iterative creative development.

The mixer employs above-described algorithms to extract and manipulate latent rhythmic structures. This process includes calculating building block weights; calculating weighted average of building blocks from inputs; generating rhythmic potentials from morphed building blocks; applying a threshold to rhythmic potentials to determine actual attacks; outputting the data resulting from this process to create new musical content, control signals to drive audio processing, effects parameters, synthesizers control signals, and other kinds of multi-dimensional control data. These methods support complex transformations such as morphing, scaling, other data interpolation, and real-time routing. Algorithms are optimized for both pre-processed and live signal scenarios, and may incorporate adaptive refinement based on user interaction.

Established audio digital signal processing and music information retrieval methods (e.g., tempo detection, transient analysis, phrase segmentation) and algorithms are integrated to support feature extraction and context inference. These techniques complement the mixer's novel processing logic by ensuring robust foundation-level interpretation of incoming data, as well as standard audio processing and engineering functions and tasks.

The internal architecture supports simultaneous analysis and manipulation of rhythmic, melodic, and dynamic layers. Each layer may be treated independently or linked for context-aware operations. This abstraction system underpins structural morphing, rhythm-aware delay effects, and adaptive mixing strategies.

The mixer uses structured arrays, linked lists, and dynamic mapping schemes to store and manage complex relationships across segments, stems, and routing configurations. Specialized file formats encapsulate rhythmic potentials, control mappings, and structural metadata, allowing reliable storage, transformation, and reuse of creative content.

A flexible memory unit (e.g., RAM, flash) enables live signal buffering for retrospective looping, effects application, or predictive transformation. Buffer size and logic are dynamically configured to ensure responsiveness and temporal alignment with system operations. This component enhances real-time capabilities while minimizing latency.

Dedicated selection tools enable targeted operations on specific data subsets (e.g., isolating rhythmic segments or pattern boundaries). These tools use pattern-matching logic, variable nested subsets, and timing constraints to route signals, trigger effects, or generate custom control signals.

The mixer supports bidirectional mapping between rhythmic potentials and normalized control signals. External control signals can influence processing (e.g., morphing, interpolation), but are not themselves classified as rhythmic potentials unless derived from temporal analysis. This distinction maintains clarity between analysis-driven and modulation-driven inputs.

A learning engine may refine system responses by tracking user behavior and adjusting internal models over time. Error detection protocols automatically flag and correct inconsistencies in input or analysis. Users may override corrections or adjust confidence thresholds for more hands-on control.

The mixer supports concurrent operation across multiple transformation instances. This enables multi-track parallel processing with low latency, even under complex routing and real-time modulation conditions.

Each audio channel may be visually represented with familiar controls for volume, panning, mute/solo, and basic effects. In addition to standard features, the interface provides advanced visualizations of rhythmic potentials, morphing and scaling states, and control signal mappings. Segment-based tools and indicators allow users to identify and edit structurally related but non-contiguous content directly from the channel, track, and arrangement views.

A dynamic, interactive diagram illustrates signal routing through various processing stages, including morphing, effects chains, and variable subset transformations. Users can reconfigure routing paths or adjust transformation parameters directly within this view, promoting an intuitive understanding of the mixer's signal architecture.

Traditional level meters are augmented with displays for rhythmic activity, morphing weights, transient density, and dynamic state indicators. These elements allow users to assess both audio and structural content at a glance, supporting real-time adjustments and creative improvisation.

A dedicated interface for isolating and operating on specific subsets of rhythmic or temporal data. Users can zoom into fine-grained temporal windows, select grouped events using gesture or pattern tools, and assign control functions or routing behaviors to selected subsets. Edits to these subsets propagate across linked tracks as needed, preserving structural coherence.

As with the above-described user interface (see FIG. 6), the mixer may include interactive morph controls which may include radial morphing circles on a 2 dimensional navigation plane, weighted blending sliders, and node-based transformation editors. These controls allow real-time interpolation between states or sources, with visual feedback tied to rhythmic potentials, control signal input, or pattern matching and selection.

An optional interface module provides context-sensitive recommendations based on rhythmic structure, phrase position, or historical user preferences. Suggestions may include routing options, morphing settings, effect parameter ranges, or subset refinements.

The interface is modular and API-accessible, allowing users or third-party developers to build custom panels, visualization tools, or integrations. Support for external devices such as MIDI controllers, touchscreens, haptic systems, and video controllers makes the mixer adaptable to live performance, studio production, or installation contexts.

The UI architecture supports multi-user sessions, enabling collaborative editing, live contributions, or instructional overlays. Time-locked and layer-based editing modes preserve data integrity while accommodating complex workflows.

In some examples, a complex wave may be decomposed into individual frequency waves, which may then be normalized and applied to the mixer as inputs for morphing, using the continuous values created by the waveform as if they were a set of rhythmic potentials. Conversely, a single set rhythmic potentials may be used by an external system as a waveform, and multiple sets of rhythmic potentials may be overlapped to run concurrently and the result translated into a complex waveform.

In some examples, the functionality may be an inversion of one or more of the other deployments described herein. For example, the mixer may identify non-musical sounds at certain time points which the user would like to be suppressed or enhanced for some reason. In the instance of suppression, this may be because the sound events at the selected time points may interfere with elements of the audio material the listener wants to listen to, emphasize, or otherwise focus upon. In the instance of enhancement, the sounds occurring at the selected time points may be such that the user wishes to increase the frequency, prominence, or other aspect of them relative to the other content in the data set.

In other words, the mixer may identify sets of time points that are significantly related and then allow for or make decisions about adjustments, editing, etc. at those time points.

Current delay, reverb, and other time-based audio effects may use milliseconds and/or beats per minute as the units of time for setting of parameters, processing, and the like. This system offers a new alternative to those units of measurement. This opens up a vast array of potential new sounds and creative possibilities.

For example, an audio delay unit which provides controls and processing which use the rhythmic building blocks as the units of time instead of milliseconds, beats, or beat patterns. Such a system may for instance output instances of delay feedback that follow any number of patterns as may be selected, assembled, or otherwise constructed using the rhythmic building blocks described herein. Additionally, or alternatively, the mixer may modify the musical content of the material that is being recorded, processed, or otherwise.

In some examples, the system may enable or facilitate morphing between multiple musical tracks or takes as an alternative method of creating composite tracks. In other words, to provide an improved process for "comping" as practiced by audio engineers. In some examples, morphing or comping may be accomplished automatically, as a batch process, and/or otherwise without the user exercising real-time control. In some examples, the system may aggregate multiple inputs or takes and create an average or other representation which may serve as a guide or reference for user decisions.

In some examples, the system may enable the user to shift the rhythm of audio material similar to the way a pitch transposition effect enables the user to shift the pitch of audio material.

In some examples, the output may be normalized and/or otherwise transformed such that the threshold value is interpreted as the zero point of a waveform, modulator, or other bipolar or unipolar signal. The tempo or rate of an output may be varied or controlled independently from the tempo of the input source or output destination to enable expanded creative possibilities. In some examples, the system may interpret the attack potentials which are below a threshold setting as the repeats or "echoes" in a audio effect similar to a delay.

In some examples, in a way similar to or in conjunction with how the mixer allows musical content to be scaled up or down in real time, the mixer may provide outputs or functionality to control stage lighting, video content and screens, or other live performance production elements. This introduces a whole new range of flexibility and possibilities when designing synchronized lighting, video, and music for live events. For example, the mixer may allow lighting to be changed in relation to the rhythmic content of some of the performance content or material in a fashion that is rhythmically coherent but may not be obviously or easily matched to the content or material in a one to one or otherwise immediately apparent or easily apprehended relationship.

In some examples, the mixer may help facilitate inclusion of audience interaction, input, or other influence upon the music, video, lighting, and other elements of a live performance or media installation. Elements of which can be impacted for instance by audience actions via mobile phone, noise, movement, etc.

In some examples, the threshold and weighting functions may be adapted to achieve various creative goals, objectives, ideas, etc. in terms of audio mixing, user interactions, etc.

For example, the time points or attacks of a given input and/or output pattern may be assigned to some position within a stereo field, or any other multi-channel audio scheme. The mixer may use some combination of weighting, threshold, etc. to determine placement of individual output notes, time points, attacks, etc. within the stereo or multi-channel audio structure, spectrum, listening field, etc. For example, in an output pattern with 6 notes being played back on a stereo output system, the first note may be panned to the left, the second and third notes panned to the right, the fourth note panned center, the fifth note panned left, the sixth note panned right, etc. Additionally, or alternatively, the notes may be EQ-ed or otherwise adjusted or effected in a way that may be based on other system information, or unrelated settings, data, etc.

In a monophonic audio context, the stereo field position or location as referenced herein may instead be conveyed, reflected, interpreted, etc., as a combination of other audio characteristics such as EQ, volume, timbre, etc.

In some examples, the user and or system output objectives or determinations related to, for instance, which notes are audible or inaudible, may be directed to other goals or objectives. For instance, rather than the threshold level only determining which notes or time points in a pattern are audible, additionally, or alternatively, the threshold may also be used to assign output notes to different instruments, channels, output mixes, mix busses, etc. Such assignment or redirection may be asynchronous or synchronous, explicit or implicit, user directed or automatic, or any other of a variety of possible combinations, paradigms, conceptualizations, etc.

For example, the mixer may allow attack density for multiple instruments to be independently adjustable in parallel. Control for such functionality may operate with faders like an audio mixing console. For example, controls may include a "horizontal overlap" adjustment so that parts may be adjusted to overlap (overlap meaning to sound or play concurrently) or not overlap. For example, musical content may be mixed in a way similar to, or even concurrently with, audio mixing.

For example, the mixer may analyze, map, tag, and otherwise incorporate audio transients using rhythmic building block analysis. A user adjusted threshold control may determine how effects are applied to waveform timelines. For instance, only those above threshold are affected, are the points of maximum or minimum variance, and the like. The mixer may analyze or have effect at different levels of zoom, from beat level to sample level. For example, assign which transients are peaks of resonance filter, vibrato, or volume sweeps.

For example, system function and interpolation may have a side chain relationship to other tracks or inputs whereby a signal from an audio track or other source is used to control or influence some aspect of the mixer operation. For example, when the side chain signal from an instrument track becomes louder, more busy, etc. this may cause the density threshold or some other parameter of the mixer to rise or fall, or may cause the interpolation settings to change.

In some examples, the mixer may analyze and measure non-musical sounds in a sound recording, audio/video recording, live audio feed, augmented reality environment, virtual reality environment, and the like, and scale them up or down as if they were musical content. Additionally, or alternatively, non-musical and musical sounds may be manipulated, adjusted, and otherwise modified so that they may exist together more cohesively, as determined by various criteria, within one or more contextual settings.

For example, the Sound Scaler may operate as follows:

1) Input a sound recording of some non-musical sound, or of a sound which includes music along with other background or incidental noise.

2) Analyze the audio content and separate into multiple audio stems or audio channels. Contextualize musical and non-musical sounds, stems, channels, and the like based on for example, possible BPMs using one or more induction schemes and other features, parameters, and considerations. Analyze both musical and non-musical sounds together as one unit inducted on a variety of BPM grids, as well as separately.

3) Generate various potential music and audio relational scenarios, soundscapes, and the like using the data from step 2. The purpose of which may be to provide options for scaling various components of the soundscape up or down. If the user wants more of one kind of sound, they may be presented with options for how to introduce additional occurrences, events, or instances of that sound. Such options may include but are not limited to where to place events along a timeline, where to place sounds within a frequency spectrum, where to place sounds within a multichannel mix or soundscape. Sound events that are tagged or categorized as music, non-music, and other categories of content, may be interpolated with the same or different categories of sound events. For example, so that attacks which occur in competing frequency ranges are less likely to cancel each other out or obscure each other.

4) For example, if a user needs to tailor some music to fit with an existing set of background noises. The mixer may identify or tag some transient events at various frequencies as attack points, then interpolate the musical content to avoid those time points and/or frequencies, or to better integrate or mix with them.

5) For example, the mixer could apply the above process to audio categorized as speech or dialogue. The dialogue and or musical content may be shifted, interpolated, scaled up or down in complexity, and the like, by the mixer to fit together better or conflict less with one another based on selections, choices, preferences of the user and/or other considerations. In some instances, one or more input patterns may be used as negative qualifiers or counter indications. For example, at a given time point, or within a given frequency range, there is a non-musical sound, so the mixer may move some musical sounds which occur in this same time range or frequency band into another musically coherent time slot or frequency range.

In some examples, the mixer may analyze content and provide options or recommendations for how the material may be scaled, limited, reduced, increased, constrained, or expanded in terms of the number of notes, and or some other parameters or aspects, so that the rhythmic attacks and other musical content may align with phrases, words, syllables, and the like from one or more sets of lyrics.

In some examples, the mixer may be used to translate, transform, or otherwise adapt or modify musical content data or other so that the data may be used to drive, inform, control, affect, or otherwise influence other processes, parameters, systems, and the like. For example, musical attack patterns may be translated into a data set that can be applied to any other task. Such use may include data manipulation capabilities as described elsewhere in this document.

For example, audio transients in live or recording music may be analyzed, monitored, and otherwise incorporated as system inputs which may be used to drive or influence lighting cues, video, game elements, etc. Additionally, or alternatively, data from a non-musical system, like lighting for instance, may be translated, transformed, or otherwise modified to drive musical content in some form or context.

In some examples, the mixer may facilitate, recommend, or otherwise enable audio or musical data sets with differing beats per minute (BPM) or other contextual differences to be used together or otherwise related to one another. For example, the mixer may analyze data sets extracted from two files and identify time points or other aspects which may be used to align the two sets with or without modifying the BPM or other aspects of the data sets.

In some examples, the mixer may allow the user to place timeline markers or otherwise identify time points in a film or video (manually and/or automatically) editing context and then match, map, relate, align, or otherwise correlate a selected music track for use as a film or video soundtrack. System may process, analyze, adapt, transform, resynthesize, synchronize, or otherwise modify or adjust music to go with the film or video.

For example, the mixer and or user may identify attack points and patterns in music, and/or movements and actions in video, then adjust and edit the music and or the video to line up the explicit attacks, and or some range of implied attacks based on the input data or other criteria or information. For example, the implied attacks may be audible, subaudible or inaudible, but may serve as useful anchor points for orienting the connection or relationship of the music to the video and or vice versa.

For example, some of this functionality may be thought of as analogous to ground penetrating radar. While there are attacks or points of significance which the viewer or listener can't hear (or see in the case of video) for any number of reasons, these may still have a subconscious impact upon viewers and or listeners, and may provide a hidden map or structure we may be used to adjust the explicit (both heard and seen) content.

E. Illustrative System for Encoding Audio Files

This section describes an illustrative system for encoding (and decoding) audio files. In general, the system is substantially similar to the systems described above (e.g., system 200), except in any differences described below and as understood by those skilled in the art. In other words, the system described in this section may be considered an example of system 200 for incorporated use as an audio encoder/decoder. Accordingly, the system may incorporate all or portions of methods 100, 150, and 250.

The system is designed to augment traditional audio and video files by enabling real-time or near real-time modifications and interactions with core musical content. This system introduces a transformative capability, allowing users to modify symbolic-level musical elements such as pitch, rhythm, dynamics, and structure-far beyond superficial adjustments like volume or playback speed. These modifications can be applied across multiple layers of content, from individual tracks to grouped stems and the overall mix, giving users precise control over the playback experience.

The system operates through a dual-system architecture consisting of two distinct components, each serving different user groups, an encoding system (e.g., for content creators and companion file generators) and a playback system (e.g., for listeners/consumers).

The encoding system is responsible for analyzing the original audio or video content and extracting symbolic, rhythmic, structural, and timbral data. This extracted data is encoded into a companion file that pairs with the original media.

The encoding system can perform automatic encoding based on extracted data, but the user—whether the original content creator or a third-party companion file generator—may play a small or extensive role in deciding what information is included in the companion file. The level of user involvement can vary depending on the desired complexity and customization of the interactive experience.

The system can generate a companion file automatically using analysis algorithms that extract key symbolic and structural data with minimal user input. Additionally, or alternatively, the user may fine-tune the encoding by selecting which elements to include, specifying transformation parameters, and manually defining the interactive capabilities available during playback.

The playback system leverages the pre-encoded companion file to dynamically modify the original media during playback. It applies user-defined modifications or algorithmic transformations in real time or near real time, enhancing the listening or viewing experience. The playback system is designed for end users, listeners, fans, and consumers who engage with the modified playback interactively, creating personalized experiences.

The system operates by pairing the original audio or video content (e.g., WAV, MP3, MP4) with a companion file that extends its functionality without modifying the original media. This pairing is made possible through embedded unique identifiers, such as ISRC (International Standard Recording Code) and audio fingerprints, which allow the playback system to accurately synchronize the companion file with the corresponding audio or video file.

During an encoding phase, symbolic, rhythmic, and structural information is extracted and encoded into the companion file. The system may generate the companion file automatically or allow the user to select, refine, and define the information included in the companion file. This phase may be performed by the original content creator or by third-party users who generate new companion files for alternate interpretations or interactive applications.

During a playback phase, the system dynamically aligns these pre-encoded modifications with the original content, allowing users to modify and steer playback to create variations that feel akin to live performance.

When combined with a capable playback system, the companion file allows listeners to dynamically adjust rhythmic patterns, modify timbral characteristics, and restructure sections of a composition without requiring alternate versions of the original recording. These modifications can be applied at various granularities, from full tracks to isolated stems or specific rhythmic and melodic components. This process transforms traditional media consumption into an immersive and adaptive experience.

The system enables multiple methods of interaction and modification. For example, users may manually apply changes during playback by adjusting musical parameters such as pitch, rhythm, and dynamics, predefined transformation rules can apply algorithmic adjustments dynamically, and/or the system may incorporate AI-driven or hybrid modifications based on contextual factors or user preferences.

In all cases, modifications occur within the playback system using symbolic and timbral data that was encoded during the original encoding phase. This ensures that the integrity of the original content is preserved while enabling a wide range of personalized playback experiences.

The companion file format may also support adaptation and synchronization capabilities that facilitate mashups and cross-content blending. This functionality allows variations of different songs or media to be seamlessly merged or modified to generate new experiences. However, these capabilities are predefined during the encoding phase by content creators or third-party companion file generators and only become accessible to listeners during playback through the companion file.

This dual-system architecture empowers content creators and companion file generators to encode rich, symbolic-level information while allowing listeners and consumers to engage with and shape their listening experience. The system's separation of encoding and playback functions ensures that creators retain artistic control over the content while enabling listeners to explore and modify the playback in dynamic and personalized ways.

The system maintains parallel symbolic and audio representations, ensuring that modifications align with both the original musical content and the creator's artistic intent. For example, the encoding system may store symbolic, rhythmic, and structural information that guides playback modifications and the playback system may dynamically interpret these symbolic modifications, preserving musical coherence while allowing for personalized variations.

The companion file encodes and stores data at multiple hierarchical levels, allowing flexible and granular modifications during playback. Accordingly, the encoding system may organize data hierarchically, capturing relationships between different content layers, including structure-level information about the overall form and arrangement of the content, track-level data about individual instrumental, vocal, or sound elements, composite stems that group related elements such as percussion, bass, or harmony, and mix-level data describing the overall blend and balance of the content. The playback system accesses and modifies these hierarchical data structures in real time, allowing for dynamic reconfiguration and content adaptation.

In some examples, the system incorporates timbral information that enables the playback system to synthesize, modify, or substitute instrumental sounds dynamically during playback. Timbral data may be encoded during the encoding phase, either automatically or with user-defined input specifying the desired timbral variations. The playback system uses this encoded information to synthesize timbral elements dynamically and/or select appropriate timbral options as substitutes for original instrumental or vocal parts. This ensures that modifications preserve musical integrity while allowing creative flexibility.

The companion file format functions as a supplemental file that pairs seamlessly with standard audio and video file formats, such as industry-standard formats, including WAV, MP3, and MP4. In some examples, embedded unique identifiers, such as ISRC and audio fingerprints, ensure precise synchronization with the corresponding media files.

In some examples, the system supports collaborative workflows by enabling iterative modifications and refinement of companion files over time. For example, the encoding system may allow multiple users to contribute to a shared version of the companion file, thereby facilitating asynchronous modification and refinement where collaborators can iteratively refine the content. The playback system may apply shared or refined modifications in real time and supports versioning and exploration of multiple playback configurations.

The system enables adaptive variations of music that dynamically adjust to different environments and contexts. Context-aware adaptation rules may be encoded during the companion file creation phase. These rules are applied during playback to modify the content dynamically based on environmental factors or user context. This feature supports applications in smart home systems, retail environments, and therapeutic settings where music can be adapted to reflect mood, theme, or user needs.

The playback system uses the generated companion file to apply modifications to the original media during playback. This phase ensures that user interactions and algorithmic transformations occur without altering the original media, creating a dynamic and immersive playback experience. During playback, the companion file is loaded alongside the original audio or video file. Embedded identifiers, fingerprints, tempo maps, and other data ensure precise synchronization between the companion file, the media content, and the playback system. The system dynamically aligns symbolic-level modifications with corresponding audio or visual content to maintain coherence.

The playback system processes user modifications and applies them dynamically to the audio or video content using pre-encoded symbolic data. These modifications can be rendered in real time or pre-processed to ensure minimal latency and optimized playback performance. Encoded timbral information allows the playback system to dynamically synthesize or substitute timbral elements in real time, preserving the original content's artistic intent while enabling creative variations.

The system supports iterative refinement of companion files and collaborative workflows, allowing multiple users to modify, save, and share companion files. Companion files can be modified iteratively, with refinements and enhancements made over time. Multiple contributors can collaborate asynchronously, refining companion files to reflect diverse interpretations of the same content. Real-time collaboration can be facilitated by enabling participants to dynamically modify playback in shared or remote environments. Playback modifications made in real time can be saved and exported for future playback iterations.

The modified content can be exported in various formats to ensure compatibility with different playback environments. Exported companion files can be bundled with the original audio or video content or distributed independently. Modified versions may also be exported as derivative works or interactive versions that maintain compatibility with different playback systems. The playback system allows listeners to export modified versions of the content as standalone audio or video files and supports bundling of companion files with original media for wider distribution.

The Interactive Music System and Companion File Format utilizes a versatile input/output system that accommodates a wide range of audio, video, and symbolic data formats. The system's architecture ensures efficient data flow between the encoding and playback systems, enabling seamless content modification and rendering. Input and output processes are aligned with the system's dual-component architecture, where the encoding system processes data to generate companion files, and the playback system applies modifications and renders content dynamically.

The encoding system ingests a variety of input data types to extract meaningful information and generate the companion file. These inputs include symbolic, audio, and video data, as well as metadata that enables synchronization and dynamic modification during playback. The encoding process can be fully automated or user-guided, depending on the level of control desired by the content creator or companion file generator.

Standard audio formats such as WAV, MP3, AAC, and other common file types are ingested. Multi-track audio files or stem-based representations that separate individual instruments or sections are also processed. Audio files that contain only a stereo mix can be processed using stem-splitting algorithms to isolate instrumental or vocal components during playback. Standard video formats such as MP4, MOV, and other formats that contain embedded audio tracks are ingested, with synchronization data extracted from video timelines to align visual and audio content dynamically. MIDI files or other symbolic representations provide information about pitch, rhythm, and structure, encoding harmonic, melodic, and rhythmic elements that can guide playback modifications. Control data provided by users during the encoding phase allows fine-tuned modifications of symbolic, rhythmic, and timbral data. Manual user input may define transformation rules, specify interactive options, and curate the encoding of variations.

Embedded metadata such as ISRC (International Standard Recording Code) or audio fingerprints ensure seamless pairing of the companion file with the original media. Structural and form data preserves information about the composition and arrangement of the original content. Input from creators may include timbral details, stylistic guidance, or modification preferences, assisting the system in maintaining artistic coherence and ensuring that variations align with the original creator's vision.

The encoding system processes the input data and generates a companion file using a combination of efficient encoding techniques and hierarchical data structures. Symbolic, rhythmic, and structural content is encoded using binary arrays, continuous real numbers, and other data types that preserve detail while optimizing storage efficiency. Hierarchical and nested structures ensure that modifications can be applied at multiple levels during playback. Timbral data is encoded to enable dynamic synthesis and substitution during playback, capturing rhythmic potentials, transient patterns, and timing relationships to facilitate real-time variations. The companion file format may employ symbolic compression techniques to reduce file size without compromising detail, with compression algorithms optimizing storage while maintaining high fidelity for real-time modifications.

The playback system uses the generated companion file to modify and enhance the original media during playback. This system dynamically processes input from the companion file, along with real-time user interactions and contextual factors, to generate modified output. The playback system loads the original audio or video file alongside the associated companion file, using embedded identifiers to ensure precise synchronization between the companion file and the original content. Listeners interact with the playback system through a variety of control interfaces, including visual interfaces, external controllers, and algorithmic systems, adjusting pitch, rhythm, dynamics, or structural patterns in real time. Predefined transformation rules encoded during the encoding phase guide algorithmic modifications, while context-aware systems may dynamically adapt playback based on environmental factors or user behavior.

The playback system applies modifications encoded in the companion file or generated dynamically during playback. This real-time transformation produces an enhanced playback experience that maintains the original media's integrity while offering creative variations. Real-time or near-real-time rendering of altered musical content is based on user modifications or algorithmic transformations, affecting pitch, rhythm, dynamics, structure, and timbral characteristics. The system can generate multiple playback paths or alternate variations of the original recording, allowing users to explore different outcomes interactively. Playback paths may reflect user preferences, algorithmic control, or external triggers.

The Interactive Music System and Companion File Format leverages a combination of proprietary algorithms, existing algorithms, advanced data structures, and efficient processing techniques to enable real-time modification and interaction with audio and video content. The system's architecture is built around its dual-component design, where the encoding system generates the companion file by extracting and encoding symbolic and timbral information, and the playback system dynamically modifies content during playback using that pre-encoded data.

The playback system supports exporting modified versions of companion files and audio/video content, ensuring compatibility across diverse playback environments. Companion files modified through user interaction can be saved and shared for future use, with refined versions retaining symbolic and structural information to enable continued exploration of interactive possibilities. The system may optionally render and export audio or video files that reflect user modifications, preserving the interactive experience in a fixed format. These derivative works maintain compatibility with different playback systems and environments.

The playback system supports mashups and synchronized content generation by blending multiple pieces of original content dynamically. Modifications can be applied to create smooth transitions between content or to align multiple tracks with synchronized timing. Context-aware blending ensures that variations remain rhythmically and structurally coherent.

The system ensures seamless pairing and synchronization between the companion file and the original media through advanced synchronization techniques. Embedded unique identifiers, such as ISRC codes and audio fingerprints, ensure that the companion file is correctly paired with the original media. Tempo maps, warping, and other synchronization techniques dynamically align symbolic and audio data, ensuring seamless interaction between the companion file and the media content. Precise time synchronization guarantees that all modifications are applied accurately to the corresponding sections of the audio or video file.

The encoding system uses symbolic compression techniques to optimize the size of the companion file while preserving essential musical and structural information. These techniques allow efficient storage and retrieval of data while ensuring high fidelity for real-time modifications during playback.

The encoding system identifies recurring rhythmic, melodic, and harmonic structures in the original content. Patterns are mapped to symbolic representations that can be efficiently stored and modified. The system may automatically extract and encode symbolic data with minimal user input, or allow the encoding user to define what information is stored in the companion file. User-defined encoding options can specify transformation parameters, modify symbolic structures, and refine playback capabilities. Compression algorithms reduce data redundancy by identifying recurring patterns and encoding them using efficient symbolic formats. The system may apply quantization and normalization techniques to ensure consistency across different data sources. The playback system interprets the symbolic data encoded in the companion file to generate variations of the original content dynamically. Modifications can include rhythm pattern morphing, pitch transformations, and structural rearrangement, all aligned with the original content's symbolic framework. Symbolic data is aligned with the original audio or video during playback to ensure real-time modifications maintain musical coherence. Playback alignment techniques dynamically map pattern variations to the original content's timing and structure.

The system encodes data hierarchically, capturing relationships between individual musical elements across multiple layers. These hierarchical and nested structures allow modifications to be applied at various levels during playback without disrupting the coherence of the original content.

The encoding system organizes data into hierarchical levels, ensuring that relationships between structural, track, stem, and mix-level elements are preserved. Data is encoded to facilitate granular control during playback, enabling modifications at multiple levels of detail. Structure-Level encodes information about the overall form and arrangement of the content. Track-Level stores data about individual instrumental, vocal, or sound elements. Stem-Level groups related elements (e.g., percussion, bass, harmony) into composite layers. Mix-Level captures overall blend and balance, enabling high-level modifications.

The playback system uses hierarchical data to apply modifications across different levels of content granularity. Users can modify full tracks, individual stems, or specific rhythmic and melodic elements during playback. Hierarchical structures facilitate rapid retrieval of data, allowing the playback system to apply user-defined or algorithmic modifications with minimal latency.

The system's rhythmic potential analysis and generation algorithms enable real-time interaction with the rhythmic structure of musical content, allowing users to dynamically modify rhythm patterns while maintaining musical coherence.

The encoding system extracts rhythmic potentials, transient patterns, and timing features from the original content. Rhythmic potentials are encoded as part of the companion file, allowing for real-time manipulation during playback. Users may define rhythmic variations or specify adaptive rhythm generation options during encoding. These predefined transformations guide playback modifications to maintain rhythmic coherence.

The playback system dynamically modifies rhythmic patterns based on encoded rhythmic potentials. Real-time pattern morphing enables seamless adaptation between rhythmic structures, giving users control over variations during playback. Rhythmic pattern transformations can be guided by user interactions, algorithmic rules, or a combination of both.

In addition to its proprietary rhythmic algorithms, the system may use non-proprietary or third-party algorithms to perform modifications related to pitch, harmony, and timbral characteristics. These algorithms ensure high-quality transformations while expanding the system's flexibility.

The encoding system analyzes and encodes harmonic structures and pitch information that guide playback modifications. Timbral characteristics of individual instruments or stems are encoded for dynamic synthesis or substitution during playback. Encoding may incorporate timbral substitution rules to ensure that timbral modifications maintain artistic coherence.

The playback system dynamically modifies pitch and harmonic content while preserving musical integrity. Users can explore alternate harmonic structures and melodic variations in real time. Dynamic timbral synthesis enables the playback system to modify or substitute timbral elements during playback. Pre-existing timbral options may be selected or synthesized to match the intended aesthetic of the original content.

The system encodes AI interpretation and content generation guidance provided by the original artist, producer, or engineer to assist AI models in generating contextually appropriate variations.

Guidelines for AI-generated content may be encoded within the companion file to ensure that AI-generated variations align with the original work's stylistic intent. These guidelines provide stylistic, harmonic, and rhythmic boundaries that guide the AI's output. Context-aware metadata helps AI models create derivative works or variations that reflect the original content's creative vision.

The playback system applies AI-driven variations during playback, guided by encoded metadata and AI generation rules. AI-generated modifications can be refined through user interaction or pre-defined adaptation rules to maintain creative coherence.

The system includes an API layer that enables external applications, DAWs, and media players to access and manipulate the companion file's data dynamically.

The API allows external systems to refine encoding parameters dynamically. External systems can specify encoding rules, transformation settings, and content generation options.

External systems can use the API to trigger modifications and adjust playback parameters in real time. API access allows seamless integration with DAWs, gaming environments, and other interactive platforms. Pre-scripted modifications can be applied automatically, while API commands may also trigger context-aware transformations dynamically.

The Interactive Music System and Companion File Format accommodates a flexible and adaptable user interface (UI) designed to facilitate interaction at multiple stages of the system's workflow. The UI is structured to serve two distinct user personas, aligning with the system's dual-component architecture: Encoding System UI provides interfaces for content creators and companion file generators to encode symbolic, rhythmic, and timbral data into the companion file. The UI supports both automatic encoding processes and manual refinement for greater control over interactive possibilities. Playback System UI offers interactive interfaces for listeners and consumers, enabling real-time or near-real-time modification of musical content during playback. These interfaces allow users to dynamically adjust rhythm, pitch, structure, and timbral characteristics. The UI may be implemented as part of a standalone application, a plugin for a digital audio workstation (DAW), or an embedded interface within a media player or interactive system. It supports multiple interaction paradigms, allowing users to control, modify, and adapt musical content dynamically.

The encoding system UI provides creators with a range of control options, enabling both automatic encoding workflows and user-directed refinement of companion file data. It allows for intuitive management of symbolic, rhythmic, and structural information to define interactive options available during playback.

The encoding system UI supports automatic companion file generation with minimal user input, enabling quick encoding of extracted data. It allows for high-involvement manual encoding where the user can refine encoded information, define interactive parameters, and select transformation rules. Visual interfaces are provided for adjusting extracted symbolic data, enabling creators to modify rhythm, pitch, and structural patterns. The UI supports track-level, stem-level, and mix-level modifications, allowing granular refinement of encoded elements. Hierarchical representations of the musical content are displayed, enabling users to refine data at structure, track, stem, and mix levels. Intuitive drag-and-drop interactions allow users to define how interactive elements will behave during playback.

Users can define transformation rules that govern modifications during playback. Transformation parameters, rhythmic morphing options, and timbral substitutions can be encoded manually or selected from predefined templates. AI-driven recommendations assist users in encoding data that aligns with the intended artistic vision. AI models can suggest variations or refine interactive options based on stylistic guidelines provided by the content creator.

The encoding system UI enables iterative refinement of companion files over multiple sessions, allowing content creators to fine-tune encoded data gradually. Multiple contributors can modify, save, and share companion files iteratively. Export options are provided to bundle companion files with the original audio/video content or as standalone files for future interactive use. Modified companion files that include user-defined refinements can be exported.

The playback system UI empowers listeners and consumers to dynamically interact with the modified content during playback. This UI provides intuitive interfaces that enable real-time modification and control over musical parameters.

The playback system UI displays symbolic, rhythmic, and structural elements of the content in an intuitive interface. Visual feedback on the modifications applied during playback enhances user engagement and control. Users can modify pitch, rhythm, dynamics, and structure interactively, with adjustments supported at multiple levels, including full tracks, individual stems, and specific rhythmic or melodic elements. Interactive control panels provide sliders, knobs, and buttons for direct control over musical parameters. Customizable layouts adapt to different use cases, allowing users to optimize the interface for their preferred workflow.

Listeners can modify content in real time by adjusting interactive controls, supporting dynamic interaction with rhythmic patterns, timbral characteristics, and harmonic structures. Algorithmic modifications based on pre-defined transformation rules encoded in the companion file can be applied. Context-aware adaptation allows playback modifications to dynamically adjust to user preferences or environmental factors. Hybrid models support manual interaction and algorithm-driven modifications, giving users a balanced blend of control and automation.

The playback system UI provides real-time visual and auditory feedback as users modify content during playback. Changes are reflected immediately in the playback, allowing for intuitive control over musical variations. Pattern grids and sequencer interfaces allow users to modify rhythmic and melodic structures, supporting real-time visualization of pattern changes and dynamic transformation of musical elements.

The encoding system UI enables direct interaction with symbolic, rhythmic, and timbral data during the encoding phase. Interfaces are provided for refining encoded data and defining transformation rules. Algorithmic/AI mode assists creators in generating symbolic data variations or suggesting interactive options using AI models. Automated encoding workflows are supported, where the system extracts and encodes data with minimal user input. Hybrid mode allows creators to combine manual encoding with AI-assisted recommendations, providing a balanced approach to encoding refinement.

The playback system modes offer interactive control for listeners. Manual Playback Mode allows listeners to adjust musical parameters interactively, creating personalized playback experiences and supporting user-directed exploration of alternate variations and playback paths. Algorithmic/AI Mode enables playback modifications driven by algorithmic rules or AI models, dynamically adapting content based on predefined guidelines and providing context-aware playback variations that reflect the user's preferences or environmental factors. Hybrid Playback Mode combines manual user control with algorithmic or AI-driven modifications, allowing listeners to refine playback through a combination of interaction and automation.

The system's UI is designed to integrate seamlessly with external systems and control surfaces, ensuring that users can interact with the system through a variety of interfaces.

Encoding System Integration Options include DAW Integration for Encoding, which functions as a plugin that integrates with popular DAWs, allowing creators to define companion files directly within their production environment and supporting MIDI mapping and automation for encoding interactive content. API Access for Encoding Control provides API endpoints that allow external systems to refine encoding parameters and define transformation rules dynamically, enabling automated encoding workflows where companion files are generated programmatically.

Playback System Integration Options include DAW and Media Player Integration, allowing the playback system to function as a plugin or embedded interface in media players, enabling real-time modification during playback and supporting integration with DAWs for interactive performance environments. API and External Command Interfaces provide API endpoints that allow external systems to trigger modifications and adapt playback parameters dynamically, supporting real-time control through OSC (Open Sound Control), MIDI, or other command protocols.

To further enhance user interaction, the system may provide AI-assisted guidance and recommendations that assist both content creators and listeners in modifying content effectively.

Encoding System AI Guidance includes AI-Suggested Encoding Options, which assist creators in selecting symbolic and structural data to encode into the companion file and suggest transformation parameters that align with the creator's artistic vision.

Playback System AI Recommendations offer context-aware playback modifications, providing AI-driven recommendations for modifying rhythmic, harmonic, and structural elements during playback and suggesting alternate playback paths or variations based on user preferences or system-detected patterns.

The system supports real-time interaction, making it well-suited for live performance and improvisation scenarios where dynamic modifications are required.

Performance-Oriented UI for Live Settings offers streamlined interfaces optimized for quick modifications during live performances, supporting interaction with pitch, rhythm, and timbral characteristics dynamically. An adaptive feedback loop for performers provides immediate auditory and visual feedback, enabling performers to steer the music intuitively in response to audience energy or environmental factors.

The UI is designed to be accessible and customizable, ensuring that users of varying skill levels can engage with the system effectively.

Customizable Layouts and Control Options allow users to tailor the interface to their preferences, optimizing their workflow and supporting flexible UI configurations that adapt to different devices and platforms.

Accessibility Options incorporate inclusive design for diverse users, including accessibility features such as screen reader support and alternative input methods, ensuring that the system remains usable by a broad range of users with diverse needs.

The encoding system is responsible for analyzing original audio and video content, extracting symbolic, rhythmic, structural, and timbral data, and encoding this information into a companion file. This phase can be fully automated or manually refined, depending on the desired level of user involvement. Automatic encoding extracts and encodes data with minimal user input, while manual encoding allows creators and companion file generators to refine and customize companion files by defining transformation rules, selecting interactive elements, and fine-tuning encoded content. The encoding system organizes data across multiple hierarchical levels, ensuring that modifications during playback are coherent and contextually appropriate. Encoded data includes structural, track, stem, and mix-level information, allowing for dynamic control at various levels of granularity. Original content creators can encode companion files to define the boundaries of interactive possibilities, while third-party companion file generators may create alternate versions or enhanced interactive possibilities for pre-existing content, expanding the range of potential applications.

The playback system dynamically modifies and enhances the original media during playback by applying user-defined modifications or algorithmic transformations encoded in the companion file. It empowers listeners and consumers to personalize their listening experience without altering the original content. The playback system uses symbolic and timbral data encoded during the encoding phase to apply modifications dynamically. Real-time modifications may include changes to pitch, rhythm, dynamics, structure, and timbral characteristics. Listeners can interact with playback through manual interfaces, dynamically adjusting musical elements in real time. Algorithmic modifications, driven by predefined transformation rules, can dynamically adapt playback based on user preferences or environmental factors. The playback system supports hybrid models that allow users to refine playback interactively while maintaining algorithmic control over contextual modifications.

The system ensures seamless integration between the encoding and playback phases, maintaining fidelity between pre-encoded transformations and real-time modifications applied during playback. Unique identifiers such as ISRC (International Standard Recording Code) and audio fingerprints ensure accurate pairing and synchronization between the original media and the companion file. Symbolic and audio data remain aligned during playback, preserving coherence between encoded transformations and dynamic modifications. The playback system interprets and applies modifications encoded in the companion file, allowing for real-time interaction that adheres to the boundaries established during encoding. Context-aware modifications ensure that dynamically generated variations maintain rhythmic and structural integrity.

The system supports a diverse range of use cases by enabling flexible content modification and adaptation across multiple contexts. These applications include but are not limited to personalized music playback, where listeners can modify content dynamically, creating unique playback experiences that reflect their preferences. Symbolic and timbral variations ensure that personalized playback maintains artistic coherence. The system integrates seamlessly with interactive environments where real-time content modifications enhance gameplay, video experiences, and adaptive media applications. Dynamic adjustments to content parameters enable responsive and contextually aware playback. Performers can leverage the system's real-time control capabilities to manipulate content dynamically during live settings. Interactive interfaces provide immediate feedback, allowing performers to adjust rhythm, harmony, and timbral characteristics intuitively. The system may support mashups and synchronized content generation by blending multiple pieces of original content dynamically. Modified companion files can be exported as derivative works or interactive versions compatible with various playback environments.

The system fosters an iterative refinement and collaboration process, allowing content creators, companion file generators, and listeners to contribute to and refine companion files over time. Multiple contributors can modify, save, and refine companion files iteratively. Real-time collaboration allows participants to apply changes dynamically during playback, with immediate reflection in the interactive experience. Companion files can be refined iteratively to explore alternate playback paths and variations. Versioning ensures that different interpretations of the same content can be explored and preserved for future use.

The system is built on a future-proof and scalable architecture, ensuring adaptability to emerging technologies and expanding use cases. The system pairs seamlessly with standard audio and video formats (e.g., WAV, MP3, MP4), ensuring widespread adoption and integration. The architecture supports future extensions, including AI-driven content generation, contextual adaptation, and advanced synchronization techniques. Open API endpoints enable integration with DAWs, media players, and interactive platforms, allowing for dynamic modifications across diverse applications.

The system incorporates AI-assisted adaptation and context-aware interaction capabilities that enhance both the encoding and playback phases. AI models assist in refining encoded content, suggesting transformation parameters, and generating adaptive variations aligned with the creator's artistic vision. Context-aware AI systems dynamically modify playback content based on environmental factors, user behavior, or contextual inputs. AI-driven modifications ensure that playback adapts dynamically to the listener's preferences and the context of use. Adaptive transformations maintain coherence with encoded guidelines while introducing intelligent variations that enhance the user experience.

In some examples, the system may enable an adaptive advertising format such that an appropriately enabled playback or ad serving system may interpret the content of the ad to match a variety of musical and contextual settings. For example, the system may incorporate data about media content the user is viewing concurrently or consecutively with the adaptive advertisement, so that the system may interpret the adaptive advertisement content in such a way as to match or adjust to the user context. Such a system may enable advertisements to be stored or represented in a very compressed or abbreviated format such that the content is flexible enough to be applied across multiple formats, durations, user contexts, and the like.

In some examples, the system may be employed to syncronize and/or reconcile two or more sources with conflicting musical content. For example, for a user who is listening to an audio streaming service while scrolling social feeds, and who wants to hear the music or audio content from the social feed without disrupting their audio streaming service listening experience.

F. Illustrative System for Real-Time Audio Effects Processing

This section describes an illustrative system for real-time audio effects processing. In general, the system is substantially similar to the systems described above (e.g., system 200), except in any differences described below and as understood by those skilled in the art. In other words, the system described in this section may be considered an example of system 200 for incorporated use as a real-time audio effects processor. Accordingly, the system may incorporate all or portions of methods 100, 150, and 250.

The system accommodates multiple types of analog and digital audio inputs, including instruments, microphones, and external audio devices. Incoming analog signals are routed through an analog-to-digital (A/D) converter that digitizes the signal for further processing. This conversion ensures high-resolution audio quality, preserving the original characteristics of the input source. Input characteristics, including gain and impedance matching, may be dynamically adjusted based on the connected source. These flexible input options enable seamless integration with a wide variety of musical instruments and audio sources.

The system processes audio content using a programmable digital platform, which may include a digital signal processor (DSP), microcontroller, field-programmable gate array (FPGA), or similar processing hardware. This platform handles real-time audio analysis, transformation, and rendering operations to ensure seamless performance during live and studio use. Audio processing begins after the analog signal is converted to digital format by the A/D converter, ensuring that high-resolution audio quality is maintained before applying transformations and effects.

Audio content is temporarily stored in a memory unit, which may use various types of storage such as random-access memory (RAM), flash memory, or other suitable formats to manage audio input, loop content, and generated audio. This memory system supports real-time buffering to minimize latency and ensure synchronized playback. The memory system includes a pre-record buffer that temporarily holds incoming audio for real-time analysis, retrospective looping, and transformation. This buffer may enable retrospective incorporation of audio data into the transformation process and supports preprocessing tasks such as timbral modeling, reducing latency and increasing processing efficiency. Buffer sizes and durations are dynamically adjusted based on operating mode and audio input characteristics to ensure optimal performance.

The unit accommodates multiple input and output options, which may include audio jacks for instruments and microphones, MIDI ports for control signals, and USB connections for data transfer and external control. Footswitches, expression pedals, or other control interfaces may be included to provide real-time user input, allowing dynamic adjustments to loop parameters, pattern transformations, and audio effects. The system also incorporates a bypass circuit that can route audio signals directly to the output, bypassing the record buffer and transformation stages when engaged. This circuit allows users to choose between original and processed audio content dynamically, enabling seamless transitions during live performance or recording.

The system processes incoming audio through a series of buffers and transformation stages, maintaining low latency and preserving audio fidelity during real-time operations. The Signal Flow and Buffering Architecture dynamically manages multiple audio states, ensuring seamless transitions between different loop states, transformations, and playback modes.

The system architecture generally consists of three primary buffer stages, each serving a distinct role in managing audio content. A pre-record buffer is configured to temporarily store incoming audio for real-time analysis, retrospective looping, and transformation. This buffer allows the system to analyze content prior to transformation and facilitates pattern morphing, delay effects, and adaptive pattern modification. A record buffer stores looped audio content for subsequent playback and transformation. The record buffer supports non-destructive overdubbing, continuous pattern evolution, and loop modifications while maintaining high timing accuracy. A render buffer holds transformed or generated audio for seamless playback and loop transitions. Rendered content is dynamically aligned with the original loop state, enabling smooth crossfades and synchronized transformations.

The buffering architecture employs dynamic management techniques to adapt buffer sizes, data flow, and latency parameters based on operating mode and user-defined preferences. This ensures that audio transitions remain seamless, even during complex transformations or loop modifications. Adaptive buffer allocation automatically adjusts buffer size and duration to maintain timing accuracy, prevent buffer underruns or overruns, and optimize system performance. Real-time synchronization maintains precise synchronization between buffer stages to ensure accurate playback, pattern interpolation, and crossfade management during loop transitions. Low-latency buffering techniques minimize delay introduced by buffer operations, ensuring that audio content is processed and rendered with minimal latency.

Buffering behavior adapts dynamically based on the selected operational mode. In mono mode, a single audio stream is processed through core buffer stages, ensuring phase coherence and low-latency operation. Stereo mode maintains dual-channel processing, preserving stereo imaging and ensuring synchronized transformations across both channels. Multi-track mode allocates independent buffer paths for multiple audio sources, enabling complex layering, parallel transformations, and simultaneous playback of different audio tracks.

The architecture supports real-time crossfade and buffer overlap techniques to ensure seamless transitions between loop states and transformations. When switching between recording, playback, overdubbing, or pattern morphing, buffer management dynamically blends audio to eliminate clicks, glitches, or timing artifacts. Automatic crossfade management dynamically applies crossfades during loop transitions, ensuring smooth pattern variations. Buffer overlap and alignment prevent audible gaps or timing mismatches by maintaining aligned buffer states across transitions.

Pattern transformations and morphing occur after the pre-record buffer and may dynamically modify the loop's timing, feel, rhythm, and harmonic content to create real-time variations and transformations. Time-stretching, pitch-shifting, and other real-time effects are applied within the render buffer, allowing for seamless blending between original and transformed content.

The system includes an Analysis-Extraction Library of rhythmic, harmonic, and structural feature information provided with the system, previously saved by the user, or extracted from recorded audio from the current user session. The library stores this data as symbolic or metadata information, which is then used to inform pattern transformations, morphing, and real-time effect processing. By leveraging this extracted data, the system ensures that modifications maintain musical integrity while introducing creative variations to the loop content.

The Looping and Buffering Architecture manages the recording, playback, and modification of looped audio content while maintaining seamless transitions between loop states. This architecture dynamically synchronizes buffer states and audio transformations to preserve timing consistency and minimize latency during real-time performance.

The system supports multiple loop states, each triggering specific buffer operations and audio transformations. Seamless state transitions are enabled by dynamic buffer allocation and predictive timing algorithms. In the Record State, incoming audio is captured in the record buffer, where loop content is stored and modified during overdubbing or pattern evolution. The Playback State retrieves looped content from the render buffer, applying real-time transformations and synchronization with external timing sources. The Overdub State merges new audio with existing loop content, allowing for non-destructive additions and pattern modifications. The Transform State applies morphing, interpolation, and real-time pattern modifications to audio and then incorporates the modified audio into the looped playback content to enable the looped content to evolve dynamically.

Buffer overlap and adaptive crossfade techniques ensure smooth transitions between states. The system anticipates timing mismatches and dynamically recalibrates buffer states to prevent audible glitches or phase misalignment.

The architecture employs a dynamic buffering system that adapts buffer sizes and durations to the current loop state and transformation parameters. This ensures that buffer management remains efficient even under complex loop modifications. The pre-record buffer temporarily stores incoming audio for retrospective pattern modification and real-time analysis. The record buffer holds looped audio content for overdubbing, transformation, and playback. The render buffer stores modified or synthesized audio content to maintain synchronization during playback and pattern evolution.

Buffer alignment algorithms adjust start and end points and timing offsets to prevent desynchronization during loop state transitions, ensuring that modified content remains phase-locked and aligned with user-defined parameters.

In some embodiments, the system may support multi-track loop layering, enabling simultaneous playback and modification of multiple audio tracks. Each track maintains an independent buffer path, allowing for parallel transformations and dynamic loop evolution. Parallel buffering for multi-layered content ensures that different audio layers maintain timing coherence, even when transformations are applied to individual tracks. Adaptive layering and transformation enable simultaneous modification of multiple tracks, supporting complex loop structures with independent pattern morphing, synchronization, and interpolation.

The system employs crossfade techniques and boundary management to ensure seamless transitions between loops and transformed content. Buffer overlap and timed crossfades prevent audible clicks or gaps when switching between loop states or modifying pattern parameters. Loop boundary adjustments dynamically adapt to maintain timing and phase coherence between successive loop cycles.

The architecture incorporates real-time error detection and correction mechanisms to prevent audio artifacts resulting from buffer underruns, overruns, or timing discrepancies. Dynamic buffer reallocation monitors buffer states and reallocates buffer sizes dynamically to prevent underruns during intensive transformation processes. Clock synchronization and error mitigation ensure that loop transitions and pattern modifications remain synchronized with the internal timing engine or external clock sources.

The Pattern Generation and Transformation subsystem dynamically modifies looped audio content by applying a range of transformations to extracted rhythmic, harmonic, and structural features. These processes enable continuous musical evolution, real-time responsiveness, and stylistic variation during loop playback or performance.

The system utilizes symbolic data from the Analysis-Extraction Library, such as onset positions, meter, pitch centers, and rhythmic groupings, to guide pattern creation and evolution. This allows for transformations that are both musically coherent and context-aware. Rhythmic pattern derivation uses time-domain features and rhythmic templates to guide the generation of new patterns based on user control inputs and parameter setting selections. Harmonic and tonal variations are informed by harmonic information from looped content, which may guide pitch modulation, tonality shifts, and key changes. Form and structure awareness uses structural markers (e.g., loop start/end, rhythmic boundaries, window sizes) to guide interpolation and morphing, maintaining continuity across musical phrases.

The system applies proprietary interpolation and transformation techniques to allow smooth movement between loop states and pattern variations. Pattern morphing transforms one pattern into another over time, preserving musical identity while introducing new phrasing and articulation. Patterns can be interpolated along user-defined dimensions, allowing smooth movement across a defined morph space or vector, with control inputs mapping to these 2 or 3 axes for expressive modulation. Evolutionary looping incorporates gradual, deterministic, and/or probabilistic changes to loop content over successive repetitions, simulating a continuously evolving musical structure. Template-based mapping imposes or applies a pattern (filter cutoffs, echoes, mutes) to a live input signal or looping content. Presets may provide useful patterns or sets of patterns, to which morphing and scaling may be applied. For example, each preset would be a rhythm, and the operations would apply to the potentials or to a subset created using the subset tool.

User input can directly shape the transformation process via external controllers (footswitches, expression pedals, MIDI, etc.), enabling live performance interaction and dynamic variation. Users can assign control inputs to interpolation axes, transformation parameters, or evolution rate, creating expressive real-time control schemes. Transformation behaviors can be stored and recalled as presets, allowing rapid shifts between musical states or automated transitions in sync with performance structure.

Pattern transformations are fully integrated into the system's buffering and playback architecture. Transformed content is rendered in real time and routed through the render buffer, ensuring phase and timing alignment with ongoing loop playback. The system optionally analyzes the current state of looped content to generate feedback-modulated transformations, encouraging progressive variation and organic loop development.

The system processes incoming audio through distinct signal paths depending on the selected mode, ensuring optimal performance and preserving audio fidelity in various configurations. These modes include mono mode, which processes a single audio stream through core buffers and transformation stages, ensuring phase coherence and minimal latency. Stereo mode maintains dual-channel audio processing to preserve stereo imaging and spatial characteristics. Both channels are processed independently to maintain phase alignment while applying transformations, ensuring that effects and pattern modifications maintain coherence between channels. Multi-track mode independently processes multiple audio tracks through distinct buffer paths, allowing simultaneous transformations and pattern evolution across multiple layers. Multi-track mode supports advanced applications such as layering different rhythmic patterns, creating polyrhythmic variations, and applying parallel effects processing. One mode may be chosen over the other by a user depending on context and priorities. For example, a mode that requires less intensive processing may be selected if maintaining timing accuracy and simplicity of signal path are priorities. Buffer sizes, rendering parameters, and state transitions are dynamically adjusted based on the selected mode, ensuring consistent timing, synchronization, and audio quality across different configurations. Signal path variations described here are reflected in the real-time signal management processes outlined in the Signal Flow description.

The system architecture is designed to support multiple implementation variations and can be adapted to fit a variety of physical form factors, control schemes, and deployment contexts. These alternate embodiments provide flexibility in how the core loop transformation engine is integrated into different audio workflows, performance setups, and hardware ecosystems.

In addition to standard footswitch and expression pedal inputs, the system may be implemented with a range of alternate control interfaces, including touchscreens or encoders for fine-tuned control over loop parameters, transformation depth, and interpolation paths. Wireless control surfaces allow remote or mobile operation via Bluetooth, OSC, or Wi-Fi-enabled devices. Sensor-based inputs integrate motion sensors, pressure-sensitive pads, or proximity detectors to provide expressive, gestural control over transformation states or morphing parameters. These variations may be configured to map directly to internal control buses that influence loop state, transformation parameters, and playback behaviors.

The system may be implemented with alternative signal routing architectures and I/O schemes, such as multichannel audio interfaces supporting discrete I/O for layered loop outputs, wet/dry splits, and individual transformation paths. Digital networked audio protocols, including AVB, Dante, or AES67, allow integration into studio, broadcast, or stage infrastructures. Modular or embedded configurations adapt the system into Eurorack modules, standalone hardware pedals, or embedded processors within other instruments. Each embodiment can maintain the same signal processing core while exposing different physical or virtual routing topologies to the user.

The core architecture may be adapted to serve different domains of use beyond live looping, including DAW integration, where it operates as a plugin or software module within a digital audio workstation, responding to host tempo and transport. Mobile or tablet deployment implements the system as a touch-optimized app for mobile music production or education. Installation and interactive systems deploy the system in art installations, live cinema, or adaptive soundscapes where real-time transformation of audio loops is driven by environmental or sensor input. These use cases may limit or extend portions of the core system, such as disabling overdub features, emphasizing automated transformation behaviors, or optimizing for power efficiency.

The system may be deployed in scalable configurations, supporting single vs. multi-instance architectures with one or more simultaneous loop engines, each with isolated buffers and control domains. User-selectable modules allow only a subset of system features to be active based on device capabilities, licensing, or performance constraints. The architecture is designed to remain modular and adaptable, allowing specific functions (e.g., synthesis, sidechain analysis, interpolation) to be included or excluded depending on context.

Software and firmware customization provides the capability to map control inputs dynamically to system parameters. Footswitches, expression pedals, and external MIDI controllers can be assigned to various audio and loop control parameters, allowing real-time modifications to volume, EQ, loop state transitions, and pattern interpolation.

Control inputs and dynamic pattern interpolation enable users to adjust pattern morphing paths in real time, providing intuitive control over audio transformations. These inputs can manipulate interpolation along defined paths on two-dimensional (XY) or three-dimensional (XYZ) planes, guiding the system's pattern evolution dynamically. Additionally, user-defined presets allow for storing and recalling complex control mappings that affect not only loop states and audio effects but also pattern evolution and morphing behavior. This flexibility empowers performers to modify loop content dynamically, ensuring expressive control in both live and studio environments.

The Digital Audio Mixer processes these dynamic control inputs, allowing real-time modifications to volume, panning, EQ, and other mix properties. Users can store and recall preset configurations that affect not only loop states and pattern transformations but also the audio mix itself. The system supports continuous parameter interpolation, ensuring that real-time adjustments to mixer settings remain smooth and free from artifacts.

The system supports multi-layered loop processing through independent buffer paths, allowing simultaneous capture, transformation, and playback of multiple audio loops. This architecture enables complex layering, pattern evolution, and synchronized transformations across multiple loop tracks.

The system allows independent audio tracks to be recorded, processed, and played back simultaneously. Each loop operates within its own buffer path, ensuring isolated processing and transformation. Individual track buffers maintain separate record, transformation, and render buffers for each track, ensuring that multiple layers remain independent and phase-aligned during playback. Parallel processing paths allow real-time modifications, morphing, and synthesis to be applied differently to each layer, supporting multi-textured loop structures. Synchronized loop boundaries and timing recalibration ensure that loop layers maintain phase coherence, even when applying independent transformations to each track.

Use cases include multi-instrumental looping with distinct transformations applied to each source, polyphonic layering of complex rhythmic patterns, and parallel processing of individual loop segments with different effect chains or time-stretching characteristics.

The architecture supports dynamic management of loop layers, allowing seamless switching between active buffers and transformation paths. Tracks can be activated or deactivated in real time without introducing audio artifacts, maintaining synchronization with the main loop engine. Individual layers can be muted or soloed dynamically, allowing selective processing and output of loop layers during performance. Automatic crossfade and interpolation techniques ensure smooth transitions between layered buffers, preventing phase discontinuities or clicks.

Each loop layer can undergo its own transformation, enabling diverse pattern evolution and content modulation. Independent pattern transformations (morphing, interpolation, and parameter automation) are applied to individual loop layers. User-defined control inputs can modulate transformation parameters independently for each layer, creating expressive and dynamic audio variations.

To facilitate smooth layering and coherent playback, the system provides detailed mix control and blending options. Dynamic crossfade controls allow smooth blending between loop layers, preventing sudden transitions or phase mismatches. Independent control over the blend between original and transformed content ensures tonal balance and creative flexibility.

Advanced error prevention mechanisms ensure that buffer paths remain aligned and audio integrity is preserved across multiple layers. Phase coherence and timing recalibration ensure that all loop layers remain synchronized, even after applying independent transformations or time-stretching techniques. Dynamic buffer reallocation and corrective algorithms prevent underruns or overruns in complex multi-track scenarios.

Time-synchronized effects and automation control are applied during the rendering process to maintain coherence between original and transformed audio content. These processes include real-time crossfading, dynamic time-stretching, and interpolation to ensure smooth and seamless transitions. The Audio Render Engine leverages extracted metadata and transformation patterns to apply these effects while preserving rhythmic, harmonic, and structural integrity. Advanced smoothing techniques, such as anti-aliasing and normalization, are employed to mitigate artifacts and maintain high-fidelity playback even in complex audio transformations. Synchronization with external inputs, including MIDI controllers and expression pedals, dynamically adjusts these effects during performance or playback.

The system may integrate future enhancements to extend expressive and adaptive capabilities, including gesture-based and touchless control, AR/VR interaction, advanced source separation, and dynamic audio remixing. In some embodiments, optional sidechain audio inputs may be integrated with these technologies to drive intelligent transformations. For example, sidechain analysis could be used to modulate loop content in response to live input from a secondary performer or to enable spectral interactions between multiple sources in collaborative or AI-assisted environments. These advanced features may utilize adaptive algorithms and metadata extraction to inform transformations, dynamically respond to context, and introduce real-time variation across layered loop states.

Error handling and fault tolerance mechanisms prevent audio artifacts and synchronization errors that could arise during loop state transitions, buffer switching, or high-load processing scenarios. These mechanisms are particularly critical during D/A conversion and final audio output stages, where timing discrepancies and buffer overflows could introduce noticeable artifacts. The system applies predictive algorithms to identify potential timing mismatches, dynamically adjust buffer sizes, and recalibrate clock offsets between internal and external devices. In multi-device configurations, adaptive correction techniques maintain consistent audio playback while minimizing audible disruption.

The system incorporates a suite of latency management techniques and performance optimization mechanisms to ensure real-time processing, low-latency transformations, and reliable playback under varying system loads. The system may continuously monitor and adjust buffer sizes, processing latency, and synchronization offsets to prevent timing mismatches and maintain phase coherence. Dynamic buffer reallocation adjusts buffer lengths dynamically based on processing complexity, preventing buffer underruns or overruns during high-load scenarios. Latency compensation algorithms compensate for inherent processing delays by automatically aligning loop start/end points and buffer boundaries with external clock sources. Predictive latency models use AI-driven models to anticipate system load and preemptively adjust buffer sizes to optimize timing performance.

Clock synchronization ensures accurate loop timing and seamless integration with external devices, such as DAWs or MIDI controllers. Master/slave clocking protocols support multiple clocking modes, allowing the system to act as either a master clock source or a synchronized slave. Sample-accurate timing corrections align buffer positions and transformation states at the sample level, preventing timing drift in complex multi-device configurations. Loop boundary timing correction dynamically adjusts loop boundaries to account for latency offsets, ensuring precise pattern alignment.

The system may dynamically redistribute processing resources to maintain consistent performance and minimize latency under varying load conditions. CPU and DSP load balancing dynamically reallocates tasks between DSP cores and the main CPU to prevent performance bottlenecks. Parallel processing and thread management implement multithreaded processing paths to manage simultaneous transformations and loop modifications without increasing latency. GPU offloading, when supported, offloads computationally intensive tasks, such as spectral analysis and morphing, to a GPU to optimize performance.

When operating in multi-device configurations, the system may adapt its performance optimization techniques to account for distributed processing environments. Distributed processing models dynamically allocate loop and transformation tasks across multiple devices to maintain consistent performance. Error prevention during network sync ensures that buffer underruns and latency mismatches are minimized when processing loop content across networked devices.

The system architecture supports multiple signal flow configurations that adapt dynamically to different usage scenarios, including live performance, studio production, and experimental audio manipulation. These variations allow the system to optimize its transformation, buffering, and rendering processes based on context.

The signal path may adapt automatically based on the selected mode to optimize audio processing and routing. Mono mode processes a single audio input through the core buffer and transformation engine, ensuring minimal latency and phase coherence. Stereo mode maintains dual-channel processing, preserving stereo imaging and synchronizing transformations across both channels. Multi-track mode independently processes multiple tracks through discrete buffer paths, enabling parallel transformations, morphing, and synthesis.

In live performance contexts, the system may prioritize minimal latency to facilitate seamless loop transitions and real-time transformation. Direct I/O routing allows audio signals to be routed directly through the transformation engine with minimal buffering, reducing latency and ensuring responsive loop playback. Immediate control input processing maps control inputs (footswitches, expression pedals, etc.) directly to transformation parameters, enabling real-time loop modification. Dynamic crossfade and boundary adjustment ensure smooth transitions between loop states and parameter variations, preventing timing mismatches and audio artifacts.

When used in studio environments or integrated with digital audio workstations (DAWs), the system adapts its signal path to emphasize precision, flexibility, and compatibility with external devices. Buffer preloading and predictive rendering ensure that buffers are preloaded and rendered with predictive algorithms to maintain sample-accurate alignment with DAW playback. MIDI and control mapping for DAW automation allow transformation parameters and loop modifications to be mapped to DAW automation lanes, ensuring tight integration with external sequencing environments. Extended latency compensation dynamically adjusts latency offsets to ensure synchronization with DAW clocks and time-based effects.

In some embodiments that explore advanced audio transformation or interactive soundscapes, the system may support nonlinear and non-standard signal routing. Granular and spectral signal paths may be processed independently and recombined with loop content in real time. Modular routing architectures allow signal flow modules to be reconfigured dynamically, enabling experimentation with different transformation chains and processing orders. User-defined feedback paths may support routing of transformed audio back into the system for recursive pattern evolution and interactive performance control.

The system supports multi-device synchronization, enabling multiple units to operate together for expanded loop length, layered transformations, and distributed audio processing. This synchronization capability ensures that connected devices maintain consistent playback timing, loop transitions, and transformation states. When operating as the master device, the system transmits clock and timing information to all connected units, ensuring that all devices remain aligned during playback, regardless of loop complexity or transformation intensity. When operating as a slave device, the system receives clock and timing data from an external master, dynamically adjusting its internal clock and buffer alignment to maintain consistent synchronization. Slave mode ensures that loop states and transformations mirror the master's state, allowing seamless performance in multi-device setups. The system uses advanced clock recalibration and buffer alignment techniques to prevent timing drift between devices. Predictive algorithms continuously monitor synchronization status, making real-time adjustments to maintain seamless performance during extended multi-device operation.

The system is governed by a robust firmware and software control logic framework that manages all aspects of signal flow, transformation parameters, loop state transitions, and user-defined settings. This control logic ensures seamless coordination between real-time audio processing, control inputs, and system-level behaviors. The system operates on a core control loop that dynamically processes incoming audio data, analyzes state changes, and applies transformations in real time. State-aware processing monitors the current loop state (record, playback, overdub, transformation) and dynamically adjusts signal flow and buffer management. Priority-based event handling assigns priority to control inputs, ensuring that real-time actions (footswitch presses, MIDI messages, etc.) are processed without delay. Loop transition and buffer reallocation logic use predictive algorithms to manage buffer reallocation and crossfade control when switching between loop states.

The firmware dynamically assigns and maps user-defined control inputs to system parameters, allowing for expressive real-time control over loop content and transformations. User-defined parameter mappings enable external controllers, including footswitches, MIDI controllers, and expression pedals, to be mapped to transformation axes, buffer parameters, and effect controls. Multi-mode control logic switches between performance modes (mono, stereo, multi-track) and adapts control mappings dynamically. Real-time parameter modulation supports modulation of synthesis and transformation parameters using LFOs, envelope followers, and dynamic input signals.

The system's control logic includes an automation engine that enables preset recall, automated transitions, and pattern evolution in sync with external clocks or internal timing structures. Pattern evolution automation automates morphing, interpolation, and loop transformation over time. Preset recall and parameter interpolation store and recall parameter states with smooth interpolation between recalled settings. Sync and timing alignment maintain sample-accurate alignment between automated transitions and loop boundaries.

The control logic includes built-in error handling mechanisms to prevent system faults and recover from unexpected errors. Buffer overrun/underrun management detects and corrects buffer mismatches to maintain audio integrity. Control input debouncing ensures that rapid or accidental control inputs do not disrupt loop playback or transformations. Safe mode recovery automatically restores safe system states following unexpected errors or clock misalignment.

The system provides extensive calibration and user customization options that allow fine-tuning of audio parameters, control mappings, and system behavior to suit diverse user preferences and performance environments.

The system performs an initial calibration routine upon setup to optimize audio timing, buffer alignment, and transformation accuracy. Clock calibration and sync optimization ensure that internal clocks remain synchronized with external devices, minimizing timing drift. Buffer length and latency tuning dynamically calibrate buffer sizes to balance latency and audio fidelity. Loop boundary and phase alignment ensure that loop start/end points remain aligned across buffer states and transformation processes.

Users can customize control mappings and transformation parameters to tailor the system's behavior for different performance or production environments. The MIDI/controller mapping engine allows assignment of external controllers (footswitches, MIDI controllers, expression pedals) to transformation axes, buffer controls, and pattern modulation. Multi-mode preset customization enables user-defined control profiles for different performance modes (mono, stereo, multi-track). Real-time parameter tuning supports dynamic adjustment of transformation parameters, effect intensities, and interpolation axes during performance.

The system allows users to create, store, and recall presets, automating complex workflows and enabling seamless transitions between loop states. Preset recall with smooth interpolation automatically transitions between recalled parameter states to avoid abrupt audio changes. Automation-driven parameter shifts enable time-based preset transitions, ensuring that loop morphing and pattern evolution remain in sync with performance timelines. Performance mode profiles store and recall different performance profiles optimized for live performance, studio use, or experimental applications.

For multi-device setups, the system offers extended calibration features that ensure timing and buffer consistency across multiple units. Distributed clock alignment maintains clock synchronization and buffer alignment across networked devices. Loop boundary phase correction ensures sample-accurate phase alignment when layering content from different sources. Load balancing in distributed setups dynamically allocates processing load between connected devices to prevent latency mismatches.

The system is designed to comply with relevant industry standards for audio equipment safety, electromagnetic compatibility (EMC), and signal integrity. Compliance measures ensure that the system operates safely and consistently across diverse usage scenarios, including live performance, studio recording, and multi-device synchronization environments.

The system incorporates safeguards to maintain signal fidelity and protect connected audio devices during prolonged operation. These safeguards include automatic gain management and signal monitoring to prevent excessive signal levels that could lead to clipping or audio distortion. Overvoltage and current protection mechanisms guard against power surges and overvoltage conditions, preventing damage to connected devices and internal components. Thermal management and ventilation systems protect internal circuits from overheating during extended use.

The system adheres to industry standards to ensure safe operation and long-term reliability. IEC/EN 61000 (Electromagnetic Compatibility) ensures that the system meets global EMC requirements, minimizing interference and ensuring stable performance in multi-device environments. IEC 62368-1 (Audio Equipment Safety) complies with standards for safe operation and electrical protection in audio equipment and consumer electronics.

To safeguard against electrical surges and unexpected power fluctuations, the system incorporates power isolation techniques that mitigate the risk of signal disruption or hardware damage. Power surge protection mechanisms prevent sudden voltage spikes from affecting internal circuitry, ensuring continuous operation during high-load performance conditions.

The system is built to handle the rigorous demands of live performance environments by implementing safety and fault tolerance measures. Dynamic buffer size adjustments prevent audio glitches and artifacts caused by buffer mismatches during performance. Clock recalibration techniques correct timing discrepancies between connected devices, ensuring synchronized playback across multi-device setups. Fallback and auto-recovery mechanisms automatically transition the system to a safe operational state in the event of hardware or software failure, preserving user settings and loop content.

These safety and compliance measures may be applied during D/A conversion and final audio output stages to prevent signal degradation and maintain operational reliability. Real-time error detection and correction mitigate potential timing mismatches, buffer underruns, and analog output inconsistencies, ensuring that the system maintains high-fidelity audio quality throughout the signal chain.

G. Illustrative Data Processing System

Figure 7:
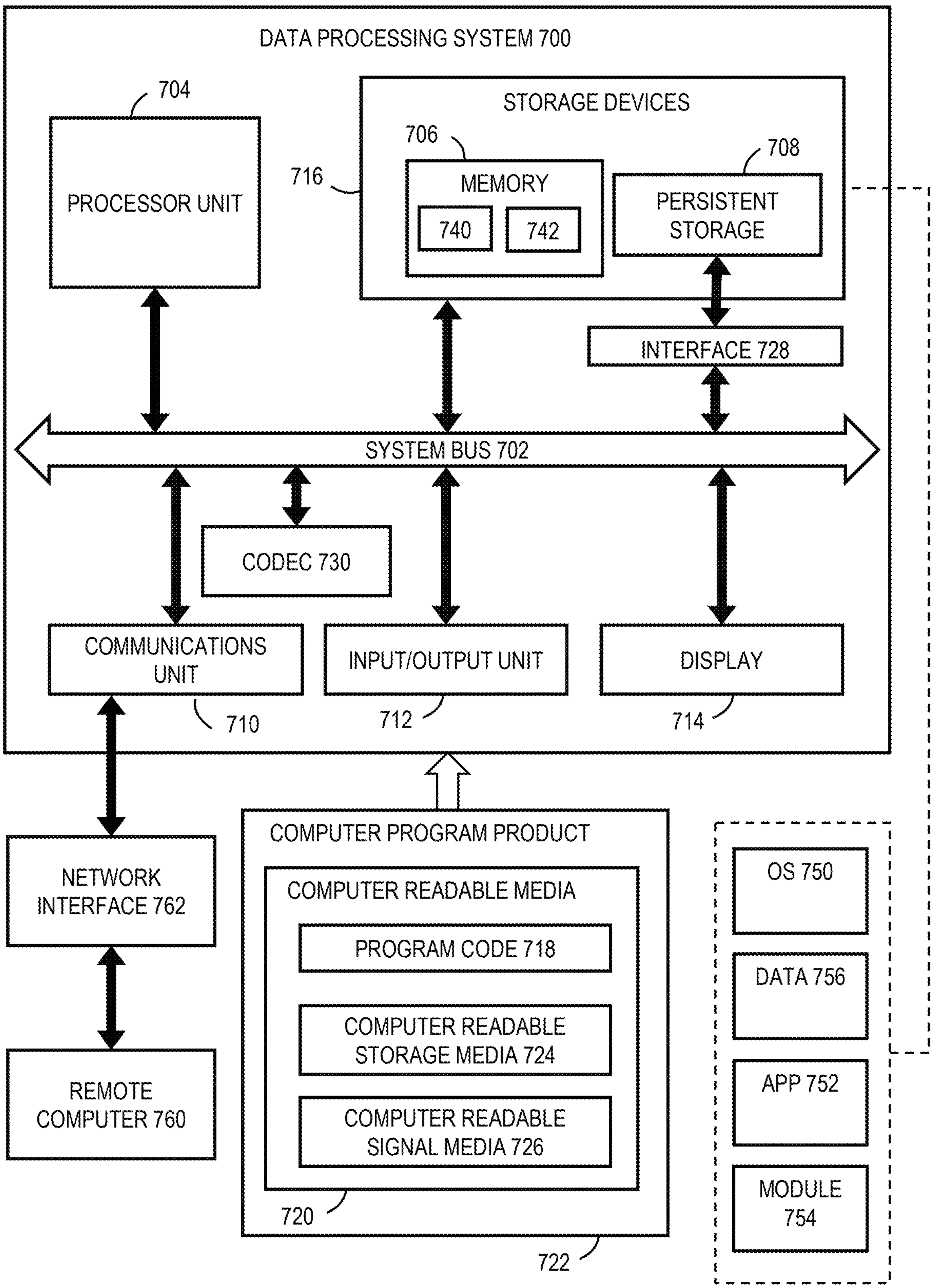
FIG. 7 is a schematic diagram of an illustrative data processing system as described herein.

As shown in FIG. 7, this example describes a data processing system 700 (also referred to as a computer, computing system, and/or computer system) in accordance with aspects of the present disclosure. In this example, data processing system 700 is an illustrative data processing system suitable for implementing aspects of media generation.

In this illustrative example, data processing system 700 includes a system bus 702 (also referred to as communications framework). System bus 702 may provide communications between a processor unit 704 (also referred to as a processor or processors), a memory 706, a persistent storage 708, a communications unit 710, an input/output (I/O) unit 712, a codec 730, and/or a display 714. Memory 706, persistent storage 708, communications unit 710, input/output (I/O) unit 712, display 714, and codec 730 are examples of resources that may be accessible by processor unit 704 via system bus 702.

Processor unit 704 serves to run instructions that may be loaded into memory 706. Processor unit 704 may comprise a number of processors, a multi-processor core, and/or a particular type of processor or processors (e.g., a central processing unit (CPU), graphics processing unit (GPU), etc.), depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device may include any suitable hardware capable of storing information (e.g., digital information), such as data, program code in functional form, and/or other suitable information, either on a temporary basis or a permanent basis.

Storage devices 716 also may be referred to as computer-readable storage devices or computer-readable media. Memory 706 may include a volatile storage memory 740 and a non-volatile memory 742. In some examples, a basic input/output system (BIOS), containing the basic routines to transfer information between elements within the data processing system 700, such as during start-up, may be stored in non-volatile memory 742. Persistent storage 708 may take various forms, depending on the particular implementation.

Persistent storage 708 may contain one or more components or devices. For example, persistent storage 708 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 708 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 708 to system bus 702, a removable or non-removable interface is typically used, such as interface 728.

Input/output (I/O) unit 712 allows for input and output of data with other devices that may be connected to data processing system 700 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 704 through system bus 702 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 700 and to output information from data processing system 700 to an output device. One or more output adapters may be provided for certain output devices (e.g., monitors, speakers, and printers, among others) which require special adapters. Suitable output adapters may include, e.g. video and sound cards that provide a means of connection between the output device and system bus 702. Other devices and/or systems of devices may provide both input and output capabilities, such as remote computer(s) 760. Display 714 may include any suitable human-machine interface or other mechanism configured to display information to a user, e.g., a CRT, LED, or LCD monitor or screen, etc.

Communications unit 710 refers to any suitable hardware and/or software employed to provide for communications with other data processing systems or devices. While communication unit 710 is shown inside data processing system 700, it may in some examples be at least partially external to data processing system 700. Communications unit 710 may include internal and external technologies, e.g., modems (including regular telephone grade modems, cable modems, and DSL modems), ISDN adapters, and/or wired and wireless Ethernet cards, hubs, routers, etc. Data processing system 700 may operate in a networked environment, using logical connections to one or more remote computers 760. A remote computer(s) 760 may include a personal computer (PC), a server, a router, a network PC, a workstation, a microprocessor-based appliance, a peer device, a smart phone, a tablet, another network note, and/or the like. Remote computer(s) 760 typically include many of the elements described relative to data processing system 700. Remote computer(s) 760 may be logically connected to data processing system 700 through a network interface 762 which is connected to data processing system 700 via communications unit 710. Network interface 762 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 730 may include an encoder, a decoder, or both, comprising hardware, software, or a combination of hardware and software. Codec 730 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 730 is depicted as a separate component, codec 730 may be contained or implemented in memory, e.g., non-volatile memory 742.

Non-volatile memory 742 may include read only memory (ROM), programmable ROM (PROM), electrically programmable ROM (EPROM), electrically erasable programmable ROM (EEPROM), flash memory, and/or the like, or any combination of these. Volatile memory 740 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 716, which are in communication with processor unit 704 through system bus 702. In these illustrative examples, the instructions are in a functional form in persistent storage 708. These instructions may be loaded into memory 706 for execution by processor unit 704. Processes of one or more examples of the present disclosure may be performed by processor unit 704 using computer-implemented instructions, which may be located in a memory, such as memory 706.

These instructions are referred to as program instructions, program code, computer usable program code, or computer-readable program code executed by a processor in processor unit 704. The program code in the different examples may be embodied on different physical or computer-readable storage media, such as memory 706 or persistent storage 708. Program code 718 may be located in a functional form on computer-readable media 720 that is selectively removable and may be loaded onto or transferred to data processing system 700 for execution by processor unit 704. Program code 718 and computer-readable media 720 form computer program product 722 in these examples. In one example, computer-readable media 720 may comprise computer-readable storage media 724 or computer-readable signal media 726.

Computer-readable storage media 724 may include, for example, an optical or magnetic disk that is inserted or placed into a drive or other device that is part of persistent storage 708 for transfer onto a storage device, such as a hard drive, which is part of persistent storage 708. Computer-readable storage media 724 also may take the form of a persistent storage, such as a hard drive, a thumb drive, or a flash memory, which is connected to data processing system 700. In some instances, computer-readable storage media 724 may not be removable from data processing system 700.

In these examples, computer-readable storage media 724 is a non-transitory, physical or tangible storage device used to store program code 718 rather than a medium that propagates or transmits program code 718. Computer-readable storage media 724 is also referred to as a computer-readable tangible storage device or a computer-readable physical storage device. In other words, computer-readable storage media 724 is media that can be touched by a person.

Alternatively, program code 718 may be transferred to data processing system 700, e.g., remotely over a network, using computer-readable signal media 726. Computer-readable signal media 726 may be, for example, a propagated data signal containing program code 718. For example, computer-readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative examples, program code 718 may be downloaded over a network to persistent storage 708 from another device or data processing system through computer-readable signal media 726 for use within data processing system 700. For instance, program code stored in a computer-readable storage medium in a server data processing system may be downloaded over a network from the server to data processing system 700. The computer providing program code 718 may be a server computer, a client computer, or some other device capable of storing and transmitting program code 718.

In some examples, program code 718 may comprise an operating system (OS) 750. Operating system 750, which may be stored on persistent storage 708, controls and allocates resources of data processing system 700. One or more applications 752 take advantage of the operating system's management of resources via program modules 754, and program data 756 stored on storage devices 716. OS 750 may include any suitable software system configured to manage and expose hardware resources of computer 700 for sharing and use by applications 752. In some examples, OS 750 provides application programming interfaces (APIs) that facilitate connection of different type of hardware and/or provide applications 752 access to hardware and OS services. In some examples, certain applications 752 may provide further services for use by other applications 752, e.g., as is the case with so-called "middleware." Aspects of present disclosure may be implemented with respect to various operating systems or combinations of operating systems.

The different components illustrated for data processing system 700 are not meant to provide architectural limitations to the manner in which different examples may be implemented. One or more examples of the present disclosure may be implemented in a data processing system that includes fewer components or includes components in addition to and/or in place of those illustrated for computer 700. Other components shown in FIG. 7 can be varied from the examples depicted. Different examples may be implemented using any hardware device or system capable of running program code. As one example, data processing system 700 may include organic components integrated with inorganic components and/or may be comprised entirely of organic components (excluding a human being). For example, a storage device may be comprised of an organic semiconductor.

In some examples, processor unit 704 may take the form of a hardware unit having hardware circuits that are specifically manufactured or configured for a particular use, or to produce a particular outcome or progress. This type of hardware may perform operations without needing program code 718 to be loaded into a memory from a storage device to be configured to perform the operations. For example, processor unit 704 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 718) may be implemented as hardware, e.g., by specifying an FPGA configuration using a hardware description language (HDL) and then using a resulting binary file to (re) configure the FPGA.

In another example, data processing system 700 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, system bus 702 may comprise one or more buses, such as a system bus or an input/output bus. Of course, the bus system may be implemented using any suitable type of architecture that provides for a transfer of data between different components or devices attached to the bus system. System bus 702 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in system bus 702.

H. Illustrative Distributed Data Processing System

Figure 8:
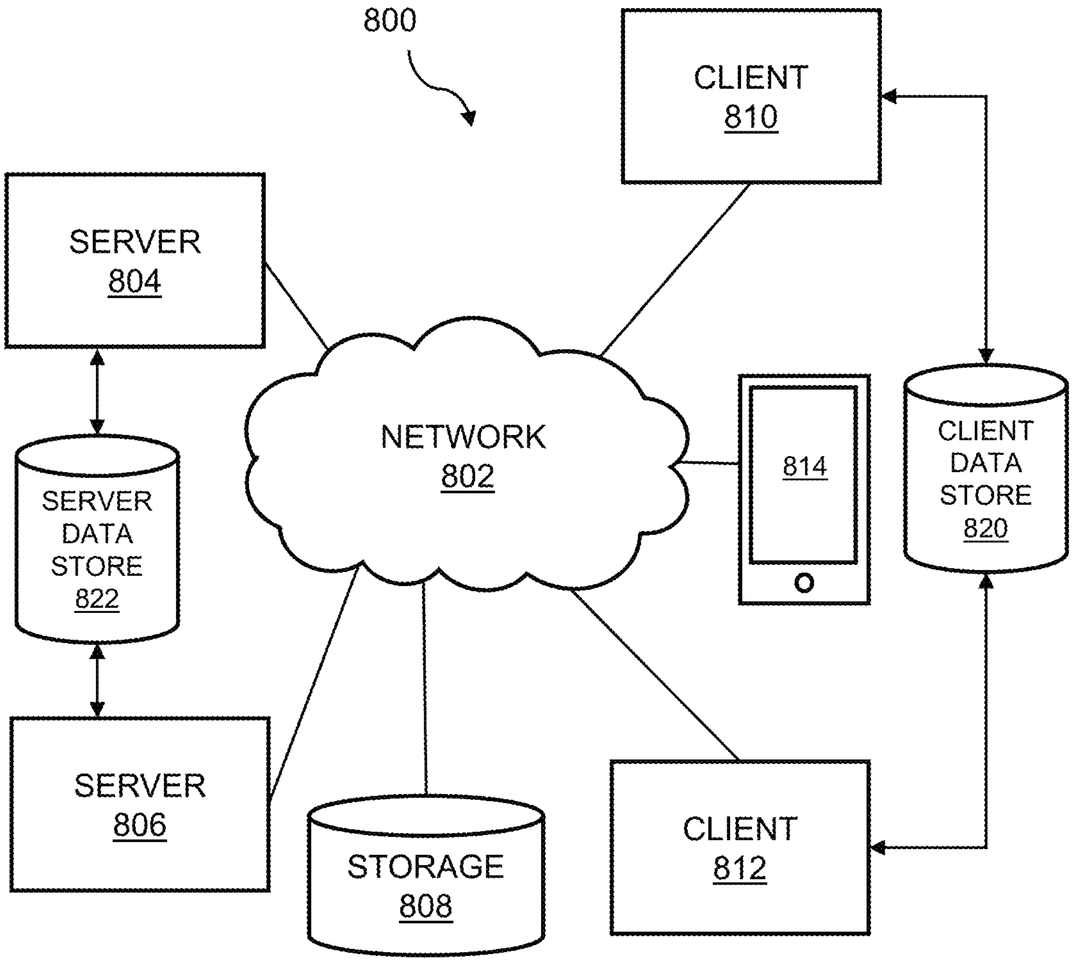
FIG. 8 is a schematic diagram of an illustrative network data processing system as described herein.

As shown in FIG. 8, this example describes a general network data processing system 800, interchangeably termed a computer network, a network system, a distributed data processing system, or a distributed network, aspects of which may be included in one or more illustrative examples of the systems and methods described herein.

It should be appreciated that FIG. 8 is provided as an illustration of one implementation and is not intended to imply any limitation with regard to environments in which different examples may be implemented. Many modifications to the depicted environment may be made.

Network system 800 is a network of devices (e.g., computers), each of which may be an example of data processing system 800, and other components. Network data processing system 800 may include network 802, which is a medium configured to provide communications links between various devices and computers connected within network data processing system 800. Network 802 may include connections such as wired or wireless communication links, fiber optic cables, and/or any other suitable medium for transmitting and/or communicating data between network devices, or any combination thereof.

In the depicted example, a first network device 804 and a second network device 806 connect to network 802, as do one or more computer-readable memories or storage devices 808. Network devices 804 and 806 are each examples of data processing system 700, described above. In the depicted example, devices 804 and 806 are shown as server computers, which are in communication with one or more server data store(s) 822 that may be employed to store information local to server computers 804 and 806, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 810 and 812 and/or a client smart device 814, may connect to network 802. Each of these devices is an example of data processing system 700, described above regarding FIG. 7. Client electronic devices 810, 812, and 814 may include, for example, one or more personal computers, network computers, and/or mobile computing devices such as personal digital assistants (PDAs), smart phones, handheld gaming devices, wearable devices, and/or tablet computers, and the like. In the depicted example, server 804 provides information, such as boot files, operating system images, and applications to one or more of client electronic devices 810, 812, and 814. Client electronic devices 810, 812, and 814 may be referred to as "clients" in the context of their relationship to a server such as server computer 804. Client devices may be in communication with one or more client data store(s) 820, which may be employed to store information local to the clients (e.g., cookie(s) and/or associated contextual information). Network data processing system 800 may include more or fewer servers and/or clients (or no servers or clients), as well as other devices not shown.

In some examples, first client electric device 810 may transfer an encoded file to server 804. Server 804 can store the file, decode the file, and/or transmit the file to second client electric device 812. In some examples, first client electric device 810 may transfer an uncompressed file to server 804 and server 804 may compress the file. In some examples, server 804 may encode text, audio, and/or video information, and transmit the information via network 802 to one or more clients.

Client smart device 814 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectivity may be established among smart devices, smartphones, computers, and/or other devices to form a mobile network where information can be exchanged.

Data and program code located in system 800 may be stored in or on a computer-readable storage medium, such as network-connected storage device 808 and/or a persistent storage 708 of one of the network computers, as described above, and may be downloaded to a data processing system or other device for use. For example, program code may be stored on a computer-readable storage medium on server computer 804 and downloaded to client 810 over network 802, for use on client 810. In some examples, client data store 820 and server data store 822 reside on one or more storage devices 808 and/or 708.

Network data processing system 800 may be implemented as one or more of different types of networks. For example, system 800 may include an intranet, a local area network (LAN), a wide area network (WAN), or a personal area network (PAN). In some examples, network data processing system 800 includes the Internet, with network 802 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 802 may be referred to as a "cloud." In those examples, each server 804 may be referred to as a cloud computing node, and client electronic devices may be referred to as cloud consumers, or the like. FIG. 8 is intended as an example, and not as an architectural limitation for any illustrative examples.

I. Illustrative Combinations and Additional Examples

This section describes additional aspects and features of media generation, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below may expressly refer to and further limit other paragraphs, providing without limitation examples of some of the suitable combinations.

A1. A computer implemented method of generating a musical variation, the method comprising:

receiving as input a plurality of musical patterns, each musical pattern including a respective input attack vector;

receiving a plurality of rhythmic building blocks, each rhythmic building block comprising a respective set of time points corresponding to a stage of pattern formation in a musical meter;

analyzing each of the musical patterns to identify rhythmic building blocks which coincide with each musical pattern by identifying one or more symmetries between portions of each respective input attack vector and the respective set of time points of each rhythmic building block;

generating an activations vector for each musical pattern, the activations vector comprising a respective activation number for each of the plurality of rhythmic building blocks, each respective activation number representing a respective fraction of time points in each rhythmic building block which correspond to attacks in the respective input attack vector;

generating a rhythmic potentials vector for each musical pattern based on the respective activations vector, each rhythmic potentials vector comprising a respective likelihood of an attack at each time point in the respective musical pattern, wherein the respective likelihood of the attack at each time point is a function of a sum of the activation number of all rhythmic building blocks which contain that time point;

assigning a respective weight to each musical pattern;

generating a rhythm variation based on a weighted combination of each rhythmic potentials vector of each musical pattern, wherein the respective weight of each musical pattern corresponds to a respective contribution of the respective rhythmic potentials vector to the weighted combination;

generating a musical variation by assigning a musical pitch, an instrument or voice mapping, and/or an effect parameter to each attack in the rhythm variation; and outputting the musical variation to an output device.

A2. The computer implemented method of paragraph A1, wherein each of the plurality of rhythmic building blocks corresponds to a respective ternary number comprising a sequence of ternary digits, each ternary digit corresponding to a respective presence of a generative operation being applied to a respective metrical level, the generative operation including an elaboration operation and/or a syncopation operation; and wherein a ‘0’ in place n corresponds to no generative operation being applied at metrical level n, a ‘1’ in place n corresponds to the elaboration operation being applied at metrical level n, and a ‘2’ in place n corresponds to the syncopation operation being applied at metrical level n.

A3. The computer implemented method of paragraph A2, wherein analyzing each of the musical patterns to identify rhythmic building blocks which coincide with each musical pattern includes iterating through the ternary numbers corresponding to the rhythmic building blocks and mapping corresponding rhythmic structures of each rhythmic building block to the input attack vector of each musical pattern.

A4. The computer implemented method of any of paragraphs A1-A3, wherein receiving the plurality of rhythmic building blocks includes generating the rhythmic building blocks.

A5. The computer implemented method of paragraph A4, wherein generating the rhythmic building blocks includes:

for each rhythmic building block:

defining a root block comprising a single attack;

applying one or more generative operations to the root block or a derivative block derived from the root block based on the ternary number corresponding to the rhythmic building block.

A6. The computer implemented method of paragraph A5, wherein the elaboration operation is an anticipation operation, such that the elaboration operation includes inserting an additional attack immediately preceding an existing attack in the input block at the respective metrical level.

A7. The computer implemented method of paragraph A5, wherein the elaboration operation is a departure operation, such that the elaboration operation includes inserting an additional attack immediately following an existing attack in the input block at the respective metrical level.

A8. The computer implemented method of paragraph A5, wherein syncopation is an anticipation operation, such that the anticipation operation includes inserting an additional attack immediately preceding an existing attack in the input block at a specific metrical level and deleting the existing attack.

A9. The computer implemented method of paragraph A5, wherein syncopation is a departure operation, such that the anticipation operation includes inserting an additional attack immediately following an existing attack in the input block at a specific metrical level and deleting the existing attack.

A10. The computer implemented method any of paragraphs A4-A9, wherein the rhythmic building blocks are generated in binary meter.

A11. The computer implemented method of paragraph A10, wherein each metrical level of the rhythmic building blocks includes alternating strong and weak time points, such that each metrical level evenly subdivides each time point at the next higher level into a strong-weak pair.

A12. The computer implemented method of paragraph A1, wherein each of the plurality of rhythmic building blocks corresponds to a respective binary number comprising a sequence of binary digits, each binary digit corresponding to a respective presence of an elaboration operation; and wherein a ‘0’ in place n corresponds to no elaboration operation being applied at metrical level n, a ‘1’ in place n corresponds to the elaboration operation being applied at metrical level n.

A13. The computer implemented method of any of paragraphs A1-A12, wherein the input attack vector is a binary number comprising a sequence of binary digits corresponding to a respective sequence of equal subdivisions of the musical meter, each binary digit of the binary number corresponding to a respective subdivision; and wherein a ‘0’ corresponds to a non-attack at the respective subdivision of the musical meter and a ‘1’ corresponds to an attack at the respective subdivision of the music meter.

A14. The computer implemented method of any of paragraphs A1-A13, wherein the input attack vector is a ternary number comprising a sequence of ternary digits corresponding to a respective sequence of equal subdivisions of the musical meter, each ternary digit of the ternary number corresponding to a respective subdivision; and wherein a ‘0’ corresponds to a non-attack at the respective subdivision of the musical meter, a ‘1’ corresponds to an attack at the respective subdivision of the musical meter and a ‘2’ corresponds to a sustain at the respective subdivision of the musical meter.

A15. The computer implemented method of paragraph A13 and/or A14, wherein each non-attack corresponds to a musical rest.

A16. The computer implemented method of any of paragraphs A1-A15, wherein, for each rhythmic potentials vector, the respective likelihood of the attack at each time point in the respective musical pattern comprises a real number value between 0 and 1.

A17. The computer implemented method of any of paragraphs A1-A16, wherein analyzing each of the musical patterns to identify rhythmic building blocks which coincide with each musical pattern further includes determining a correspondence level between each musical pattern and each rhythmic building block; and assigning a respective rhythmic building block weight to each rhythmic building block quantifying the correspondence level.

A18. The computer implemented method of paragraph A17, wherein determining the correspondence level between each musical pattern and each rhythmic building block includes determining a distance vector quantifying an amount of commonality between each respective musical pattern and each rhythmic building block.

A19. The computer implemented method of any of paragraphs A1-A18, further comprising:

utilizing a threshold value to control which values of the rhythmic potentials vectors are interpreted as attacks and which are interpreted as non-attacks.

A20. The computer implemented method of any of paragraphs A1-A19, wherein the assigned weight of each musical pattern is a real number value between 0 and 1.

A21. The computer implemented method of any of paragraphs A1-A20, wherein each respective set of time points of each rhythmic building block are time points which represent note attacks.

A22. The computer implemented method of any of paragraphs A1-A20, wherein each respective set of time points of each rhythmic building block are time points which represent one or more rests, accents, and/or other musical elements.

A23. The computer implemented method of any of paragraphs A1-A22, wherein the rhythmic building blocks correspond to varying degrees of rhythmic coherence within a given musical composition.

A24. The computer implemented method of any of paragraphs A1-A23, wherein each musical pattern comprises a respective series of musical notes.

A25. The computer implemented method of any of paragraphs A1-A24, wherein each musical pattern is analyzed as a musical loop, such that a respective final time point of each musical pattern immediately precedes a respective first time point of each musical pattern.

A26. The computer implemented method of paragraph A25, wherein each musical loop has duration m, where m is measured in note durations at a highest metrical resolution.

A27. The computer implemented method of paragraph A26, wherein duration m is a power of 2, such that the power of 2 is the number of metrical levels under consideration for a given musical pattern.

A28. The computer implemented method of any of paragraphs A1-A27, wherein each musical pattern includes one or more attack points, pitches, melodic contour, velocities, and/or accents.

A29. The computer implemented method of any of paragraphs A1-A28, wherein each respective input attack vector is generated from a respective pattern of note accents of the respective musical pattern.

A30. The computer implemented method of paragraph A29, wherein the rhythm variation is used to generate a variation pattern of note accents for use in generating the musical variation.

A31. The computer implemented method of any of paragraphs A1-A30, wherein each respective musical pitch used in assigning the musical pitch to each attack in the rhythm variation is based on musical pitches of one or more of the plurality of musical patterns.

A32. The computer implemented method of any of paragraphs A1-A31, wherein each respective musical pitch used in assigning the musical pitch to each attack in the rhythm variation is from a selected musical mode.

A33. The computer implemented method of any of paragraphs A1-A32, wherein the output device includes headphones.

A34. The computer implemented method of any of paragraphs A1-A32, wherein the output device includes speakers.

A35. The computer implemented method of any of paragraphs A1-A32, wherein the output device includes a piano roll of a digital audio workstation.

A36. The computer implemented method of any of paragraphs A1-A32, wherein the output device includes a musical score with the musical variation displayed in musical notation.

A37. The computer implemented method of any of paragraphs A1-A32, wherein the output device includes a haptic feedback device.

A38. The computer implemented method of any of paragraphs A1-A37, further comprising:

providing the musical variation as input to generate a further musical variation.

A39. The computer implemented method of any of paragraphs A1-A38, further comprising:

receiving one or more user inputs configured to alter one or more characteristics of the musical variation.

A40. The computer implemented method of paragraph A39, wherein the one or more user inputs include changes to one or more respective weights assigned to one or more musical patterns and/or the threshold value.

B1. A data processing system for generating a musical variation, the system comprising:

one or more processors;

a memory; and a plurality of instructions stored in the memory and executable by the one or more processors to:

receive as input a plurality of musical patterns, each musical pattern including a respective input attack vector;

receive a plurality of rhythmic building blocks, each rhythmic building block comprising a respective set of time points corresponding to a stage of pattern formation in a musical meter;

analyze each of the musical patterns to identify rhythmic building blocks which coincide with each musical pattern by identifying one or more symmetries between portions of each respective input attack vector and the respective set of time points of each rhythmic building block;

generate an activations vector for each musical pattern, the activations vector comprising a respective activation number for each of the plurality of rhythmic building blocks, each respective activation number representing a respective fraction of time points in each rhythmic building block which correspond to attacks in the respective input attack vector;

generate a rhythmic potentials vector for each musical pattern based on the respective activations vector, each rhythmic potentials vector comprising a respective likelihood of an attack at each time point in the respective musical pattern, wherein the respective likelihood of the attack at each time point is a function of a sum of the activation number of all rhythmic building blocks which contain that time point;

assign a respective weight to each musical pattern;

generate a rhythm variation based on a weighted combination of each rhythmic potentials vector of each musical pattern, wherein the respective weight of each musical pattern corresponds to a respective contribution of the respective rhythmic potentials vector to the weighted combination;

generate a musical variation by assigning a musical pitch, an instrument or voice mapping, and/or an effect parameter to each attack in the rhythm variation; and output the musical variation to an output device.

B2. The data processing system of paragraph B1, wherein each of the plurality of rhythmic building blocks corresponds to a respective ternary number comprising a sequence of ternary digits, each ternary digit corresponding to a respective presence of a generative operation being applied to a respective metrical level, the generative operation including an elaboration operation and/or a syncopation operation; and wherein a '0' in place n corresponds to no generative operation being applied at metrical level n, a '1' in place n corresponds to the elaboration operation being applied at metrical level n, and a '2' in place n corresponds to the syncopation operation being applied at metrical level n.

B3. The data processing system of paragraph B2, wherein analyzing each of the musical patterns to identify rhythmic building blocks which coincide with each musical pattern includes iterating through the ternary numbers corresponding to the rhythmic building blocks and mapping corresponding rhythmic structures of each rhythmic building block to the input attack vector of each musical pattern.

B4. The data processing system of any of paragraphs B1-B3, wherein receiving the plurality of rhythmic building blocks includes generating the rhythmic building blocks.

B5. The data processing system of paragraph B4, wherein generating the rhythmic building blocks includes:

for each rhythmic building block:

defining a root block comprising a single attack;

applying one or more generative operations to the root block or a derivative block derived from the root block based on the ternary number corresponding to the rhythmic building block.

B6. The data processing system of paragraph B5, wherein the elaboration operation is an anticipation operation, such that the elaboration operation includes inserting an additional attack immediately preceding an existing attack in the input block at the respective metrical level.

B7. The data processing system of paragraph B5, wherein the elaboration operation is a departure operation, such that the elaboration operation includes inserting an additional attack immediately following an existing attack in the input block at the respective metrical level.

B8. The data processing system of paragraph B5, wherein syncopation is an anticipation operation, such that the anticipation operation includes inserting an additional attack immediately preceding an existing attack in the input block at a specific metrical level and deleting the existing attack.

B9. The data processing system of paragraph B5, wherein syncopation is a departure operation, such that the anticipation operation includes inserting an additional attack immediately following an existing attack in the input block at a specific metrical level and deleting the existing attack.

B10. The data processing system any of paragraphs B4-B9, wherein the rhythmic building blocks are generated in binary meter.

B11. The data processing system of paragraph B10, wherein each metrical level of the rhythmic building blocks includes alternating strong and weak time points, such that each metrical level evenly subdivides each time point at the next higher level into a strong-weak pair.

B12. The data processing system of paragraph B1, wherein each of the plurality of rhythmic building blocks corresponds to a respective binary number comprising a sequence of binary digits, each binary digit corresponding to a respective presence of an elaboration operation; and wherein a '0' in place n corresponds to no elaboration operation being applied at metrical level n, a '1' in place n corresponds to the elaboration operation being applied at metrical level n.

B13. The data processing system of any of paragraphs B1-B12, wherein the input attack vector is a binary number comprising a sequence of binary digits corresponding to a respective sequence of equal subdivisions of the musical meter, each binary digit of the binary number corresponding to a respective subdivision; and wherein a '0' corresponds to a non-attack at the respective subdivision of the musical meter and a '1' corresponds to an attack at the respective subdivision of the music meter.

B14. The data processing system of any of paragraphs B1-B13, wherein the input attack vector is a ternary number comprising a sequence of ternary digits corresponding to a respective sequence of equal subdivisions of the musical meter, each ternary digit of the ternary number corresponding to a respective subdivision; and wherein a '0' corresponds to a non-attack at the respective subdivision of the musical meter, a '1' corresponds to an attack at the respective subdivision of the musical meter and a '2' corresponds to a sustain at the respective subdivision of the musical meter.

B15. The data processing system of paragraph B13 and/or B14, wherein each non-attack corresponds to a musical rest.

B16. The data processing system of any of paragraphs B1-B15, wherein, for each rhythmic potentials vector, the respective likelihood of the attack at each time point in the respective musical pattern comprises a real number value between 0 and 1.

B17. The data processing system of any of paragraphs B1-B16, wherein analyzing each of the musical patterns to identify rhythmic building blocks which coincide with each musical pattern further includes determining a correspondence level between each musical pattern and each rhythmic building block; and assigning a respective rhythmic building block weight to each rhythmic building block quantifying the correspondence level.

B18. The data processing system of paragraph B17, wherein determining the correspondence level between each musical pattern and each rhythmic building block includes determining a distance vector quantifying an amount of commonality between each respective musical pattern and each rhythmic building block.

B19. The data processing system of any of paragraphs B1-B18, further comprising:

utilizing a threshold value to control which values of the rhythmic potentials vectors are interpreted as attacks and which are interpreted as non-attacks.

B20. The data processing system of any of paragraphs B1-B19, wherein the assigned weight of each musical pattern is a real number value between 0 and 1.

B21. The data processing system of any of paragraphs B1-B20, wherein each respective set of time points of each rhythmic building block are time points which represent note attacks.

B22. The data processing system of any of paragraphs B1-B20, wherein each respective set of time points of each rhythmic building block are time points which represent one or more rests, accents, and/or other musical elements.

B23. The data processing system of any of paragraphs B1-B22, wherein the rhythmic building blocks correspond to varying degrees of rhythmic coherence within a given musical composition.

B24. The data processing system of any of paragraphs B1-B23, wherein each musical pattern comprises a respective series of musical notes.

B25. The data processing system of any of paragraphs B1-B24, wherein each musical pattern is analyzed as a musical loop, such that a respective final time point of each musical pattern immediately precedes a respective first time point of each musical pattern.

B26. The data processing system of paragraph B25, wherein each musical loop has duration m, where m is measured in note durations at a highest metrical resolution.

B27. The data processing system of paragraph B26, wherein duration m is a power of 2, such that the power of 2 is the number of metrical levels under consideration for a given musical pattern.

B28. The data processing system of any of paragraphs B1-B27, wherein each musical pattern includes one or more attack points, pitches, melodic contour, velocities, and/or accents.

B29. The data processing system of any of paragraphs B1-B28, wherein each respective input attack vector is generated from a respective pattern of note accents of the respective musical pattern.

B30. The data processing system of paragraph B29, wherein the rhythm variation is used to generate a variation pattern of note accents for use in generating the musical variation.

B31. The data processing system of any of paragraphs B1-B30, wherein each respective musical pitch used in assigning the musical pitch to each attack in the rhythm variation is based on musical pitches of one or more of the plurality of musical patterns.

B32. The data processing system of any of paragraphs B1-B31, wherein each respective musical pitch used in assigning the musical pitch to each attack in the rhythm variation is from a selected musical mode.

B33. The data processing system of any of paragraphs B1-B32, wherein the output device includes headphones.

B34. The data processing system of any of paragraphs B1-B32, wherein the output device includes speakers.

B35. The data processing system of any of paragraphs B1-B32, wherein the output device includes a piano roll of a digital audio workstation.

B36. The data processing system of any of paragraphs B1-B32, wherein the output device includes a musical score with the musical variation displayed in musical notation.

B37. The data processing system of any of paragraphs B1-B32, wherein the output device includes a haptic feedback device.

B38. The data processing system of any of paragraphs B1-B37, further comprising:

providing the musical variation as input to generate a further musical variation.

B39. The data processing system of any of paragraphs B1-B38, further comprising:

receiving one or more user inputs configured to alter one or more characteristics of the musical variation.

B40. The data processing system of paragraph B39, wherein the one or more user inputs include changes to one or more respective weights assigned to one or more musical patterns and/or the threshold value.

B41. An integrated circuit including the data processing system of any of paragraphs B1-B40.

B42. A musical keyboard including the data processing system of any of paragraphs B1-B40.

B43. A musical effects unit including the data processing system of any of paragraphs B1-B40.

B44. The musical effects unit of paragraph B43, wherein the musical effects unit comprises a guitar pedal.

B45. A modular synthesizer unit including the data processing system of any of paragraphs B1-B40.

B46. The modular synthesizer unit of paragraph B45 having physical dimensions compatible with a Eurorack case.

Advantages, Features, and Benefits

The different embodiments and examples of media analysis and generation described herein provide several advantages over known solutions. For example, illustrative embodiments and examples described herein makes creating and performing music easier.

Additionally, and among other benefits, illustrative embodiments and examples described herein allow the traditional learning curve for musical creation and performance to be navigated more quickly and easily, or even bypassed to some degree, by the user, serving to alleviate some of the problems related to frustration, attrition, etc. related to learning traditional forms of music creation and performance.

Additionally, and among other benefits, illustrative embodiments and examples described herein allow the use of existing ideas (in the form of musical patterns and/or other data sets) to easily create and navigate a nearly endless number of new ideas. Additionally, and among other benefits, illustrative embodiments and examples described herein allow a user to create music of a type and in a way that is pleasing to themselves, but that does not require advanced motor coordination skills, intricate knowledge, or other prerequisites which may serve to exclude some users from participation in musical creation and performance.

Additionally, and among other benefits, illustrative embodiments and examples described herein allow for musical creation and performance which requires minimal mental and physical capacity or skill, but preserves the visceral engagement and flow-state that can be felt when actually playing a musical instrument.

Additionally, and among other benefits, illustrative embodiments and examples described herein generate musical note-pattern variations in real time via a form of interpolation between weighted musical input loops such that the user can steer the newly created output patterns based on their intuition and preferences.

Additionally, and among other benefits, illustrative embodiments and examples described herein enable a mechanism for efficiently and expeditiously incorporating dimensions of variety within recorded music and other forms of data sets and content. For example, to make repeating loops evolve and vary automatically in a musically coherent manner, which may help maintain the listener's and/or music creator's interest.

Additionally, and among other benefits, illustrative embodiments and examples described herein enable karaoke participants to engage with the instrumental elements of the music with a level of ease similar to that of singing.

Additionally, and among other benefits, illustrative embodiments and examples described herein provide an audio encoding and decoding (CODEC) format and file type that allows the underlying musical content (as distinct from audio mix, audio effects, etc.) in the recording to be varied, adjusted, and otherwise changed during playback, listening, and other uses to suit the requirements and wishes of the users. For instance, albums and songs that may be more like "choose your own adventure" books, or games in which there are a variety of possible outcomes and permutations, rather than just one or a few fixed forms.

Additionally, and among other benefits, illustrative embodiments and examples described herein identify and map related rhythmic events, sets, groups, etc. within the musical content, and then makes possible multi-dimensional musical content adjustment, such that can be made by the audio engineer or other non-musician user separate from and/or in conjunction with other audio edits and adjustments.

Additionally, and among other benefits, illustrative embodiments and examples described herein allow a way to identify various relationships and connections between contiguous and non-contiguous data points, and a way to apply adjustments, manipulations, etc. to those points in groups or subgroups according to the needs of the user.

Additionally, and among other benefits, illustrative embodiments and examples described herein allow for combining or otherwise integrating multiple data sets in a way that yields more useful and coherent results for the users.

Additionally, and among other benefits, illustrative embodiments and examples described herein provide capabilities for musical content at a level of flexibility and control which is on par with other data functionality.

Additionally, and among other benefits, illustrative embodiments and examples described herein allow the user to experience and engage in musical creation which combines familiar songs, music, recordings, artists, etc. and also allow the user to create music that is not limited to that which is identical to or predetermined by the original recordings.

Additionally, and among other benefits, illustrative embodiments and examples described herein allow efficient and expeditious identification of connections and relationships between audiovisual content, music data, and other forms of data sets and content such as described above. Along with a functionality by which these components can be adjusted, and otherwise manipulated in a rhythmically coherent manner.

Additionally, and among other benefits, illustrative embodiments and examples described herein incorporate and integrate into the users control and design system a wider range of data dimensionality, engagement, and interaction.

Additionally, and among other benefits, illustrative embodiments and examples described herein provide the user a way to preview, select, and otherwise assess and interact with musical material without hearing it or seeing it.

Additionally, and among other benefits, illustrative embodiments and examples described herein allow for grouping and identifying rhythmic pattern structures, relationships, and interconnectedness.

Additionally, and among other benefits, illustrative embodiments and examples described provide augmented tools for mixing and composition which may include visual preview of potential notes, patterns, hidden relationships within the data, ability to add, remove, or otherwise manipulate related groups and sets of notes, and the like.

Additionally, and among other benefits, illustrative embodiments and examples described herein allow for efficiently and expeditiously identifying, adjusting, and otherwise manipulating spatial patterns and potentialities.

Additionally, and among other benefits, illustrative embodiments and examples described herein incorporate and make available the dimension of rhythmic coherence as it may be applied to speech recordings, text to speech generation, and analysis of environmental noise and other sound content that may not be considered as/or categorized as speech or music.

Additionally, and among other benefits, illustrative examples described herein identify and separate multiple sound sources, musical or otherwise, and then give the user the means to manually scale up or down the rhythmic complexity and density of each of those sources based on selections, choices, preferences of the user and/or other considerations. Such capability may include time shifting individual sounds or sets of related sounds so that they are audible but do not interfere, overlap, align, or otherwise compete with other sounds. Optionally, the user may select preset parameters which guide the system in handling such adjustments automatically, e.g., based on user preferences.

Additionally, and among other benefits, illustrative examples described herein address the following problems associated with the composition, generation, engagement, and/or manipulation of music and/or music-related data.

Creating and performing music is difficult. It requires learning a multifaceted skill set which includes instrumental technique, theoretical knowledge, and more. Would-be music creators often get discouraged and quit. What is described herein is a system which makes creating and performing music easier.

Musical instruments have a fairly steep learning curve. A musician must learn the technique to play their instrument and some amount of music theory; develop an ability to ingest musical information through hearing live or recorded music, and possibly by reading written music; learn a repertoire of songs and musical phrases; learn stylistic techniques and common practices.

Aspiring musicians must invest significant amounts of time, resources, and discipline in order to build their musical skills and knowledge. Beginners may get frustrated by their slow progress and quit. Even those who stick with it and become accomplished musicians, may continue to invest significant time, resources, and discipline in order to maintain their hard-won abilities.

Ideally, at some point all of this training, knowledge, and experience may allow the musician to feel they are able to express themselves through the medium of music.

What is described herein is a solution by which the traditional learning curve for musical creation and performance may be navigated more quickly and easily, or even bypassed to some degree, by the user. Such a solution may serve to alleviate some of the aforementioned problems related to frustration, attrition, and the like.

Even skilled and experienced music creators may sometimes feel they've run out of ideas or inspiration. This system lets you use existing ideas (in the form of musical patterns and/or other data sets) to easily create and navigate a nearly endless number of new ideas.

It may be difficult for non-musicians, or in certain circumstances, experienced musicians whose abilities have been impaired or reduced for some reason, to create and perform music. This may be true whether or not the user in questions is physically or mentally challenged in some way. It's a complex accomplishment to combine instrumental skills, music theory, and other aesthetic and non-aesthetic considerations, and to do so at a level sufficient to generate results that are sophisticated and well-formed enough to be musically pleasing to the music creator in question, and potentially their audience and/or collaborators as well.

What is described herein is some mechanism and system by which a user may create music of a type and in a way that is pleasing to themselves, but that does not require advanced motor coordination skills, intricate knowledge, or other prerequisites which may serve to exclude some users from participation in musical creation and performance.

As mentioned previously, a musician may experience a flow-state when playing music.

However, they typically must develop their instrumental skills to an intermediate or advanced level as a prerequisite to achieving a flow-state.

Tools do exist which allow anyone (with or without musical training) to create music. These tools may tend to be driven by some combination of text prompts, menu selections, machine learning, stochastic, sequencing models, the triggering of loops or other set patterns. However, due to asynchronous functionality, limited flexibility, or other limitations, such tools may lack some of potential for the user to experience the visceral engagement and flow-state that can be felt when actually playing a musical instrument.

What is described herein is a system or mechanism for musical creation and performance which requires minimal mental and physical capacity or skill, but preserves the visceral engagement and flow-state that can be felt when actually playing a musical instrument.

Playing music by triggering musical patterns instead of individual notes may seem a promising and relatively accessible route to musical expression. Triggering one or more pre-recorded loops concurrently and/or in succession is a common technique used to compose or produce music and/or perform DJ sets.

But what if the user wishes to generate new riffs and melodies that are variations and/or hybrids of preexisting input loops, and wishes to shape the resulting note patterns in real time by steering them by ear to be more or less similar to selected input loops? Morphing between musical patterns in short-term memory is something improvisers do mostly unconsciously. How could such morphing be put within reach of those without the skills or available hands to do so? The input patterns could become the inputs to an algorithm that acts as an "improvisation coprocessor," augmenting users' abilities to explore by ear their musical intuitions.

In other words, the input loops themselves become the specification (controlled in real time) for the desired musical result. In contrast to text-to-music (as in LLMs used to parameterize music generation) or other off-line approaches, interpolation based on real-time hearing (of the output) and short-term memory (of the inputs) seems closer in spirit to the experience of a musical improviser (as opposed to a user who is merely selecting from a fixed set of options).

But finding a meaningful form of interpolation is a challenge. For example: How might two musical patterns (inputs) be used to create a third musical pattern (output)? Calculating the mathematical average of two musical patterns simply by averaging properties of their respective notes (attack times or note durations, for instance), is possible but is very unlikely to produce musically coherent or pleasing results.

What is described herein is a system to generate musical note-pattern variations in real time via a form of interpolation between weighted musical input loops such that the user can steer the newly created output patterns based on their intuition and preferences. A system that accomplishes this, using the rhythmic building blocks outlined above, is described herein.

Repeated exposure to static sets of data, like a segment of looping audio and/or musical content, can induce fatigue or "data blindness" in the user. Once a music fan, gamer, audio professional, or other listener has been repeatedly exposed to an unchanging segment of recorded music, the initial excitement, inspiration, and other desirable effects may diminish or be lost entirely for them. Even small changes in musical patterns may serve to enhance and preserve the listener's attention, interest, inspiration, etc.

For example, music creators who use music loops in their work process often listen to the same loop over and over for long periods of time while they are working on other parts of the same musical composition. This static repetition can lead to fatigue, boredom, and losing the "spark" of excitement that the music loop originally gave them.

Such variation and scaling of recorded audio loops, whether as a plugin or other component of a Digital Audio Workstation (DAW), a game engine, stand-alone music audio hardware (i.e., loop pedal, sequencer, etc.), or an onboard chipset for guitar, keyboards, and the like, presents unique technical challenges. What is described herein is a mechanism for efficiently and expeditiously incorporating dimensions of variety within recorded music and other forms of data sets and content. For example, to make repeating loops evolve and vary automatically in a musically coherent manner, which may help maintain the listener's and/or music creator's interest.

Karaoke allows amateur singers to sing along with backing tracks from songs, but there isn't a similar facility for amateur or aspiring musicians to play an instrument along with the backing tracks. What is described here is a system which enables karaoke participants to engage with the instrumental elements of the music, e.g., with a level of ease similar to that of singing.

Current audio file formats, game engines, and other music and audio systems require that musical content be static and unchanging once the audio file has been rendered into fixed form. This paradigm reduces flexibility and optionality for users. What is described herein is a system which facilitates adaptable and flexible musical content within an audio context and/or file format.

Making game music that is adaptive and interactive is a complex and time-consuming process. Developers and sound designers spend a lot of time on this when building new games. This system offers potential to vastly simplify and speed up that process and thus save time & money.

Sound Recordings, once fixed, are typically not adjustable or changeable by the listener beyond superficial audio adjustments like volume and equalization. Other than a few software applications written for specific album or song releases, recorded music has been and remains a medium that is largely fixed and unchangeable for the end user listener.

Musical artists normally have to present/release only one version of their work (album, songs, etc.) and/or have to present that version or versions of their work in a fixed form. This may present limitations for the artist in realizing their vision with regard to the form of the finished work, the listeners ability to engage and interact with it, and other considerations which may be meaningful to the artist, listener, or other user or stakeholder.

What is described herein is an interactive music system and companion file format that allows the underlying musical content (as distinct from audio mix, audio effects, etc.) in the recording to be varied, adjusted, and otherwise changed during playback, listening, and other uses to suit the requirements and wishes of the users. For instance, albums and songs that may be more like "choose your own adventure" books, or games in which there are a variety of possible outcomes and permutations, rather than just one or a few fixed forms.

Audio mixing, editing, and other manipulation of audio content are common tasks in the field of audio engineering and music creation. These tasks are facilitated by various software and hardware tools, and are practiced in a variety of ways by audio engineers and other users. For audio recordings containing musical content, currently available tools and hardware allow the user to adjust the audio content and parameters. But the user is given much more limited capability to impact various parameters of the musical content, of that audio, and to do so in a way that produces musically pleasing and rhythmically coherent results. This is especially true for users who are not themselves knowledgeable and/or skilled in music theory, creation, and performance.

For example, if an audio engineer records a band, they may use multiple microphones and input channels to record the instruments to separate tracks. This separation allows later adjustment of the individual instruments in the audio mix. These adjustments may include volume level, equalization, and the like. The musicians could have made similar adjustments and choices as they performed while the recording was made. Audio tools give the audio engineer the ability to simulate those choices after the fact to some degree, and to experiment with nearly endless scenarios and permutations in a way that would not have been practical or desirable to ask the musicians to do when the material was recorded.

However limited capability exists for the audio engineer or other users to coherently (meaning: in a way that is likely to be perceived by a listener to make sense musically) and easily adjust musical content after it's recorded. Although tools like audio slicing, editing, MIDI, etc. do open the door to this kind of work, they may offer or provide only limited functionality in these respects.

What is described herein is a system that identifies and maps related rhythmic events, sets, groups, etc. within the musical content, and then makes possible multi-dimensional musical content adjustments, such that can be made by the audio engineer or other non-musician user separate from and/or in conjunction with other audio edits and adjustments.

Adjustment and manipulation of musical data or other time related data, in a coherent and expeditious manner can be difficult for users. This is the case even for those who are knowledgeable in music theory and skilled in music creation. This challenge may be especially pronounced for sets of non-contiguous points within a data set.

In audio and/or music editing software for instance, adjustments may have to be done on a note by note or point by point basis, requiring multiple actions, decisions, and touchpoints to achieve a coherent result across a section of music, a group of notes, etc. Adjustments and defined parameters for musical elements like syncopation, elaboration, or rhythmic density which affect sets and groups of data and musical content are typically not available to users.

What is described herein is a way to identify various relationships and connections between contiguous and non-contiguous data points, and a way to apply adjustments, manipulations, etc. to those points in groups or subgroups according to the needs of the user.

Data with temporal and spatial relationships may be difficult to interpolate or otherwise combine in a coherent manner using standard mathematical operations and sorting approaches. For example, merely adding, merging, concatenating, or otherwise combining some sets of data may obscure or dilute essential characteristics of the original data sets. As such, the resulting combined data set may have limited utility for a user relative to or in comparison to the original contributing datasets.

In some data domains, like patterns of musical rhythm, what is described herein is a solution for combining or otherwise integrating multiple data sets in a way that yields more useful and coherent results for the users.

In the context of audio editing, the term crossfade refers to the transitional time period between two overlapping pieces of music. Music and audio software functions for crossfading and similar operations may provide control of only the audio aspect of the material. What is described herein is a system to give the user control over the interpolation of the musical content of the overlapping parts, as distinct and separate from the audio.

Current methods and tools for spatial representation, scaling, cross interpolation, and other manipulation of music data in gaming, virtual reality, augmented reality, and the like may not provide for sufficient ease of flexibility with regard to access and manipulation of music data as distinct from audio or other game data.

What is described herein is a system which provides capabilities for musical content at a level of flexibility and control which is on par with other data functionality.

Beat matching games like Rock Star or Rock Band allow players to trigger playback of certain musical elements and sounds via game controller inputs. Such inputs may be based on the timing of the user's controller inputs being within certain allowable time range accuracy. However, the user control inputs, whether accurate or not, may not allow the user to make choices which may lead to creation of new musical patterns within a dynamic spectrum of possibilities.

What is described herein is a system which allows the user to experience and engage in musical creation which combines familiar songs, music, recordings, artists, etc. but that also allows the user to create music that is not limited to that which is identical to or predetermined by the original recordings.

Current tools for the integration and synchronization of musical and other data patterns with audio visual content don't give the user the full picture of the underlying rhythmic coherence and potential relationships between the musical content, the visual content, and other data layers the user may wish to consider. Along a film timeline for instance, a film music composer, music supervisor, or other user may wish to understand and use rhythmic data sets that are related to a group of specific time points within the film. The user may wish to align the most significant point in the music to corresponding important point in the film. The user may wish to know how pieces or patterns from a given library or set of music or other data might relate to the film. The relationship of the film and data may be one of alignment, contrast, or any other comparative criteria according to the specific user's needs.

What is described herein is a system which efficiently and expeditiously identifies connections and relationships between audiovisual content, music data, and other forms of data sets and content such as described above. Along with a functionality by which these components can be adjusted, and otherwise manipulated in a rhythmically coherent manner.

Current tools for design, timing, placement, mapping, synchronization, etc. of lighting, music, visual effects, and other elements of live performance events like sports, music, theater, and the like, and/or installations for commercial, artistic, or other purposes may not incorporate dimensions of rhythmic coherence as described herein. Such systems may not identify and facilitate the control or consideration of data and time relationships, like rhythmic coherence, between various elements of a presentation, performance, or other live event. For instance, musical time points which themselves do not contain note attacks may still be significantly related to other time points or data within the presentation.

Further, there may be no easy way that is also musically meaningful for the audience at a live or virtual event to engage with and interact with the music, rhythms and visuals, etc.

What is described herein is a system which incorporates and integrates into the users control and design system a wider range of data dimensionality, engagement, and interaction such as those described here.

In some contextual environments it may be impractical or undesirable for a user to preview or otherwise ingest data by listening to or seeing the data. Perhaps the user needs to listen to other data at that same moment, is in a noisy environment which makes listening difficult, etc. in the case of audibility. In the case of visual means, perhaps there is not a screen available, or the user's visual attention must be elsewhere, etc.

However there exist limited options for users to assess data and other system related information through means other than, or in addition to, auditory or visual. Even though such access may have practical benefit in live musical performance and other situations. For example, a DJ who is playing a recorded music track for a live audience, may wish to interact with data unrelated to the recorded music track that is currently playing for the audience.

What is described herein is a mechanism and system which provides the user a way to preview, select, and otherwise assess and interact with musical material without hearing it or seeing it.

Standard music notation for rhythm may be seen much like a ruler for measuring distance. It indicates incremental structure, and denotes sections and points along a timeline. However, standard music notation lacks a means to identify and represent the underlying structure of rhythmic coherence within the music. Further, standard notation offers no means to represent and identify patterns of data related by rhythmic coherence, and to further organize and categorize them.

What is described herein is a system for grouping and identifying rhythmic pattern structures, relationships, and interconnectedness.

Current creative tools or functions of music and audio software don't provide insights on current and potential musical content through the lens of rhythmic coherence and rhythmic building blocks. For example, there is no way to select a musical track, phrase, part, etc. and then see or hear recommended new material that has a rhythmically coherent relationship to the selected material. Such material could be potential, as in options for new material to be created by the user, or actual material contained somewhere in the data of the current project, or a library to which the user has access, or some other data set. Recommended material may be presented in some form similar to the way text editing software presents autocomplete options. The related material could then be added to that same track or part, and/or used to enhance, alter, or create related parts on other tracks and/or instruments.

Current informational displays for musical content, in the form of standard notation, plano roll interfaces, etc., lack detail about the dimension of rhythmic coherence within the material. Such displays show existing notes and provide some means of input, but they don't show rhythmically related potential notes, nor do they provide a way to add, remove, or edit coherently related groups of notes en masse.

What is described herein are augmented tools for mixing and composition which may include visual preview of potential notes, patterns, hidden relationships within the data, ability to add, remove, or otherwise manipulate related groups and sets of notes, and the like.

Tools for visual design may offer various reference units for measurement and layout of content. Rulers, grids, geometric shapes, etc. Use of patterns generated via rhythmic building block theory, which may be transformed from attack points on a musical timeline, to pixel points within a spatial field, potentially provides a new creative dimension of coherent structure for enhancement, reduction, scaling, and other adjustments of visual elements within a visual medium, whether or not in synchronization or relation to audio and music.

What is described herein is a mechanism and system for efficiently and expeditiously identifying, adjusting, and otherwise manipulating such spatial patterns and potentialities.

Current tools for extraction, analysis, and mapping of patterns from speech, environmental noise, and other non-musical content may not incorporate the dimensions of rhythmic coherence as described elsewhere herein. Further, considering a similar challenge from the other direction so to speak, the cadence and timing of the speech sounds generated by text to speech software and apps may impede the listenability and intelligibility of certain content for the user.

What is described herein is a system which incorporates and makes available the dimension of rhythmic coherence as it may be applied to speech recordings, text to speech generation, and analysis of environmental noise and other sound content that may not be considered as or categorized as speech or music.

Current tools for sound reduction and noise cancellation may take into account the audio dimensions of the source or subject material, but not the musical dimensions of that material.

For example, say a user is wearing earbuds which have embedded microphones for environmental monitoring, as well as some onboard computing capability. There are various audio sources coming into the earbud mics and being heard by the user. Some of these sounds may be music, rhythms, etc. and some may be non-musical sounds like speech, environmental background noise, etc. The user may want to hear selected sounds more clearly, while suppressing some of the other sounds.

However, current noise suppression or reduction systems may not allow the user to make any distinction between categories or types of sounds, nor provide a means by which to discreetly adjust or control different types of sounds or specific sounds. Providing a functionality for rhythmically coherent adjustment of soundscape elements could enhance and improve the user experience.

What is described herein is a mechanism and system which may identify and separate multiple sound sources, musical or otherwise, and then give the user the means to manually scale up or down the rhythmic complexity and density of each of those sources based on selections, choices, preferences of the user and/or other considerations. Such capability may include time shifting individual sounds or sets of related sounds so that they are audible but do not interfere, overlap, align, or otherwise compete with other sounds. Optionally, the user may select preset parameters which guide the system in handling such adjustments automatically based on user preferences.

Additionally, and among other benefits, methods and systems described herein introduce a unique capability to enrich and augment existing rhythmic, temporal, or other data by deriving a continuous-valued representation of an otherwise latent structural parameter. This continuous encoding of rhythmic structure enables expressive and perceptually meaningful manipulations that were not previously computationally accessible using conventional discrete timing systems. Once derived, this parameter becomes a manipulable element within the methods and systems described herein. Users can interact with it in real time, shaping and transforming the rhythmic content through a variety of operations such as morphing, scaling, or combining with other data. This manipulation may occur within a feedback-enabled workflow, allowing output to be reintroduced as new input. The methods and systems described herein enable iterative refinement and layered variation over time, functioning as a generative engine for evolving rhythmic structures.

Additionally, and among other benefits, methods and systems described herein enable the format and interoperability of output data. By expressing rhythmic structures as symbolic control curves or normalized continuous values, the methods and systems make their output compatible with a wide variety of downstream systems. These include obvious targets such as DAWs, audiovisual tools, and live performance environments, as well as non-obvious applications such as robotics, interactive installations, generative visual art, or data-driven user interfaces. In both cases, the rhythmic output may serve as a control or influence signal in domains unrelated to the original source material.

In some examples, the system may process and facilitate multi-dimensional, spatial, or adaptive music. This may take the form of musical patterns that combine, adjust, change, modify, etc. according to the physical (i.e., real world) or virtual positions and movements of one or more objects, users, game players, augmented reality or virtual reality participants, or any other target entity or entities. The system may adapt or adjust based on, or in response to, spatial, locational, or other representational coordinates and/or relationships between two or more fixed or changing coordinate sets.

In some examples, any of the system functions or operations may be made conditional on events or data related to the function or content of one or a plurality of virtual environment, game interface, graphic user interface, augmented reality, virtual reality, or other systems, software, and/or hardware.

In some examples, the system may facilitate, be connected to, or otherwise form a part of, a network in which multiuser system data enables synchronous or asynchronous interaction of system inputs, outputs, parameters and other functionality. Such interaction may occur concurrently with performances, playback of recorded music, or other musical interactions or events. For example, as used by a band, ensemble, or other group or set of users or clients.

In some examples, the system may use a deterministic set of data patterns formed by specific operations to represent relationships that occur within a data set. Additionally, or alternatively, the system may use a deterministic set of data patterns formed by specific operations to represent relationships that occur within multiple related or unrelated data sets.

In some examples, the system may provide scores, measurements, and other summary information for data. This may include but is not limited to input data, operational data, transformational data, and output data. For example, the system may create a complexity score for a set of musical pattern input data. Such a score may be used as a parameter and/or consideration with regard to interaction with other data and/or implementation of the data by the user or by the system.

In the same way that other recorded music can be varied using the system, soundtracks for TV and Film may be made dynamic and adaptable to conditions within the video content and/or within the playback environment, and/or respond to inputs from or about the viewer.

In some examples, the system may allow users not trained or skilled in musical performance to control instrumental sounds for the purpose of performing music in a karaoke style context, whether for entertainment, music therapy, or other purposes. Similar to the way backing tracks for karaoke singers may omit or de-emphasize the lead vocal in a song so that the karaoke participant may sing that part, the system may allow similar involvement and participation by a user with regard to control of the instrumental elements of the music performance. Such an instrumental karaoke system may operate in a real time feedback loop in which the user can hear the effect their control inputs have on the output patterns they hear or perceive by other means. These instrumental variations may be navigated by the user using one or more of any number of interfaces which, while simple to operate, give the user ability to navigate to a large spectrum of musical possibilities and expression. Multiple users may participate in a networked fashion, for instance with each user controlling a different instrument or element of the performance.

Since the system may produce relatively complex musical patterns from very simple operations, the karaoke or music therapy application user may experience music improvisation in a manner similar to that practiced by skilled musicians. This system may allow users with a wide range of skill levels to experience the emotional, physiological, physiological, recreational, and other benefits of participating in the creation of music.

In some examples, the system may enhance audio mixer capabilities by adding a control to each mixer channel which allows the user to adjust density, syncopation, and other aspects of the musical content. Optionally, channels may be linked together so they interact when adjusted. For example, when 3 channels or parts are linked together, the 3 different parts may be adjusted all at once. In one configuration all 3 parts may be tied to the same interpolated rhythm. In another configuration, each part may be scaled up or down relative to the other parts. For example, when the note density of part A increases, the note density of parts B & C adjust to become more sparse, etc. In this way, an audio engineer may mix, blend, and adjust not only the audio parameters of the channels, tracks, instruments, etc., but also the musical content of each.

Such control features may be embedded, automated, or otherwise included in schemes for playback of prerecorded music, game music audio, AR/VR music audio, and other areas. For example, a music fan may make their own version of a given song or track for their unique personal listening situations or scenarios, for sharing with other users, and the like.

In some examples, when a human, A1, rule based agent, or other user enacts or considers a modification to a musical pattern or other data set, the system may indicate, recommend, and/or facilitate changes to other parts of the pattern or data set, and/or related patterns or data sets, based on some analysis using the rhythmic building blocks or other criteria, qualities, or conditions. Such changes may optionally be acted upon or not acted upon by the user according to the user's preferences, goals, objectives, or other criteria whether programmatic, discretionary, or otherwise.

In some examples, the output may only be audible, visible, or otherwise perceivable while the user is engaged in some action. For example, in order to continue generating and hearing output patterns, the user would have to make some minimum number of control inputs per time period x. For example, if the user were controlling pattern interpolation by moving an icon around in a visually represented XY plane, the system would only output information while the icon or target was in motion. In other words, while the user was moving the target. Additionally, or alternatively, there may be some minimum number of control inputs required per bar of music, number of seconds, or other measured segment or period, in order for the system to produce audible or otherwise perceivable output.

In some examples, the output may be engaged, changed, or otherwise modified or enabled by some environmental condition or input state. For example, all or some elements of a musical recording or performance would not be audible or otherwise perceivable unless the system detected people dancing on a dance floor, or engaged in some physical or other kind of activity. A DJ, artist, or other performer may use this as a way to encourage, incentivize, or otherwise engage with an audience to take or not take certain actions. For example, if the audience may be made to understand that once enough audience members are dancing or waving their hands in the air, or some special, new, or otherwise notable effect will be perceived in the music or audio content of the performance.

Additionally, or alternatively, the audience may be organized into groups based on location or some other criteria, each group having some associated musical pattern or quality, the members of each group "competing" by taking some action which may cause their groups related pattern to rise or fall in influence with regard to the nature of the output data produced by the system. The system may facilitate this by monitoring or ingesting data from input devices, cameras, sensors, and the like, and then modifying musical patterns, visual effects, or other data according to parameters and settings related to the input data.

In some examples, control parameters may be assigned to or associated with one or more of the axes in a three-dimensional control interface or paradigm. For example, the X axis may control a position or selected increment along a vector, while the Y axis may control a threshold setting, while the Z axis controls some other parameter, function, or setting. Within a visual control interface represented visually by a cube for instance, the user may select a point or some smaller cube within the large cube, which may represent some combination of the parameters assigned to the respective axis. The user may modify their selection by moving the point or smaller cube, and/or rotating the larger cube, and/or any combination of other input choices, gestures, and the like.

In some examples, the user's inputs may be translated or transformed into outputs which reflect the user's intent as inferred by the system in some way. So that the user may express themselves in a musically sophisticated and virtuosic way, without having the normally required dexterity and technique that would be needed to produce those music phrases on a traditional or non-augmented instrument.

For example, tapping on pad or button may indicate the user intent with regard to attack density and may serve as a start point for musical phrases. Velocity of pad input may determine intensity/timbre, but may also influence density of attack to some degree. In other words, tapping faster and or harder may yield a different result than tapping faster and softer, or faster with medium pressure.

In some examples, the user may tap a pattern or patterns as an input. The system may provide, for example by AI inference, the elements the user does not provide. These may include velocity, pitch, tone, articulations, etc. The system may infer these from a combination of other user inputs, the musical context of the accompanying music tracks, the style chosen by the user, and other selections made by the user.

In some examples, the controller interface may be organized like the neck and fretboard of a guitar, using buttons in fret locations. To select patterns, octave range, or other parameters, a button that is lower on the neck may have a fundamentally different nature than a pattern or parameter associated with a button that is higher on the neck. One way the division between the "strings" may work is that the user may select only one pattern per string, and the output is an interpolation of the selected patterns.

For example, a set of right-hand pads may allow the user to access different sections of the current pattern. For instance, the first pad may trigger a musical phrase that has been in some way selected by the user or the system. If the user wants to repeat part of that phrase again, they may select one of 4, 8, or some other number of pads that may correspond to the beats of that pattern or some otherwise identified segment or segments. This action may trigger or start the pattern immediately upon detecting the user's input. Additionally, or alternatively, there may be two or more rows or sections of pads, one which may start on the beat and play the entire pattern, which may now be offset from its original timing depending on which beat the user played the pad or input. Another row of control inputs may only play a selected section of the riff. Such modes or options may be controlled by whether the user taps the pad, taps and holds the pad, or some other criteria. In some modes of operation, multiple patterns may play concurrently.

For example, the user may tap and slide with their right hand on a continuous input surface which may morph or interpolate the pattern mixture, combining the patterns the user may have selected with the left hand. Additionally, or alternatively, the user may select both the patterns and the pattern mixture with one hand, and the other hand may control another aspect of operation.

Frequency of taps may affect the attack density of the patterns. For example, if the user is tapping 1 time per measure, the phrases or patterns may be less attack dense than if they are tapping more frequently per measure.

Additionally, or alternatively, the number of taps a user makes on a specific drum pad, key, or other input control may be interpreted by the system as a "vote" for that pattern, with each additional "vote" increasing (or decreasing in a different context) the weight of the related pattern, and/or some other parameter, in terms of its influence in the system output, interpolation, or other aspects.

The user may be made to as if their inputs, though simple or one dimensional, have a high correlation with or amplified effect upon the outputs they are creating, the sounds they are hearing, and the like.

In some examples, there may be a mute function key which the user may employ to change up the pattern by selectively muting notes as the pattern plays back. For example, the pattern may stay in sync with the music, but the user can selectively play certain parts of it and not others as they choose. For example, output may only be audible when the user is holding down a certain key or some other control.

In some examples, the system may adapt music that is playing on multiple speakers in a house to play slightly different versions of the musical content in different rooms. For instance, the music in the dining room might be a different sort of character of the variable music than the version of the music playing out by the swimming pool or in the bathroom or in the bedroom or the baby's room. In other words, variations or different versions of the same song may be playing in different locations simultaneously.

For example, a similar adaptive use may be applied in retail environments or amusement entertainment, environments, or game environment. The system may facilitate or enable customization of recorded music in a retail environment, or any other environment, where a different version of music is desired from time to time. Prerecorded music of any kind (for example, commercially radio pop music recognizable to a general audience) can be encoded for variability so that users can hear music that may not be generic commercial stock generic library music, but rather is simply a different version of the popular song that's on the radio at the time. For example, a "hit" song may be modified slightly and adapted so that users can hear popular music by an artist with the song being adjusted to fit a variety of environment situations. For example, a health therapy environment where familiar music may be helpful psychologically to the subject, but some characteristic of the familiar music may be such that it is not conducive to the needs of the health subject in that context. In this or a similar setting, it may be beneficial for the music to be modified. For example, to be made less active, simpler, or slower so that the user can still enjoy the feeling of familiarity. For example, the music could be modified to suit a holiday, sport, activities, or other contexts and settings.

In some examples, systems and/or methods described herein may be embodied as a chipset, firmware, etc. that is integrated into midi controller hardware or other hardware. For example, an integrated system like this may output the systems pattern variations as midi data directly from the hardware controller, rather than the system running on a separate computer or other piece of hardware, or the system may run on a device that is connected in between the midi controller hardware and other hardware, computers, etc.

In some examples, systems and/or methods described herein may be embodied as one or more electronic and/or software game(s) in which rhythmic building blocks (RBB) are employed as a mechanism through which or by which player takes action, completes game tasks, and/or competes in collaboration with or against other game players, whether human, AI agent, or otherwise.

In some examples, the player may listen to music that is directly or tangentially related to the rhythmic, data, or other game content of their current instance of the game, whether in relation to their own actions, the actions of other players, or some combination or permutation thereof. In some examples, the game music may be unrelated to the actions or decisions of the game player.

In some examples, the game player may perceive via sight, sound, haptics, and/or other means, which attacks or other aspects of the game data sets are in alignment or not at any given time and how the players own operational choices and/or decisions get them closer to or farther from their current in-game goal or other criteria as determined by the game logic, game rules, user or users preferences, either singularly or in combination, and/or other criteria as may be included in the game design.

For example, given a number of musical rhythm patterns and/or other data sets, the game player is challenged to navigate from one pattern to another. The game may use the RBB structure and Generative Operations of elaboration and syncopation as described previously herein as a structure or paradigm for game controls, environment, context, rules, restrictions, guidelines, and the like. For example, an aspect of the game challenge may be for the player to determine which operations may be chosen, in which order, to transform one or more patterns into one or more other patterns. Such starting and ending patterns may be selected by the player, by some game logic or rules, and/or some other means Other parameters or options may be part of the game, including but not limited to, for example, the player must employ the least number of operation steps possible; the player must employ no more or no less than a certain number of operational steps; the player must complete the challenge within certain time limits; the player must complete the task before a competing player or players; etc.

For example, the user may be given a musical pattern as a goal or target, represented by some combination of auditory and visual information. The user is then given a set of patterns and parameters, some combination of which will produce a pattern identical to, or in some other way matching, the goal or target pattern. The user then may have a given amount of time and/or other governing parameters and criteria within which to complete the task of creating a matching pattern and/or some other result which satisfies the rules, requirements, or objectives of the game. For example, the user may have to "use up" all or some of some set or group of patterns.

In some examples, the music recordings, patterns, and other materials or aspects of the game may be created by, endorsed, or otherwise related to commercially available recorded music and/or recording artists.

One or more variations on the game may be used to morph between rhythms and/or to sequence musical patterns which might themselves be outputs of the morphing algorithm (or any pattern).

For example, early or comparatively simple game levels may involve patterns that are fewer operational steps apart than more difficult game levels. The game levels may progressively employ patterns that start/end get farther apart, meaning that require a greater number of operational steps to transform one pattern into the other, and for that or some other reason or reasons may be harder to solve.

Additionally, or alternatively, such a game may employ haptics, visuals, and/or any other perceptual means to convey patterns, feedback, and other game data to the user. A game as described here may be accomplished with any combination of hardware and software, whether created specifically for the game or adapted from another use.

In some examples, some aspects of the game may be designed in keeping with and as adaptations of traditional game formats like an obstacle course, a beat battle, and the like.

For example, in a beat battle game, the player may use the system to create new beats and riffs to go with popular songs and then challenge their opponents to match their creation in some way. For instance, one player may have some amount of time to create a beat using some interface, and then that player may "throw" the pattern at their opponent and the opponent or opponents respond in some way. For instance by creating a matching, complimentary, and/or higher or different scoring pattern according to some criteria as may be determined by the game logic, game players, and/or other source.

For example, the game player may have to match progressively harder patterns by navigating some visual control interface. The player may do this with popular songs as the backdrop or context. In some examples, some songs may be included, with others available to buy in-game. The game program may be written to extract data from a recorded music track to identify rhythm families and then may choose rhythmic patterns that will work well according to analysis by the system and some set of rules. The user may choose from various instrument sounds and may have the option to buy other sounds in game. Premium sounds may be offered from audio development partners. Game content may be branded, endorsed, or otherwise offered in conjunction with musical artists, bands, and the like. Such content may take the form of signature patches for example, or any other aspect of the game. In some examples, users may share patterns and user generated puzzles or other content, which may be stored locally and/or in a remote database.

For example, such a game could also incorporate freestyle rap, singing, and/or any other vocalization and/or instrumental performance, play, and the like. Game players may go back and forth in sequence or in parallel until a set amount of time, turns, points, and/or other criteria is achieved by any or all of the players. A winner of the game may be determined by points, audience popularity, voting, and/or any other means.

In some examples, 2 or more users may control pattern interpolation and/or other system features and/or functionality at the same time. This may be accomplished in part by the user's ability to view their respective interactions in the form targets which are a different color or shape from other users, and/or by some other means.

For example, users may see both target locations in an XY-coordinate plane or via some other representational scheme. Users may choose to hear or otherwise perceive the output pattern resulting from their own actions, the actions of other users, the sum, average, or other combination of multiple users, or any other permutation or combination. Users may have access to monitor, use, or otherwise interact with or benefit from any, all, or some of the inputs, outputs, and other aspects of their own instance of the system and/or that of other users in a synchronous or asynchronous manner.

In some examples, systems and/or methods described herein may be embodied as a musical graffiti game in which multi-user interaction is distributed across different locations and times. For example, the system may be utilized in a type of "musical graffiti" where a user "tags" a GPS location with a pattern or groove. They or others may also tag other locations with other patterns. A user who is merely consuming the output (not tagging) would then hear a pattern morphed between a few nearest tags. In some examples, the tags decay with time.

Users may be enabled to compete over musical "turf" and/or create challenging tags corresponding to difficult to tag locations, such as a mountain top, or a dangerous or difficult to reach neighborhood, in order to make it more difficult for a tag to be supplanted by others. Layers of tags may be organized into channels so the musical "turfs" of different styles can coexist at given locations, offering the user a choice of what channel to listen to, or what channel to apply a tag to.

In some examples, systems and/or methods described herein may be embodied as a space-themed exploration game in which users begin with a seed melody (the "home planet") and explore a galaxy of variations influenced by surrounding "planets" representing different musical patterns. As users move a spaceship icon through this 2D or 3D universe using different navigation modes (Explorer, Drift, Beat, Hyperspace, Time Travel, Orbits), the seed melody morphs based on proximity and interaction with other patterns. Players can capture favorite variations, organize them visually as "stars," and zoom into quadrants for detailed exploration. The game supports user-generated and auto-generated pattern planets using MIDI input or algorithmic rules (e.g., Euclidean, clave, retrograde). Parallel universes allow manipulation of other musical elements like basslines or drum beats. In multiplayer mode, each user operates in a unique universe with galaxies of saved musical systems.

In some examples, the system may use a deterministic set of data patterns formed by specific operations to represent relationships that occur within a data set. Additionally, or alternatively, the system may use a deterministic set of data patterns formed by specific operations to represent relationships that occur within multiple related or unrelated data sets.

Tools for visual design may offer various reference units for measurement and layout of content. Rulers, grids, geometric shapes, etc. In some examples, patterns generated via the system may be transformed from attack points on a musical timeline or other data sets to pixel points within a spatial field, for instance. This may provide a new creative dimension of coherent structure for enhancement, reduction, scaling, and other adjustments of visual elements within a visual medium, whether or not the visual content is in synchronization with, or being employed in relation to, audio and music.

In some examples, the system may be used to scale the complexity of musical material up or down along the dimensions of syncopation, elaboration, or other aspects, and/or to create variations of musical material. This functionality may be employed as an aid in learning to play a musical instrument, practicing a musical instrument, or any other endeavor related to music education or instruction.

These combined capabilities of latent parameter extraction, real-time manipulation, feedback looping, and cross-domain repurposing, represent a novel and non-obvious advancement in music and audio technology with broad applicability across multiple technical and creative fields. No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A computer implemented method of generating a musical variation, the method comprising:

receiving as input a plurality of musical patterns, each musical pattern corresponding to a respective input attack vector;

receiving a plurality of rhythmic building blocks, each rhythmic building block comprising a respective set of time points corresponding to a stage of pattern formation in a musical meter;

analyzing each of the musical patterns to identify rhythmic building blocks which coincide with each musical pattern by identifying one or more symmetries between portions of each respective input attack vector and the respective set of time points of each rhythmic building block;

generating an activations vector for each musical pattern, the activations vector comprising a respective activation number for each of the plurality of rhythmic building blocks, each respective activation number representing a respective fraction of time points in each rhythmic building block which corresponds to attacks in the respective input attack vector;

generating a rhythmic potentials vector for each musical pattern based on the respective activations vector, each rhythmic potentials vector comprising a respective likelihood of an attack at each time point in the respective musical pattern, wherein the respective likelihood of the attack at each time point is a function of a sum of the activation number of all rhythmic building blocks which contain that time point;

assigning a respective weight to each musical pattern;

generating a rhythm variation based on a weighted combination of the rhythmic potentials vectors, wherein a respective contribution of each rhythmic potentials vector to the weighted combination is based upon the weight assigned to the corresponding musical pattern, and wherein at least one threshold value is used to control which values of the weighted combination are interpreted as attacks in the rhythm variation and which values of the weighted combination are interpreted as non-attacks in the rhythm variation;

generating a musical variation by assigning a musical quantity to each attack in the rhythm variation; and outputting the musical variation to an output device.

2. The computer implemented method of claim 1, wherein the musical quantity is pitch.

3. The computer implemented method of claim 1, wherein, for each rhythmic potentials vector, the respective likelihood of an attack at each time point in the respective musical pattern comprises a real number value between 0 and 1.

4. The computer implemented method of claim 1, wherein analyzing each of the musical patterns to identify rhythmic building blocks which coincide with each musical pattern further includes:

determining a correspondence level between each musical pattern and each rhythmic building block; and assigning a respective rhythmic building block weight to each rhythmic building block quantifying the correspondence level.

5. The computer implemented method of claim 4, wherein determining the correspondence level between each musical pattern and each rhythmic building block includes determining a distance vector quantifying an amount of commonality between each respective musical pattern and each rhythmic building block.

6. The computer implemented method of claim 1, wherein the assigned weight of each musical pattern is a real number value between 0 and 1.

7. The computer implemented method of claim 1, wherein each respective set of time points of each rhythmic building block are time points which represent note attacks.

8. A computer implemented method of generating a musical variation, the method comprising:

receiving as input a musical pattern defining an input attack vector;

receiving a plurality of rhythmic building blocks, each rhythmic building block comprising a respective set of time points corresponding to a stage of pattern formation in a musical meter;

analyzing the musical pattern to identify rhythmic building blocks which coincide with the musical pattern;

generating an activations vector for the musical pattern, the activations vector comprising a respective activation number for each of the plurality of rhythmic building blocks, each respective activation number representing a respective fraction of time points in each rhythmic building block which correspond to attacks in the input attack vector;

generating a rhythmic potentials vector for the musical pattern based on the activations vector, the rhythmic potentials vector comprising a likelihood of an attack at each time point in the musical pattern, wherein the likelihood of the attack at each time point is a function of a sum of the activation number of all rhythmic building blocks which contain that time point;

generating a rhythm variation based on the rhythmic potentials vector, by utilizing at least one threshold value to control which values of the rhythmic potentials vector are interpreted as attacks and which values of the rhythmic potentials vector are interpreted as non-attacks;

generating a musical variation by assigning a musical quantity selected from the group consisting of pitch, instrument mapping, voice mapping, and effect parameter to each attack in the rhythm variation; and outputting the musical variation to an output device.

9. The computer implemented method of claim 8, wherein each of the plurality of rhythmic building blocks corresponds to a respective ternary number comprising a sequence of ternary digits, each ternary digit corresponding to a respective presence of a generative operation being applied to a respective metrical level, the generative operation including an elaboration operation and/or a syncopation operation; and wherein a '0' in place n corresponds to no generative operation being applied at metrical level n, a '1' in place n corresponds to the elaboration operation being applied at metrical level n, and a '2' in place n corresponds to the syncopation operation being applied at metrical level n.

10. The computer implemented method of claim 9, wherein analyzing the musical pattern to identify rhythmic building blocks which coincide with the musical pattern includes iterating through the ternary numbers corresponding to the rhythmic building blocks and mapping corresponding rhythmic structures of each rhythmic building block to the input attack vector of the musical pattern.

11. The computer implemented method of claim 8, wherein the input attack vector is a ternary number comprising a sequence of ternary digits corresponding to a respective sequence of equal subdivisions of the musical meter, each ternary digit of the ternary number corresponding to a respective subdivision; and wherein a '0' corresponds to a non-attack at the respective subdivision of the musical meter, a '1' corresponds to an attack at the respective subdivision of the musical meter and a '2' corresponds to a sustain at the respective subdivision of the musical meter.

12. The computer implemented method of claim 11, wherein each non-attack corresponds to a musical rest.

13. A data processing system for generating a musical variation, the system comprising:

one or more processors;

a memory; and a plurality of instructions stored in the memory and executable by the one or more processors to:

receive as input a plurality of musical patterns, each musical pattern including a respective input attack vector;

receive a plurality of rhythmic building blocks, each rhythmic building block comprising a respective set of time points corresponding to a stage of pattern formation in a musical meter;

analyze each of the musical patterns to identify rhythmic building blocks which coincide with each musical pattern by identifying one or more symmetries between portions of each respective input attack vector and the respective set of time points of each rhythmic building block;

generate an activations vector for each musical pattern, the activations vector comprising a respective activation number for each of the plurality of rhythmic building blocks, each respective activation number representing a respective fraction of time points in each rhythmic building block which correspond to attacks in the respective input attack vector;

generate a rhythmic potentials vector for each musical pattern based on the respective activations vector, each rhythmic potentials vector comprising a respective likelihood of an attack at each time point in the respective musical pattern, wherein the respective likelihood of the attack at each time point is a function of a sum of the activation number of all rhythmic building blocks which contain that time point;

assign a weight to each musical pattern;

generate a rhythm variation based on a weighted combination of the rhythmic potentials vectors, wherein a contribution of each respective rhythmic potentials vector to the weighted combination is determined using the weight of each corresponding musical pattern;

generate a musical variation by assigning a musical quantity to each attack in the rhythm variation; and output the musical variation to an output device.

14. The data processing system of claim 13, wherein the musical quantity is pitch.

15. The data processing system of claim 13, wherein the output device includes a piano roll of a digital audio workstation.

16. The data processing system of claim 13, further comprising:

providing the musical variation as input to generate a further musical variation.

17. The data processing system of claim 13, further comprising:

receiving one or more user inputs configured to alter one or more characteristics of the musical variation.

18. The data processing system of claim 17, wherein the one or more user inputs include changes to one or more of the respective weights assigned to the one or more musical patterns.

19. The data processing system of claim 17, wherein the one or more user inputs include changes to the threshold.

20. A musical effects unit including the data processing system of claim 13.

* * * * *